US012389500B2

(12) United States Patent
Watanabe et al.

(10) Patent No.: US 12,389,500 B2
(45) Date of Patent: Aug. 12, 2025

(54) ELECTROMAGNETIC WAVE HEATING DEVICE

(71) Applicant: General Solutions Co., Ltd., Kōka (JP)

(72) Inventors: Soshi Watanabe, Kōka (JP); Seiji Kanbara, Kōka (JP)

(73) Assignee: General Solutions Co., Ltd., Koka (JP)

( * ) Notice: Subject to any disclaimer, the term of this patent is extended or adjusted under 35 U.S.C. 154(b) by 380 days.

(21) Appl. No.: 18/103,421

(22) Filed: Jan. 30, 2023

(65) Prior Publication Data

US 2023/0284351 A1 Sep. 7, 2023

Related U.S. Application Data

(62) Division of application No. PCT/JP2021/027904, filed on Jul. 28, 2021.

(30) Foreign Application Priority Data

Jul. 30, 2020 (JP) ................................ 2020-128953
Feb. 5, 2021 (JP) ................................ 2021-017282
May 31, 2021 (JP) ................................ 2021-091069

(51) Int. Cl.
*H05B 6/68* (2006.01)
*B41J 11/00* (2006.01)
(Continued)

(52) U.S. Cl.
CPC ........ *H05B 6/686* (2013.01); *B41J 11/00216* (2021.01); *H05B 6/72* (2013.01);
(Continued)

(58) Field of Classification Search
CPC .. B41J 11/00216; B41J 11/00218; B41J 2/01; B41J 11/002; B41J 11/0022;
(Continued)

(56) References Cited

U.S. PATENT DOCUMENTS

2001/0035406 A1* 11/2001 Ryan .................. B29C 66/8322
219/634

FOREIGN PATENT DOCUMENTS

JP 54-074540 A 6/1979
JP 63-080189 A 4/1988
(Continued)

*Primary Examiner* — Thinh H Nguyen
(74) *Attorney, Agent, or Firm* — j-pat U.S. Patent Legal Services; James W. Judge

(57) ABSTRACT

In order that it may be possible to form a strong-electric-field region at a level at which a electromagnetic waves are easily absorbed by an object to be heated 20 with low power in an electromagnetic-wave heating device 10 for heating the object to be heated 20 utilizing an electromagnetic waves, the electromagnetic-wave heating device 10 comprises: an oscillator 21 for outputting an electromagnetic waves; and a radiation antenna 22 being a conductor that radiates the electromagnetic waves outputted from the oscillator 21 and having a resonance structure in which resonance occurs in the conductor by the electromagnetic waves in a frequency band transmitted from the oscillator 21, and is configured that a strong-electric-field region for heating the object to be heated is formed along the radiation antenna 22 by the electromagnetic waves supplied from the oscillator 21 to the radiation antenna 22.

14 Claims, 36 Drawing Sheets

(51) Int. Cl.
*H05B 6/72* (2006.01)
*H05B 6/76* (2006.01)
*H05B 6/78* (2006.01)

(52) U.S. Cl.
CPC ................. *H05B 6/76* (2013.01); *H05B 6/78* (2013.01); *H05B 2206/046* (2013.01)

(58) Field of Classification Search
CPC ........ B41J 13/0009; H05B 6/686; H05B 6/72; H05B 2206/046
See application file for complete search history.

(56) References Cited

FOREIGN PATENT DOCUMENTS

| | | | |
|---|---|---|---|
| JP | 09-097674 | A | 4/1997 |
| JP | 2003-510402 | A | 3/2003 |
| JP | 2008-292606 | A | 12/2008 |
| JP | 2017-50216 | A | 3/2017 |
| JP | 6157036 | B | 7/2017 |
| WO | WO 2019/104216 | A1 | 5/2019 |

* cited by examiner

ELECTROMAGNETIC WAVE HEATING DEVICE

TECHNICAL FIELD

The present disclosure relates to an electromagnetic-wave heating device and the like used for heating an object to be heated.

BACKGROUND ART

Conventionally, electromagnetic-wave heating devices employing dielectric heating have been used for various applications such as heating of food. Electromagnetic-wave heating devices irradiate dielectrics included in an object to be heated with electromagnetic waves. Then, by the action of the electric field by the electromagnetic waves, molecule-scale dipoles in the dielectrics vibrate, and dielectric loss due to the vibration causes heat, whereby the object to be heated is heated. In addition, according to high-frequency heating different from the dielectric heating, an object to be heated is heated due to conductive (Joule) loss caused by a current when the object to be heated contains conductor components or ionic substances, and due to magnetic loss when the object to be heated contains magnetic components.

Patent Document 1 discloses a dielectric heating unit that dielectric-heats a fixing member that heats and melts a toner image and fixes the toner image on a recording medium. The dielectric heating unit includes at least a pair of rod-shaped electrodes that form a high-frequency electric field around a dielectric of the fixing member, facing an outer peripheral surface or/and an inner peripheral surface of the fixing member. The rod-shaped electrodes are arranged to have different polarities from the adjacent rod-shaped electrodes, and high-frequency power is supplied from a power source.

REFERENCE DOCUMENT(S) OF CONVENTIONAL ART

Patent Documents

Patent Document 1: JP 2008-292606 JP

DESCRIPTION OF THE DISCLOSURE

Problem(s) to be Solved by the Disclosure

Notably, Patent Document 1 describes an experimental result using a high-frequency of 40 MHz. In this case, the wavelength of the high-frequency is about 7.5 m. Therefore, in the prior art described in Patent Document 1, resonance does not occur by the high-frequency in each rod-shaped electrode, and an electric field in the length direction of each rod-shaped electrode is considered to be substantially uniform. On the other hand, the inventors of the present application have considered an electromagnetic-wave heating device in which resonance occurs by the electromagnetic waves in a radiation antenna in order to increase an electric field intensity by the radiation antenna, since the stronger electric field is, the easier it is the electromagnetic waves to be absorbed by an object to be heated, whereby the object to be heated can be heated efficiently.

However, in such an electromagnetic-wave heating device, a resonance frequency in the radiation antenna may be sequentially changed depending on an object to be heated or the like, and in this case, it is difficult to maintain an efficient heating state. Therefore, the inventor of the present application considered employing frequency control to control an oscillation frequency of an oscillator with respect to the resonance frequency.

Here, Patent JP6157036B describes frequency control in which phase control and reflected power control are sequentially performed. However, since it takes time to detect reflected power in the reflected power control, in this frequency control, an oscillation frequency cannot be made to follow a resonance frequency at a high speed.

The present disclosure has been made in view of these circumstances, and the object of the present disclosure is to provide an electromagnetic-wave heating device, in which resonance by electromagnetic waves in a radiation antenna occurs, that can make an oscillation frequency follow a resonance frequency at a high speed.

SUMMARY OF THE DISCLOSURE

In order to solve the above problems, according to the present disclosure, an electromagnetic-wave heating device, provided with an oscillator for outputting electromagnetic waves and with a radiating antenna having a resonance structure in which resonance by the electromagnetic waves in a frequency band transmitted from the oscillator occurs, the electromagnetic-wave heating device for heating in an electromagnetic-wave strong-electric-field region formed by the resonance structure an object to be heated, comprises: a signal extraction unit provided in a transmission line extending from the oscillator to the radiation antenna, for extracting reflected-wave information representing a waveform of a reflected wave returning from the radiation antenna; a phase-difference information generating unit for generating, by arithmetic processing utilizing the reflected-wave information and incident-wave information representing a waveform of an incident wave transmitted from the oscillator to the radiation antenna, phase-difference information representing a phase difference between the incident wave and the reflected wave; and a control unit for repeatedly performing a control process of: detecting, based on the phase-difference information and on reference information about a state in which the incident-wave phase and the reflected-wave phase are equal, a direction of oscillation-frequency adjustment whereby a difference between a resonance frequency in the radiation antenna and the oscillation-frequency of the oscillator is minimized, and controlling the oscillation-frequency based on the detected adjustment direction.

Effect of the Disclosure

According to the present disclosure, a phase-difference signal representing a phase difference between the incident wave and the reflected wave is generated by arithmetic processing utilizing incident-wave information and reflected-wave information. Then, the control process of detecting an adjustment direction of the oscillation frequency based on the phase-difference signal and reference information and controlling the oscillation frequency based on the detection result is repeatedly performed, whereby the oscillation frequency follows the resonance frequency. Here, the arithmetic processing utilizing the incident-wave information and the reflected-wave information can be performed at a high speed. That is, generation of the phase-difference information can be performed at a high speed. Further, since the reference information can be prepared in advance, the adjustment direction of the oscillation frequency can also be detected at a high speed. According to the present disclosure, it is possible to make the oscillation frequency follow the resonance frequency at a high speed.

MODES FOR CARRYING OUT THE DISCLOSURE

Figure 1:
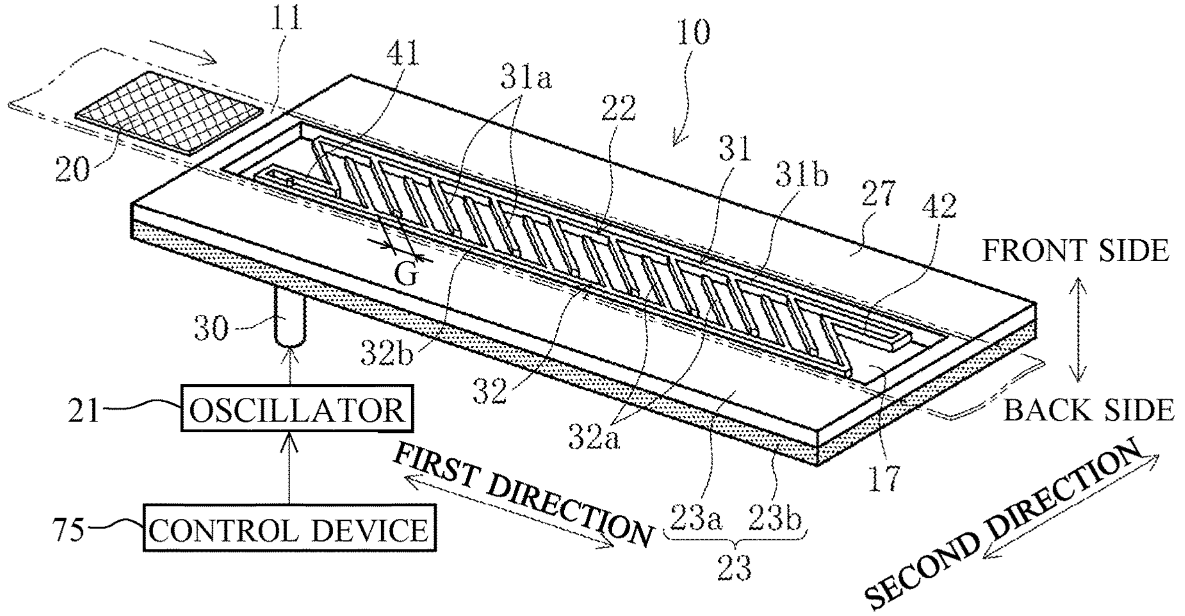
FIG. 1 is a perspective view of an electromagnetic-wave heating device according to an embodiment as viewed obliquely from above with a cover being removed.

Hereinafter, one embodiment of the present disclosure is described in detail with reference to the drawings. Note that the following embodiment is one example of the present disclosure, and it is not intended to limit the scope of the present disclosure, its application, or its use.

Embodiment

The present embodiment is an electromagnetic-wave heating device 10 that heats an object to be heated 20 by utilizing electromagnetic waves such as high-frequency waves. The electromagnetic-wave heating device 10 is a heating device employing dielectric heating. The electromagnetic wave used by the electromagnetic-wave heating device 10 are of a high-frequency of 50 MHz or higher (for example, a high-frequency of 800 MHz or higher (microwave or the like)).

The object to be heated 20 heated by the electromagnetic-wave heating device 10 includes a substance (a liquid, a solid or the like) that absorbs a high-frequency. The object to be heated 20 is a thin object having a small thickness and has a sheet shape or a film shape. The object to be heated 20 is, for example, an adhesive. The object to be heated 20 is applied or disposed on the surface of a sheet-shaped and elongated base material (conveyed object) 11. The object to be heated 20 is conveyed along with the base material 11 in a predetermined direction (a direction indicated by an arrow in FIG. 1) and passes through a high-frequency strong-electric-field region. At this time, the object to be heated 20 is heated by absorbing a high-frequency. Note that the object to be heated 20 may not be in the form of a sheet or a film and may have a certain thickness. Further, the object to be heated 20 (for example, an adhesive) may be applied to or disposed on a sheet (for example, an envelope) placed on the surface of the base material 11, and in this case, the object to be heated 20 is conveyed together with the sheet and the base material 11.

The electromagnetic-wave heating device 10 constitutes a conveyance type processing system together with an upstream device (for example, an adhesive application device, not shown) for applying or disposing the object to be heated 20 on the surface of the base material 11, and a conveyance mechanism 12 for conveying the base material 11 through a processing section extending from at least an inlet of the upstream device to an outlet of the electromagnetic-wave heating device 10. The conveyance mechanism 12 conveys the base material 11 and the object to be heated 20 by using a plurality of pairs of rollers 13 (see FIG. 4). Hereinafter, a conveying direction of the base material 11 is referred to as a "first direction", and a direction orthogonal to the first direction is referred to as a "second direction" (see FIG. 1 and the like). Further, in the electromagnetic-wave heating device 10, a cover 50 side is referred to as "front side", and a substrate 23 side is referred to as "back side" (see FIG. 2 and the like).

Note that the electromagnetic-wave heating device 10 may be a device for simply heating the base material 11 itself without the purpose of heating the liquid or solid of object to be heated 20 placed on the base material 11. In addition, the electromagnetic-wave heating device 10 may be configured to heat the object to be heated 20 without conveying it.

Configuration of Electromagnetic-Wave Heating Device

Figure 2:
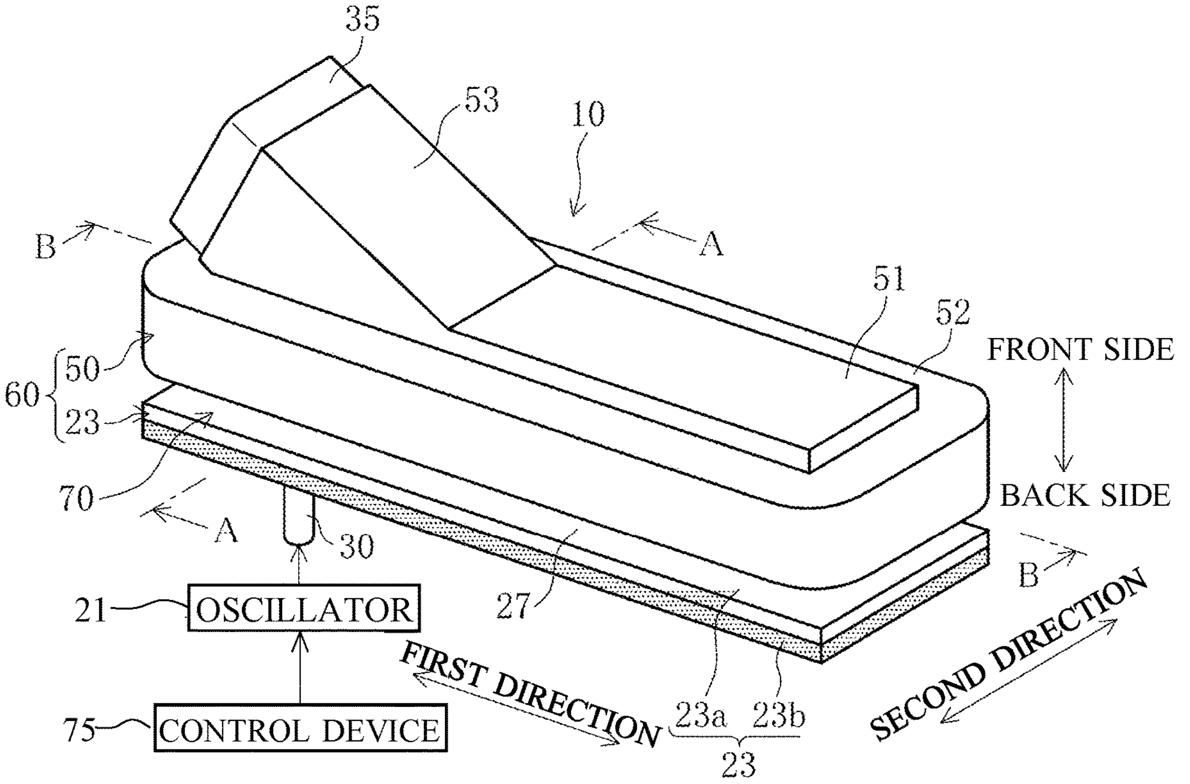
FIG. 2 is a perspective view of the electromagnetic-wave heating device according to the embodiment as viewed obliquely from above.

As shown in FIGS. 1 and 2, the electromagnetic-wave heating device 10 includes an oscillator 21 that oscillates a high-frequency, a radiation antenna 22 that radiates a high-frequency for heating the object to be heated 20 and a substrate 23 on which the radiation antenna 22 is provided on its one side. The radiation antenna 22 is a conductor that radiates a high-frequency output from the oscillator 21 and has a resonance structure in which resonance occurs in the conductor under a frequency band of high-frequency transmitted from the oscillator 21. The electromagnetic-wave heating device 10 is configured such that the strong-electric-field region (high-frequency heating region) for heating the object to be heated 20 is formed along the radiation antenna 22 by high-frequency supplied from the oscillator 21 to the radiation antenna 22.

The electromagnetic-wave heating device 10 includes the cover 50 that covers the radiation antenna 22 side of the substrate 23. The electromagnetic-wave heating device 10 further includes a control device 75 that controls the oscillator 21.

For example, a semiconductor oscillator is used as the oscillator 21. The substrate 23 and the cover 50 are made of metal. The substrate 23 corresponds to a grounded electrode. The substrate 23 and the cover 50 correspond to a shield unit 60 that shields from the outside an internal space 40 (see FIG. 3) in which the radiation antenna 22 is disposed. The cover 50 corresponds to a first partition portion that partitions the internal space 40 of the shield unit 60 from one side (upper side). The substrate 23 corresponds to a second partition portion that partitions the internal space 40 from an opposite side (lower side) to the first partition portion. A continuous gap 70 is formed between the substrate 23 and the cover 50 that is continuous in the circumferential direction around an outer periphery of the shield unit 60 in a plan view.

The radiation antenna 22 is constituted by an interdigital circuit. The radiation antenna 22 includes a first comb-teeth electrode 31 and a second comb-teeth electrode 32 that meshes with the first comb-teeth electrode 31 with a gap therebetween. The first comb-teeth electrode 31 is formed in a comb shape by a plurality of tooth portions 31*a*. The second comb-teeth electrode 32 is formed in a comb shape by a plurality of tooth portions 32*a*.

The first comb-teeth electrode 31 includes a straight base line 31*b* and a plurality of the tooth portions 31*a* whose roots are connected to the base line 31*b*. The plurality of tooth portions 31*a* are provided to be parallel to each other. Each of the tooth portions 31*a* extends obliquely from the base line 31*b*. The plurality of tooth portions 31*a* are arranged at equal intervals in the first direction.

The second comb-teeth electrode 32 includes a straight base line 32*b* and a plurality of the tooth portions 32*a* whose roots are connected to the base line 32*b*. The base line 32*b* is parallel to the base line 31*b* of the first comb-teeth electrode 31. The plurality of tooth portions 32*a* are provided to be parallel to each other. The tooth portions 32*a* of the second comb-teeth electrode 32 are parallel to the tooth portions 31*a* of the first comb-teeth electrode 31. Each of the tooth portions 32*a* extends obliquely from the base line 32*b*. The plurality of tooth portions 32*a* are arranged at equal intervals in the first direction.

In the radiation antennae 22, the plurality of tooth portions 31*a*,32*a* are arranged in the same plane with a gap therebetween in a predetermined direction (the first direction). A region in which the plurality of tooth portions 31*a*,32*a* are arranged (hereinafter, referred to as an "arrangement region") is a band-shaped region in a plan view. The total number of tooth portions (conductive line) 31*a*,32*a* arranged in the first direction may be three or more, and may be ten or more as in the present embodiment.

The radiation antenna 22 includes, in addition to the first comb-teeth electrode 31 and the second comb-teeth electrode 32, a first connection line 41 connecting the first comb-teeth electrode 31 and the second comb-teeth electrode 32 on one end of the arrangement region in the first direction and a second connection line 42 connecting the first comb-teeth electrode 31 and the second comb-teeth electrode 32 on the other end of the arrangement region. The radiation antenna 22 is a closed circuit. The first connection line 41 is connected to an input part 30 to which a high-frequency from the oscillator 21 is input. The input part 30 is, for example, a coaxial connector, and is connected to the oscillator 21 via a coaxial line. The input part 30 is provided on the back side of the substrate 23. During an input period in which a high-frequency is input to the input part 30, the strong-electric-field region for heating the object to be heated 20 is formed in a facing region (a region above the arrangement region) of the radiation antenna 22. The strong-electric-field region is formed in the vicinity of the front side of the radiation antenna 22 in the facing region and is a parallel and thin region.

The radiation antenna 22 is configured such that resonance of high-frequency occurs under a frequency band of a high-frequency oscillated by the oscillator 21 during the above-described input period. In the radiation antennae 22, resonances of high-frequencies occur simultaneously at the respective tooth portions 31*a*, 32*a*. The length L1 of the tooth portion 31*a* and the length L2 of the tooth portion 32*a* are designed by using Equations 1 and 2 ($n_1$, $n_2$ is a natural number), where X is the wavelength (electric length) of the transmitted high-frequency. The combined length of adjacent tooth portion 31*a* and tooth portion 32*a* is expressed by 2 m×/4 (m is a natural number). In the present embodiment, the length L1, L2 of the tooth portion 31*a*, 32*a* are both λ/4. Note that the respective tooth portions 31*a* of the first comb-teeth electrode 31 and the respective tooth portions 32*a* of the second comb-teeth electrode 32 have the same length, but the lengths may be different from each other.

$$L1=\lambda\times(2n_1-1)/4 \qquad \text{Equation 1}$$

$$L2=\lambda\times(2n_2-1)/4 \qquad \text{Equation 2}$$

The radiation antennae 22 is configured such that a relatively strong-electric-field coupling occurs between the tooth portion 31*a*, 32*a* adjacent to each other in the first direction during the above-described input period. Specifically, in the radiation antennae 22, the large number of tooth portions 31*a*, 32*a* are arranged at equal intervals in the first direction, the distance (the dimension of a gap) G of the tooth portions 31*a*, 32*a* adjacent in the first direction is not more than 5 times the line width of the tooth portion 31*a*,32*a*, and a relatively strong-electric-field coupling occurs between adjacent conductive lines 31*a*,32*a*. Therefore, the strong-electric-field region is formed along the large number of tooth portions 31*a*, 32*a*. The distance G may be three times or less of the line width of the tooth portion 31*a*, 32*a*, or may be one time or less. Note that the respective tooth portions 31*a* of the first comb-teeth electrode 31 and the respective tooth portions 32*a* of the second comb-teeth electrode 32 have all the same line width, but the line widths may be different from each other.

The substrate 23 is made of, for example, a metal plate material. The planar shape of the substrate 23 is substantially rectangular. The longitudinal direction of the substrate 23 coincides with the first direction. A recess 17 having a substantially rectangular planar shape is formed in the front side of the substrate 23. The longitudinal direction of the recess 17 also coincides with the first direction. The radiation antenna 22 is accommodated in the recess 17. In the recess 17, the radiation antenna 22 is supported in a floating state by, for example, a dielectric (not shown) provided on the bottom surface. The radiation antenna 22 is electrically isolated from a metal portion of the substrate 23. A region of the surface of the substrate 23 other than the recess 17 is a flat region 27 surrounding the radiation antenna 22. The height of the flat region 27 is, for example, about the same level as or slightly above or below the upper surface of the radiation antenna 22.

In the present embodiment, the substrate 23 is constituted by a frame-shaped front-side metal plate 23*a* and a rectangular back-side metal plate 23*b* superposed on the back surface of the front-side metal plate 23*a*, but the substrate 23 may be constituted by a single metal plate having the recess 17 formed in one side. Further, the surface of the flat region 27 and/or the upper surface of the radiation antenna 22 may be coated with a coating (e.g., a dielectric coating) that absorbs high-frequencies in order to suppress generation of discharge due to a strong electric field.

Figure 3:
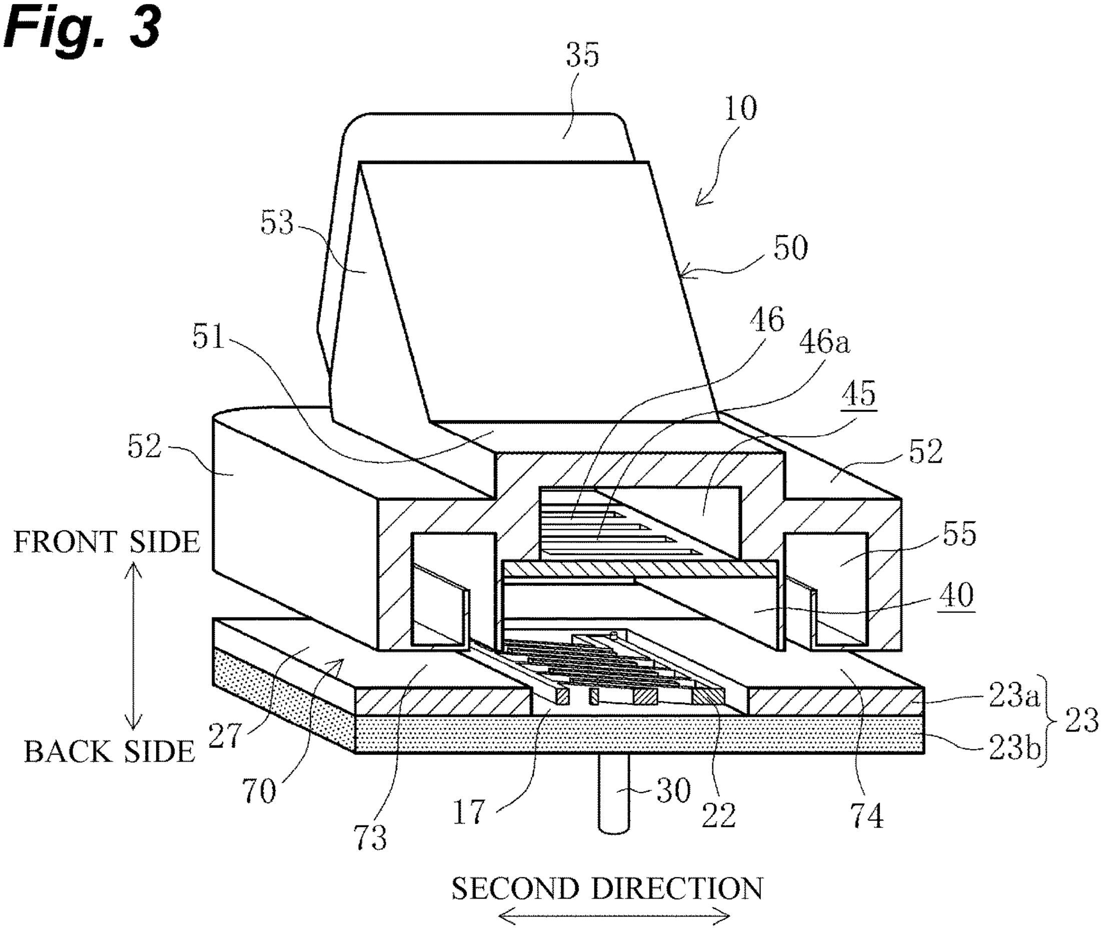
FIG. 3 is a sectional view of A-A of FIG. 2.

The cover 50 is a metal casing. As shown in FIGS. 2 and 3, the cover 50 includes a main body portion 51 covering the radiation antenna 22 from the front side, an outer peripheral portion 52 integrated with the main body portion 51 so as to surround the entire periphery of the main body portion 51 and a duct portion 53 connected to an upper surface of the main body portion 51. A blower 35 that supplies air to the heated object 20 conveyed through the internal space 40 is attached to an outer end portion of the duct portion 53. The blower 35 is attached to a shield unit 60 (the first partition portion 50).

Figure 4:
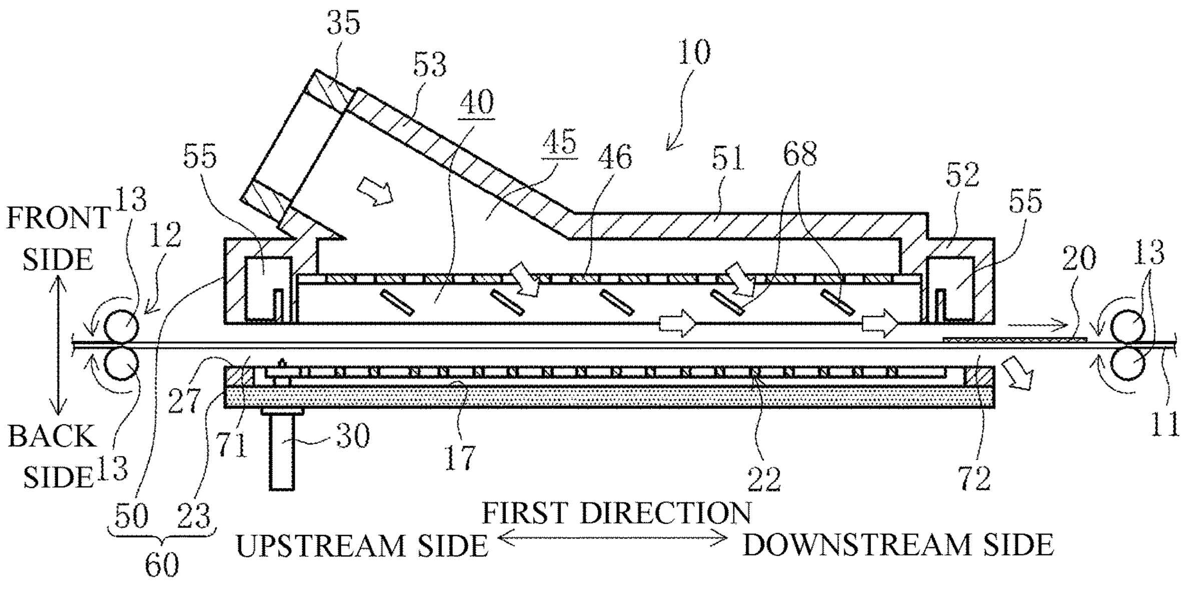
FIG. 4 is a cross-sectional view of B-B of FIG. 2 showing a base material being transported.

The main body portion 51 has a substantially rectangular shape in a plan view, and has, for example, a planar dimension equivalent to that of the recess 17. The main body portion 51 is located directly above the recess 17. The main body portion 51 is formed in a box shape with its lower side being opened. As illustrated in FIG. 4, an internal space of the main body portion 51 and an internal space of the duct portion 53 are connected to each other and serve as a blowing passage 45 through which air flows from the blower 35 toward the object to be heated 20.

The outer peripheral portion 52 is an outside portion of the main body portion 51 and has a substantially rectangular frame shape in a plan view. The outer peripheral portion 52 faces the flat region 27 of the substrate 23 through the continuous gap 70 in the circumferential direction. The outer peripheral portion 52 is provided with a shield structure 55 that prevents leakage of high-frequencies through the continuous gap 70 around the entire circumference. The shield structure 55 is, for example, a choke structure 55. The structure and shape of the choke structure 55 are not particularly limited, but a short-circuit type λ/4 resonant choke can be adopted. The choke structure 55 is formed of a spiral (or ring-shaped) cavity in a cross-sectional view and has an opening to the radiation antenna 22. The dimension of the choke structure 55 is, for example, "λ/2×a ("a" is a natural number)" in the circumferential length in the cross-sectional view and "λ/4×b ("b" is a natural number)" in the depth. λ is the electrical length of high-frequency in the choke structure 55.

The duct portion 53 is disposed on an upstream side (an introduction portion 71 side) in a conveyance direction (the first direction) of the base material 11. The duct portion 53 is inclined obliquely downwardly toward the downstream side in the first direction. A blowing direction of the blower 35 faces the downstream side in the first direction. Further, inside of the main body portion 51, a plurality of wind direction adjusting plates 68 are provided. Each wind direction adjusting plate 68 is, for example, a louver which directs a wind direction to the downstream side of the first direction. With these configurations, air blown from the blower 35 flows toward the downstream side in the first direction, is mainly discharged to the outside from a lead-out portion 72 of the continuous gap 70 and is partially discharged from side gaps 73 and 74. The wind direction adjusting plate 68 may be omitted.

The blowing passage 45 is provided with a metallic shield member 46 that shields the blower 35 from high-frequency radiated from the radiation antenna 22 and is formed with through-holes 46*a* allowing air from the blower 35 toward the object to be heated 20 to pass therethrough. The shield member 46 is formed in a plate shape. The shield member 46 is attached to the main body portion 51 so as to partition the air blowing passage 45 into the upstream side and the downstream side (so as to partition vertically). A plurality of through-holes 46*a* are formed in the shield member 46. The respective through-holes 46*a* are formed to have a size such that high-frequency radiated from the radiation antenna 22 cannot pass therethrough.

Configuration of Shield Unit

The configuration of the shield unit 60 will be described with reference to FIGS. 3 and 4 and the like.

The shield unit 60 is a housing for accommodating the radiation antenna 22 in the internal space 40 and is constituted by the substrate 23 and the cover 50. The shield unit 60 is configured such that the internal space 40 becomes a shielded space while allowing passage of the base material 11 by providing the introduction portion 71, the lead-out portion 72 and the like. In the internal space 40, the base material 11 is conveyed from the introduction portion 71 toward the lead-out portion 72 so that the object to be heated 20 passes through a facing region of the radiation antenna 22.

In the shield unit 60, the continuous gap 70 is formed which is continuous around an entire periphery of a side portion of the shield unit 60 as a gap for allowing the internal space 40 to communicate with the outside. For example, in the shield unit 60, the cover 50 is supported by a support member (not shown) so as to be in a floating state with respect to the substrate 23. The first partition portion 50 is supported by the second partition portion 23 on the other side in the direction orthogonal to the conveyance direction.

The continuous gap 70 is formed by an upper surface of the flat region 27 of the substrate 23 and a lower surface of the outer peripheral portion 52 of the cover 50 in a cross-sectional view. The gap dimension (the distance between the flat region 27 and the outer peripheral portion 52) of the continuous gap 70 in the cross-sectional view is constant over the entire periphery of the shield unit 60, for example. The lower limit of the gap dimension of the continuous gap 70 may be any dimension that allows the base material (conveyed object) 11 to pass therethrough. The upper limit of the gap dimension of the continuous gap 70 is, for example, 30 mm or less, preferably 10 mm or less, more preferably 5 mm or less as long as it can substantially prevent leakage of high-frequency to the outside.

The continuous gap 70 includes the introduction portion 71 into which the base material 11 including the object to be heated 20 is introduced, the lead-out portion 72 from which the base material 11 is derived and a pair of side gaps 73 and 74 extending in the conveying direction of the base material 11 on both sides of the facing region. The continuous gap 70 is formed on four sides of the upstream side in the first direction, the downstream side in the first direction, and both sides in the second direction when viewed from the facing region of the radiation antenna 22 in a plan view. The side gaps 73 and 74 extend in the conveying direction of the conveyed object on the sides of the facing region. In the present specification, the "side" of the facing region means a direction orthogonal to the conveyance direction.

Figure 5A:
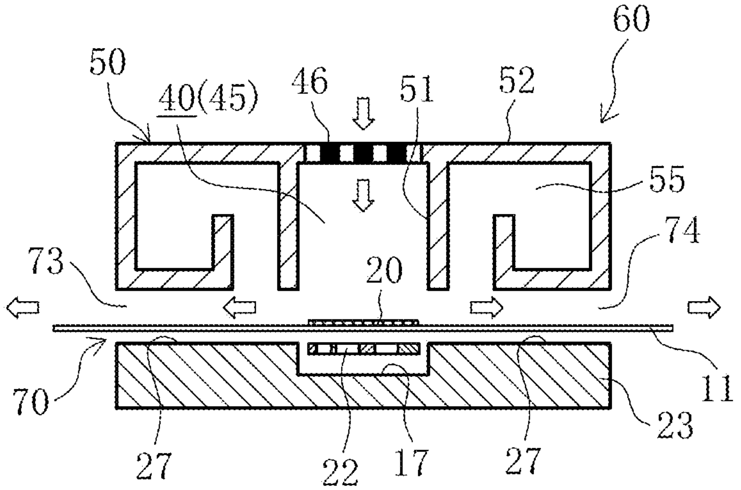
FIGS. 5A and 5B are cross-sectional views of the electromagnetic-wave heating device according to the embodiment.
Figure 5B:
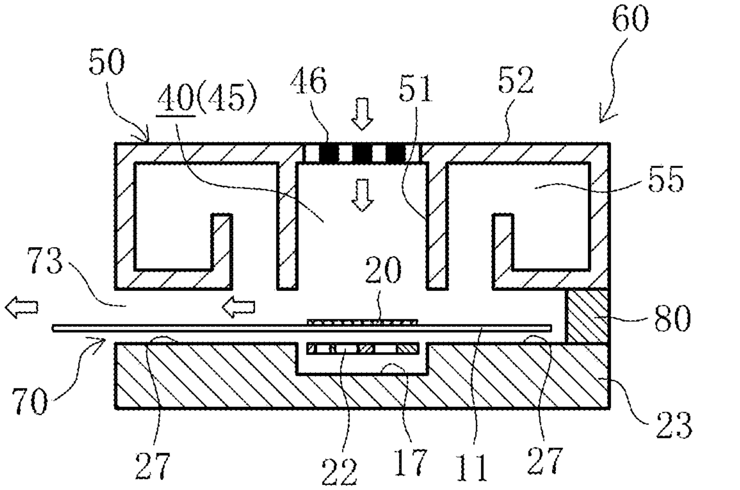

It is to be noted that the continuous gap 70 may be constituted by at least three gaps having the introduction portion 71 on the upstream side in the conveying direction, the lead-out portion 72 on the downstream side in the conveying direction, and the side gap 73 on one side in a direction orthogonal to the conveying direction (such as the side gap 73 on one side in the second direction). In FIG. 5B, the continuous gap 70 is formed in only three directions when viewed from the facing region. Further, the support member 80 that supports the cover 50 with the substrate 23 is provided on the other side in the second direction as viewed from the facing region.

Specifically, each of the introduction portion 71 and the lead-out portion 72 is constituted by a gap formed between the short side of the flat region 27 of the substrate 23 and the outer peripheral portion 52 facing the short side. Each of the side gaps 73 and 74 is constituted by a gap formed between the long side of the flat region 27 of the substrate 23 and the outer peripheral portion 52 facing the long side. The side gaps 73 and 74 are connected to the introduction portion 71 and the lead-out portion 72, respectively.

Operation of Processing System

The operation of the processing system including the electromagnetic-wave heating device 10 will be described. When the power supply of the processing system is turned ON, the respective power supplies of the electromagnetic-wave heating device 10 and the conveyance mechanism 12 are turned ON. As a result, the base material 11 is conveyed in the first direction by a conveyance mechanism 12, and a high-frequency is oscillated from the oscillator 21. The base material 11 is conveyed in the vicinity of the front side of the radiation antenna 22 with the object to be heated 20 side facing the front side (the upper side in FIG. 1). Note that the base material 11 may be conveyed with the object to be heated 20 side facing the back side.

In the electromagnetic-wave heating device 10, a high-frequency outputted from the oscillator 21 is supplied to each tooth portion 31*a* of the first comb-teeth electrode 31 and each tooth portion 32*a* of the second comb-teeth electrode 32. Resonance of a high-frequency occurs in each tooth portion 31*a*, 32*a* of the comb-teeth electrodes 31 and 32, and the leading end of each tooth portion 31*a*,32*a* becomes an abdominal portion of a standing wave of a high-frequency. In the radiation antenna 22, the abdominal portions of the standing waves in the plurality of tooth portions 31*a* of the first comb-teeth electrode 31 are aligned in the first direction, and the abdominal portions of the standing waves in the plurality of tooth portions 32*a* of the second comb-teeth electrode 32 are aligned in the first direction.

Further, relatively strong-electric-field coupling occurs between the tooth portions 31*a*, 32*a* adjacent to each other in the first direction. Thus, in the facing region of the radiation antenna 22, a strong-electric-field region is formed so as to include the conveyance path of the object to be heated 20 and the base material 11. The object to be heated 20 passing through the strong-electric-field region has its dielectric components, conductive components or the like contained therein heated by a high-frequency. As a result, A desired physical/chemical change (polymerization, annealing, drying, curing, or the like) occurs in the object to be heated 20 through the temperature rise. In the base material 11, a plurality of objects 20 to be heated are arranged at intervals in the conveyance direction of the base material 11. The plurality of objects 20 to be heated are conveyed at intervals so as to pass through the strong-electric-field region in order.

In this embodiment, resonance of high-frequency occurs at the respective tooth portions 31*a*, 32*a* of the radiation antenna 22, and thereby electric field strength in the strong-electric-field region becomes relatively high. Therefore, power input to the oscillator 21 can be suppressed as compared with the case where resonance does not occur. Moreover, since the continuous gap 70 is formed in the shield unit 60, it is possible to suppress high-frequency leakage to the outside while allowing the base material 11 to pass through. Moreover, since the shield member 46 is provided, high-frequency leakage through the inlet of the blowing passage 45 can also be suppressed. In addition, since the blower 35 is provided, in the case that the object to be heated 20 is dried by heating, an organic solvent and moisture evaporated from the object to be heated 20 can be discharged to the outside of the shield unit 60 and the object to be heated 20 can be dried efficiently.

Configuration and Operation of Controller

Figure 6:
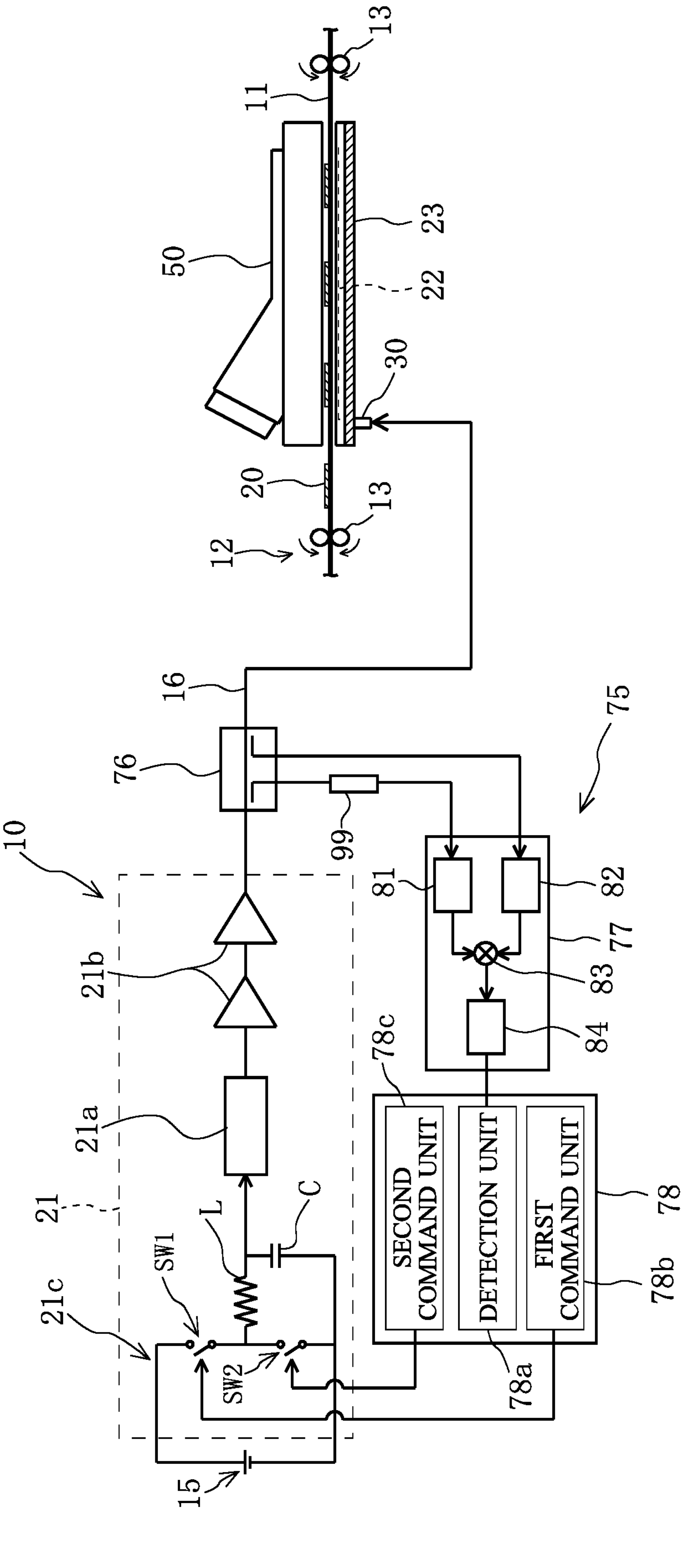
FIG. 6 is a schematic circuit diagram of the electromagnetic-wave heating device according to the embodiment.

The control device 75 is configured to control the oscillation frequency of the oscillator 21. As shown in FIG. 6, the control device 75 includes a directional coupler 76, a phase-difference information generation unit 77 and a control unit 78. The directional coupler 76 corresponds the signal extraction unit provided in a transmission line 16 extending from the oscillator 21 to the radiation antenna 22, which extracts reflected-wave information.

The oscillator 21 includes a voltage variable oscillator (VCO) 21*a* in which an oscillation frequency is varied by a control voltage, an amplifier 21*b* provided after the voltage variable oscillator 21*a* and a voltage regulation circuit 21*c* provided between the voltage variable oscillator 21*a* and a DC power supply 15. The voltage regulation circuit 21*c* is configured to change a control voltage applied to the voltage variable oscillator 21*a* by ON/OFF of switches SW1, SW2.

For example, the voltage regulation circuit 21*c* includes an inductor L and a capacitor C in addition to the first switch SW1 and the second switch SW2. In the voltage regulation circuit 21*c*, a first terminal of the inductor L is connected to a positive terminal of the DC power supply 15, a first terminal of the capacitor C is connected to a negative terminal of the DC power supply 15, and a second terminal of the inductor L and a second terminal of the capacitor C are connected to each other and connected to the voltage variable oscillator 21*a*. The first switching SW1 is connected between the first terminal of the inductor L and the positive terminal of the DC power supply 15. The second switching SW2 is connected between a wiring connecting the first terminal of the inductor L and the positive terminal of the DC power supply 15, and a wiring connecting the first terminal of the capacitor C and the negative terminal of the DC power supply 15.

In a first state in which only the first switch SW1 from among the first switch SW1 and the second switch SW2 is set to ON, the capacitor C is charged. In the first state, the control voltage gradually increases, and the oscillation frequency gradually increases with the increase of the control voltage. Further, in a second state in which only the second switch SW2 from among the first switch SW1 and the second switch SW2 is set to ON, the capacitor C is discharged. In the second state, the control voltage gradually decreases, and the oscillation frequency gradually decreases with the decrease of the control voltage. In a third state in which both the first switch SW1 and the second switch SW2 are set to OFF, a potential difference between the first terminal and the second terminal in the capacitor C and the control voltage are constant. In the third state, the oscillation frequency of the voltage variable oscillator 21*a* does not change. Note that the configuration of the voltage regulation circuit 21*c* is not limited to the present embodiment.

Each element of a control device 75 will be described. A directional coupler 76 is connected to the transmission line 16. The directional coupler 76 is configured to extract, from the transmission line 16, an incident-wave signal representing a waveform of a high-frequency (incident wave) toward the radiation antenna 22 and a reflected-wave signal representing a waveform of a high-frequency (reflected wave) returning from the radiation antenna 22, respectively. The directional coupler 76 has a first output terminal and a second output terminal, both connected to a phase-difference information generation unit 77, outputs the incident-wave signal from the first output terminal to the phase-difference information generation unit 77, and outputs the incident-wave signal from the second output terminal to the phase-difference information generation unit 77.

In a line on which the incident-wave signal is transmitter from directional coupler 76 to the phase-difference information generation unit 77, a delay line (cable) which delays a signal by a predetermined phase is provided as a phase correction unit 99 that corrects a phase shift between the incident-wave signal and the reflected-wave signal. Instead of the delay line, a delay element that delays the signal by a predetermined phase may be provided.

The phase-difference information generation unit 77 is a device that generates a phase-difference signal representing a phase difference (θ1–θ2) between the incident wave and the reflected wave by arithmetic processing for calculating the incident-wave signal and the reflected-wave signal. The phase-difference signal corresponds to phase-difference information. A phase detector or an amplitude/phase detector can be used as the phase-difference information generation unit 77. The phase-difference information generation unit 77 generates and outputs a phase-difference signal PDS shown in Equation 4 by, for example, performing a multiplication shown in Equation 3 and then performing a filtering processing to remove a component (a double harmonic component (cos(2ωt+θ1+θ2)) including an angular frequency ω and a time function t corresponding to the oscillation frequency f According to the filtering processing, a phase-difference PDS corresponding to a direct current remains. Generation and outputting of the phase-difference signal PDS in the phase-difference information generation unit 77 are continuously performed.

Equation 3

$$NPA \times NPB = A\sin(\omega t + \theta 1) \times B\sin(\omega t + \theta 2) = -\frac{A \times B}{2}\{\cos(2\omega t + \theta 1 + \theta 2) - \cos(\theta 1 - \theta 2)\}$$

Equation 4

$$PDS = \frac{A \times B}{2}\{\cos(\theta 1 - \theta 2)\}$$

In Equation 3, NPA represents the incident-wave signal (A sin(ωt+θ1)), and NPB represents the reflected-wave signal (B sin(ωt+θ2)). θ1 represents a phase of the incident-wave signal NPA, and θ2 represents a phase of the reflected-wave signal NPB.

The phase-difference information generation unit 77 illustrated in FIG. 6 includes a first log amplifier 81 to which the incident-wave signal is input, a second log amplifier 82 to which the reflected-wave signal is input, a multiplier 83 (that is, a multiplier that outputs a result of multiplying signals before conversion through adding of logarithmic converted signals) in which the incident-wave signal output from the first log amplifier 81 and the reflected-wave signal output from the second log amplifier 82 are added and a filter unit 84 that performs the above-described filtering processing on an output signal of the multiplier 83. The multiplier 83 adds the logarithmically converted incident-wave signal and the logarithmically converted reflected-wave signal (that is, multiplies the incident-wave signal and the reflected-wave signal). The filter unit 84 removes a double frequency component from the multiplication result. A low-pass filter can be used for the filter unit 84. Note that the filter unit 84 may be a digital filter and is provided after AD converter.

The control unit 78 is configured to repeatedly perform a control process. In the control process, a direction detection operation of detecting a direction of an oscillation frequency adjustment whereby a difference between the resonance frequency of the radiation antenna 22 and the oscillation frequency of the oscillator 21 is reduced based on the phase-difference signal and a frequency adjustment operation of adjusting the oscillation frequency based on the detection result of the direction detection operation are performed. The control unit 78 includes a detection unit 78*a* that performs the direction-detection operation, and a first command unit 78*b* and a second command unit 78*c* that perform the frequency adjustment operation.

The control unit 78 can be constituted by, for example, a microcomputer. In this case, a control program is installed in the control unit 78. The control unit 78 includes the detection unit 78*a*, the first command unit 78*b*, and the second command unit 78*c* as functional blocks realized by CPU executing and interpreting the control program. Note that the control unit 78 may be configured by an analog circuit.

Figure 7:
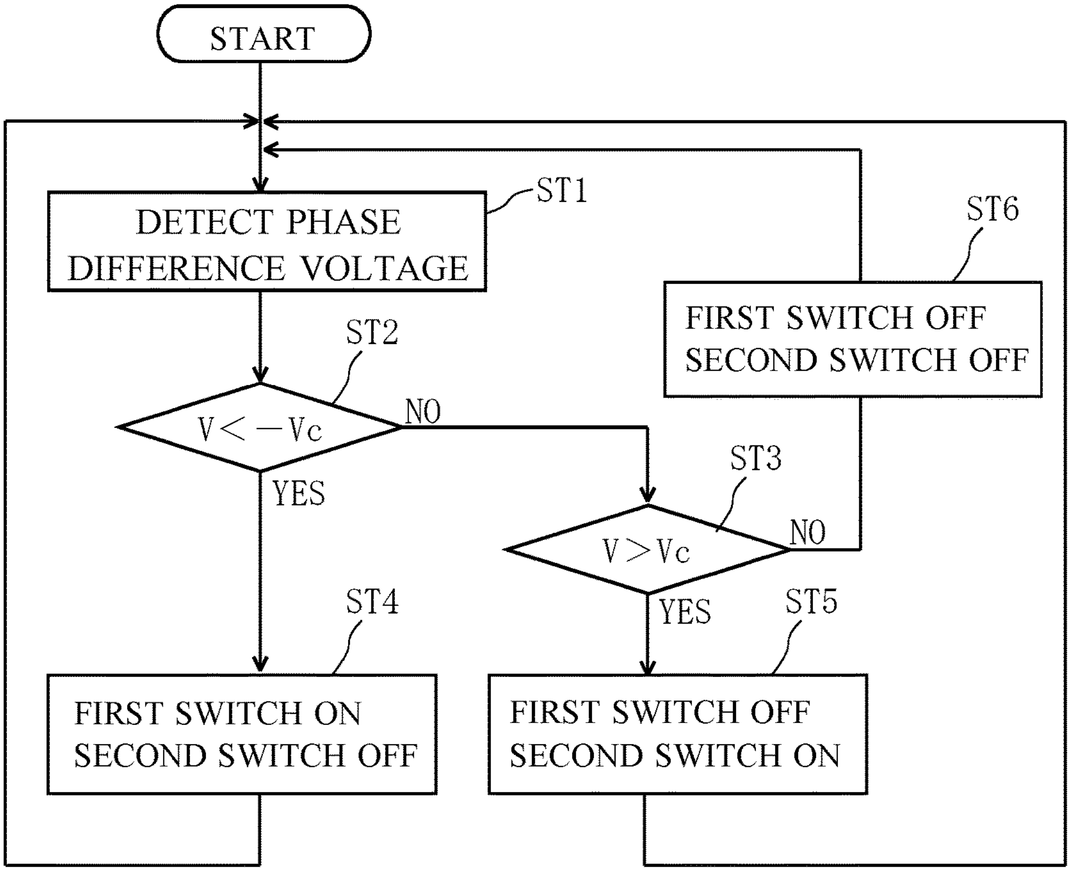
FIG. 7 is a flowchart of a processing performed by a control unit of the electromagnetic-wave heating device according to the embodiment.

The control process of the control unit 78 will be described with reference to the flowchart of FIG. 7. In the flow chart, steps ST1 to ST3 correspond to the direction detection operation, and steps ST4 to ST6 correspond to the frequency adjustment operation. In addition, the control unit 78 repeats the control process of the flowchart at a predetermined control cycle S. The control period S is set to be 50 ms or less.

A phase-difference signal is continuously inputted to the detection unit 78*a* via an AD converter. In a step ST1, the detection unit 78*a* performs a normalization processing or the like on the digitally converted phase-difference signal to detect the voltage value of the phase-difference signal as the phase-difference voltage V at a sampling period equal to the control period S, for example. In the step ST2, the detection unit 78*a* determines whether or not the phase-difference voltage V is lower than the lower limit −Vc of a threshold range (−Vc to Vc) as a first comparison operation of comparing the threshold range including a threshold (voltage=0) with the phase-difference voltage V. The threshold range corresponds to the reference information in a state in which the incident-wave phase and the reflected-wave phase are equal to each other.

Figure 8:
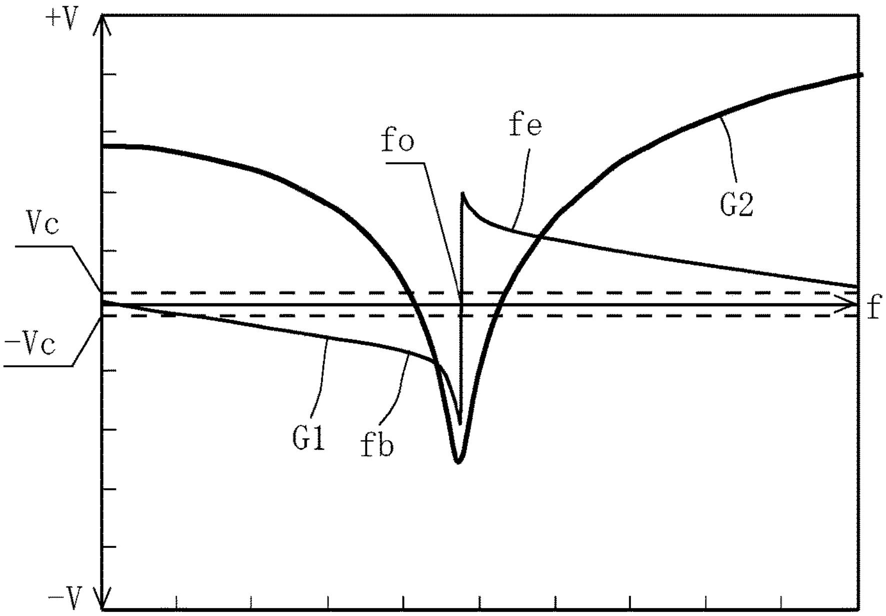
FIG. 8 is a diagram drawn a graph showing a relationship between a phase-difference voltage and a resonance frequency.

Here, in FIG. 8, a first graph G1 representing changes of the phase-difference voltage V with respect to frequency and a second graph G2 representing changes of the reflected-wave intensity with respect to frequency are described in an overlapping manner. The first graph G1 indicates that the phase-difference voltage V becomes smaller than zero in a lower frequency range fb where the oscillation frequency is smaller than the resonance frequency $f_0$, the phase-difference voltage V becomes larger than zero in a upper frequency range $f_e$ where the oscillation frequency is larger than the resonance frequency $f_0$, and the phase-difference voltage V becomes zero at a frequency at which the oscillation frequency is equal to the resonance frequency $f_0$ (that is, at a frequency at which impedance matching is achieved in the radiation antenna 22).

When the phase-difference voltage V is lower than the lower limit −Vc of the threshold range in a step ST2, the oscillation frequency is in the lower frequency range fb smaller than the resonant frequency $f_0$. In this case, the process proceeds to a step ST4, and the first command unit 78*b* that has received a command from the detection unit 78*a* outputs ON signal to the first switching SW1 as the frequency adjustment operation. At this time, if the second switch SW2 is ON, the detection unit 78*a* causes the second command unit 78*c* to switch the second switch OFF. As a result, the voltage regulation circuit 21*c* switches to the first state, and the control voltage to the voltage variable oscillator 21*a* gradually increases. Consequently, the oscillation frequency of the oscillator 21 gradually increases and approaches the resonant frequency $f_0$. After the step ST4 is executed, the process returns to the step ST1.

On the other hand, when the phase-difference voltage V does not fall below the lower limit value −Vc of the threshold range in the step ST2, the process proceeds to a step ST3, and the detection unit 78*a* determines, as the second comparison operation, whether or not the phase-difference voltage V exceeds the upper limit value Vc of the threshold range. When the phase-difference voltage V exceeds the upper limit Vc of the threshold range in the step ST3, the oscillation frequency is in the upper frequency range $f_e$ larger than the resonant frequency $f_0$. Then, the process proceeds to the step ST5, and the second command unit 78*c* that has received a command from the detection unit 78*a* outputs ON signal to the second switching SW2 as the frequency adjustment operation. At this time, if the first switch SW1 is ON, the detection unit 78*a* causes the first command unit 78*b* to switch the first switch OFF. As a result, the voltage regulation circuit 21*c* switches to the second state, and the control voltage to the voltage variable oscillator 21*a* gradually decreases. Consequently, the oscillation frequency of the oscillator 21 gradually decreases and approaches the resonant frequency $f_0$. After the step ST5 is executed, the process returns to the step ST1.

When the phase-difference voltage V does not exceed the upper limit Vc of the threshold range in the step ST3, the phase-difference voltage V is within the threshold range. In this case, the process proceeds to the step ST6, and the detection unit 78*a* causes the first command unit 78*b* to switch the first switch SW1 to OFF when the first switch SW1 is ON, and causes the second command unit 78*c* to switch the second switch SW2 to OFF when the second switch SW2 is ON. As a result, the voltage regulation circuit 21*c* switches to the third state, and the control voltage becomes constant. Consequently, the oscillation frequency of the voltage variable oscillator 21*a* is held at a current value. After the step ST6 is executed, the process returns to the step ST1.

Referring to FIG. 9, a manner in which the oscillation frequency follows the resonance frequency $f_0$ will be described. In the following description, the process starting from the step ST1 and returning to the first step ST1 will be referred to as "n-th process" as one unit.

Figure 9A:
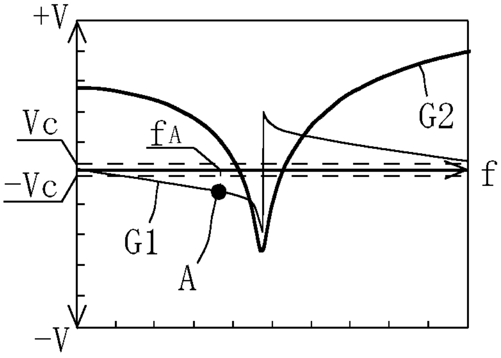
FIG. 9A to 9F are diagrams for explaining how an oscillation frequency is made to follow a resonance frequency.

At the time of a first process, it is assumed that the oscillation frequency is $f_A$ (see FIG. 9A). When the first process is performed in this condition, the phase difference-voltage becomes the value on the vertical axis of a detecting point A, and it is detected that the phase-difference voltage is lower than the lower limit value −Vc. Therefore, the voltage regulation circuit 21*c* is switched to the first state (only the first switch SW1 is in ON state), and the oscillation frequency gradually increases and approaches the resonance frequency $f_0$.

Figure 9B:
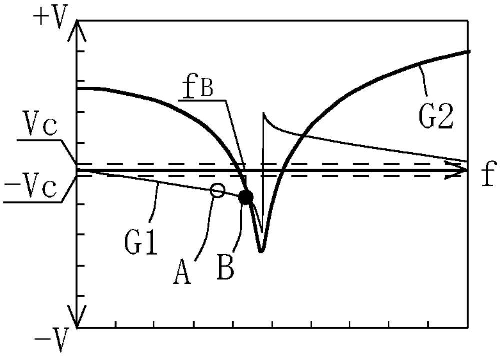
Figure 9C:
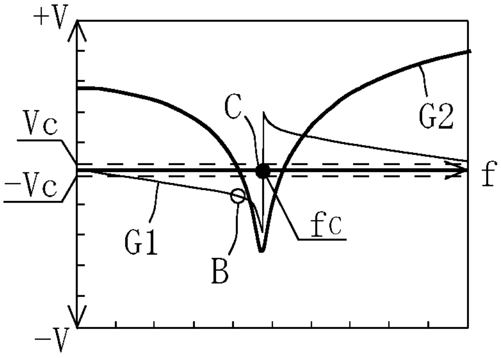

At the time of a second process, it is assumed that the oscillation frequency is $f_B$ (see FIG. 9B). When the second process is performed in this condition, it is detected that the retardation voltage remains lower than the lower limit value −Vc. The voltage regulation circuit 21*c* is maintained in the first state, and the oscillation frequency further approaches the resonant frequency $f_0$. At the time of a third process, it is assumed that the oscillation frequency is fc (see FIG. 9C). When the third process is performed in this condition, it is detected that the phase-difference voltage is between the upper limit value Vc and the lower limit value −Vc. In this case, the voltage regulation circuit 21*c* is switched to the third state (both the switching SW1, SW2 are in OFF state), and the oscillation frequency is held.

Figure 9D:
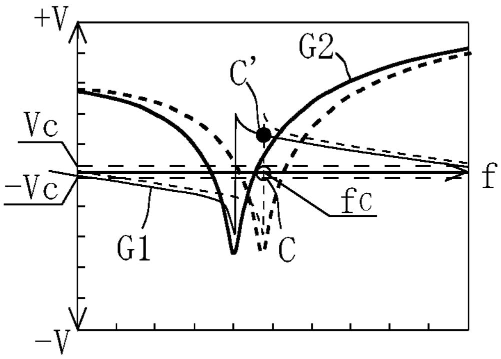

From this condition, as shown in FIG. 9D, it is assumed that the resonant frequency $f_0$ is reduced due to an influence of the object to be heated 20 or the like (assuming that the graphical G1, G2 is moved leftward). The oscillator frequency remains at $f_C$. When a fourth process is performed in this condition, the phase-difference voltage becomes the value on the vertical axis of a detected point C', and it is detected that the phase-difference voltage exceeds the upper limit value Vc. Therefore, the voltage regulation circuit 21*c* is switched to the second state (only the second switch SW2 is in ON state), and the oscillation frequency gradually decreases and approaches the resonance frequency fo.

Figure 9E:
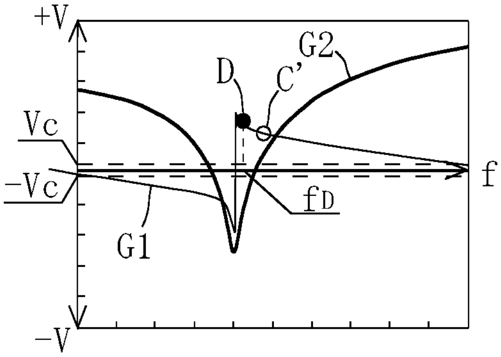
Figure 9F:
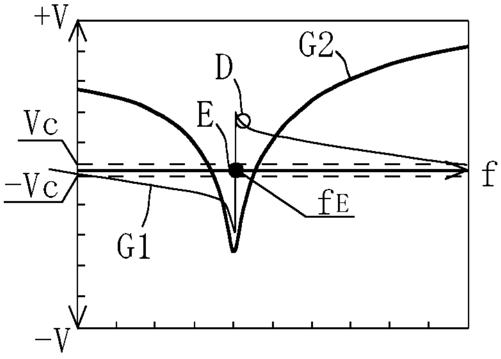

At the time of a fifth process, it is assumed that the oscillation frequency is $f_D$ (see FIG. 9E). When the fifth process is performed in this condition, it is detected that the phase difference remains above the upper limit Vc. The voltage regulation circuit 21*c* is maintained at the second state, and the oscillation frequency further approaches the resonant frequency $f_0$. At the time of a sixth process, it is assumed that the oscillation frequency is $f_E$(see FIG. 9F). When the sixth process is performed in this condition, the voltage regulation circuit 21*c* is switched to the third state and the oscillation frequency is held in the same manner as the third process. In this way, in the control process, the oscillation frequency is adjusted so as to follow the resonant frequency $f_0$.

Effect of the Present Embodiment

In the present embodiment, resonances of high-frequencies occur in the respective tooth portion 31*a*, 32*a* of the radiation antennae 22 during the input period of high-frequency. The strong-electric-field region formed along a large number of tooth portion 31*a*, 32*a* have relatively high electric field strength. According to the present embodiment, it is possible to form the strong-electric-field region at a level at which a high-frequency is easily absorbed by the object to be heated 20 with low power as compared with the case where no resonance occurs.

In the present embodiment, the distance G between the tooth portions 31*a*, 32*a* adjacent to each other in the first direction is not more than five times the line width of the tooth portions 31*a*, 32*a*. Therefore, relatively strong-electric-field couplings occur between adjacent tooth portions 31*a*, 32*a*. Further, in the tooth portion 31*a* and the tooth portion 32*a* which are adjacent to each other, the leading end which becomes an abdomen portion of the standing wave and the root which becomes a node portion of the standing wave are close to each other. Therefore, the electric field strength in the gap between the adjacent tooth portions 31*a*, 32*a* is relatively high. In the arrangement region of the large number of tooth portions 31*a*, 32*a*, the area of the strong-electric-field region is increased, and the strong-electric-field region parallel to the object to be heated 20 and having a small thickness is formed.

Here, when the object to be heated 20 is in the form of a sheet or a film and the surface area is large for its volume, the amount of heat radiation during high-frequency heating is large and it is not easy to raise the temperature of the object to be heated 20. In the present embodiment, in the arrangement region of the large number of tooth portions 31*a*,32*a*, the strong-electric-field region is formed which is parallel to the object to be heated 20 and has a small thickness. In this strong-electric-field region, since many electric force lines are parallel to the object to be heated 20 with sheet-like or film-like shape, high-frequency energy can be concentrated on the object to be heated 20 and the object to be heated 20 can be efficiently heated and physical/chemical reactions can be generated. Further, in the arrangement region of the tooth portions 31*a*, 32*a*, the electric field strength is relatively high even in the gap between the adjacent tooth portions 31*a*, 32*a*, it is possible to continuously heat the object to be heated 20 and therefore and to effectively raise the temperature of the object to be heated 20 having a large surface area for its volume.

Further, in the present embodiment, the tooth portions 31*a* in which the abdomen of the standing wave of high-frequency is formed on one end side in the widthwise direction in the arrangement region (band-shaped region) of the large number of tooth portions 31*a*, 32*a*, and the tooth portions 32*a* in which the abdomen of the standing wave is formed on the other end side are alternately arranged. Thus, in the radiation antenna 22 where four or more tooth portions 31*a*, 32*a* are arranged with a gap in a predetermined direction, two or more strong-electric-field rows in which the strong-electric-field portions of the respective tooth portions 31*a*, 32*a* serving as the abdomen of the standing wave are aligned in the first direction are formed (in the present embodiment, two rows are formed). Therefore, a strong electric field acts on the object to be heated 20 from both sides in the width direction, and the degree of heating of the object to be heated 20 in a plan view can be made uniform.

In the present embodiment, since the input part 30 is provided on the back side of the substrate 23, even when the base material 11 is wide, the input part 30 is not covered with the base material 11, and access to the input part 30 is easy.

Here, in the electromagnetic-wave heating device, it is necessary to take measures to prevent leakage of electromagnetic waves. In the electromagnetic-wave heating device, by providing an introduction portion and a lead-out portion on a shield unit that shields an internal space in which a radiation antenna is disposed from the outside, it is possible for a conveyed object including an object to be heated (for example, an adhesive) to continuously pass through the internal space of the shield unit. Then, by continuous processing, it is possible to heat many objects to be heated in a short time. However, in the case of an device (for example, the device described in JP-A-57-118281) in which an entire conveyed object from an introduction portion toward a lead-out portion passes through an internal space of a shield unit, even when an object to be heated is small with respect to the conveyed object, it is necessary to secure the size of the shield unit.

In contrast, in the present embodiment, the continuous gap 70 in which the side gaps 73 and 74 are connected to each of the introduction portion 71 and the lead-out portion 72 is formed in the shield unit 60. Therefore, not only the base material 11 having a narrow width shown in FIG. 1 but also the base material 11 having such a size that it protrudes outward from the side gaps 73 and 74 as shown in FIG. 5A can convey the base material 11 from the introduction portion 71 toward the lead-out portion 72. At this time, in the internal space 40, the object to be heated 20 can be subjected to heat treatment in the facing region (strong-electric-field region) of the radiation antenna 22. Therefore, it is not necessary to increase the size of the shield unit 60 so that the entire base material 11 can pass through the internal space 40, and the shield unit 60 and the electromagnetic-wave heating device 10 can be made compact. The present embodiment is useful in the case, for example, where the object to be heated 20 is provided only in a part of a conveyed large-sized object 11.

Note that, in FIG. 5A, a portion of the cover 50 upper than the shield member 46 is not shown. The same applies to FIGS. 5B, 16A to 16C, 17A to 17C and 18. The white arrows indicate the wind direction of the air supplied from the blower 35 to the object to be heated 20.

For example, when an adhesive applied to the mouth portion of each of a plurality of envelopes is heated, the plurality of envelopes is conveyed by the base material 11 so that the vertical direction of the envelopes is aligned in the width direction of the base material 11 and the adhesive applied regions in the plurality of envelopes are aligned in a row. In this case, it is not necessary to secure the size of the internal space 40 of the shield unit 60 by the vertical length of the envelope. The shield unit 60 may be sized to match the adhesive applied area.

In the present embodiment, by using a semiconductor oscillator for the oscillator 21, the oscillator 21 can be operated with lower power than when a magnetron is used. As a result, the radiation intensity of the high-frequency can be suppressed low. Further, in the present embodiment, a choke structure 55 is provided so as to face the continuous gap 70. Here, in a microwave oven that uses a magnetron, even if a choke structure is provided, a gap cannot be provided around the door. On the other hand, in the present embodiment, by using the high-frequency resonance structure (radiation antenna 22) and the semiconductor oscillator, the radiation intensity of high-frequency can be suppressed low, and the high-frequency toward the continuous gap 70 becomes weak. Therefore, even if the continuous gap 70 through which the base material (thin material) 11 passes is provided, leakage of the high-frequency can sufficiently be suppressed. Further, in the present embodiment, as the size of the radiation antenna 22 is reduced in accordance with the size of the object to be heated 20, and as the high-frequency is matched (absorbed) with the object to be heated 20, the excess high-frequency is reduced, and therefore, the dimensional accuracy required for the continuous gap 70 passing through the base material 11 (thin object) is reduced in response to the request for suppression of the high-frequency leakage.

In the present embodiment, since the blower 35 is provided, when the object to be heated 20 is dried by heating, the organic solvent or moisture evaporated from the object to be heated 20 can be discharged to the outside of the shield unit 60. In addition, since the internal space 40 is constantly ventilated with dry air having no or little evaporative gas component, the mass transfer (evaporation) rate of the evaporative gas component in the object to be heated 20 to dry air is maintained. According to the present embodiment, when the electromagnetic-wave heating device 10 is used as a drying apparatus, the object to be heated 20 can be dried efficiently.

In the present embodiment, since the blowing direction of the blower 35 faces the downstream side in the first direction, the air in the internal space 40 is discharged to the outside from the lead-out portion 72 or the side gaps 73 and 74. The air in the internal space 40 is hardly discharged from the introduction portion 71. Therefore, it is possible to prevent the exhaust gas from the shield unit 60 from reaching upstream devices.

In the present embodiment, the shield member 46 that passes air and shields a high-frequency is provided in the blowing passage 45 in the cover 50. Thus, the high-frequency hardly reaches the blower 35. Furthermore, high-frequency leakage through the air inlet of the blowing passage 45 can be suppressed.

According to the present embodiment, a phase-difference information representing a phase difference between the incident wave and the reflected wave is generated by arithmetic processing utilizing incident-wave information and reflected-wave information. Then, the control process of detecting the adjustment direction of the oscillation frequency based on the phase-difference signal and reference information (threshold range) and controlling the oscillation frequency based on the detection result is repeatedly performed, whereby the oscillation frequency follows the resonance frequency $f_0$. Here, the above-described arithmetic processing can be performed at a high speed. That is, generation of the phase-difference information can be performed at a high speed. Further, since numerical data of the reference information can be prepared in advance, the adjustment direction of the oscillation frequency can also be detected at a high speed. According to the present embodiment, it is possible to make the oscillation frequency follow the resonance frequency at a high speed.

Hence, in the processing system of the present embodiment, the object to be heated 20 is heated in the conveyance path while the object to be heated 20 is being conveyed. In this case, the resonant frequency $f_0$ is sequentially changed by the presence or absence of the object to be heated 20, a temporal change in the water content in the object to be heated 20, steam generated by the heating or the like. Specifically, the object to be heated 20 is small in weight and lightly loaded, and the resonance frequency $f_0$ changes successively within the resonance mode even in an environment in which the resonance specific mode is maintained in the internal space 40. For example, since a high-frequency is applied to the object to be heated 20 and the relative permittivity decreases with the rise of temperature and the drying of the object to be heated 20, the resonant frequency $f_0$ transitions.

Here, the proportion of the high-frequency energy absorbed by the object to be heated 20 (hereinafter, referred to as "high-frequency energy absorptivity") is maximized at the time of the resonant frequency $f_0$. However, when the resonance frequency $f_0$ changes successively, it is difficult conventionally to make the oscillation frequency follow the resonance frequency $f_0$ at a high speed and therefore keep the high-frequency energy absorptivity at a high value. In addition, the high-frequency is easily leaked into an open space.

On the other hand, in the present embodiment, since the oscillation frequency can be made to follow the resonance frequency $f_0$ at a high speed, even when the object to be heated 20 is heated by the conveyance type mechanism, the high-frequency energy absorptivity can be maintained at a high value, and further, the high-frequency leakage can be suppressed.

Incidentally, the inventor of the present application has confirmed by an experiment of the control period 30 ms that (i) when fixing the oscillation frequency, immediately after the power supply of the electromagnetic-wave heating device 10 is ON, in particular high-frequency energy absorptivity decreases, and (ii) by performing the above-described frequency control from a point of time when the power supply of the electromagnetic-wave heating device 10 is ON, the high-frequency energy absorptivity is greatly improved from the point of time of ON.

Modification 1 of the Embodiment relating to Frequency Control

Modification 1-1

In this modification, the control unit 78 detects a shift direction (deviation direction) of the oscillation frequency with respect to the resonance frequency by utilizing the reference information and the phase-difference information, and performs an averaging processing on the detection result, thereby detecting an adjustment direction of the oscillation frequency. The averaging processing is performed on a result of the comparison operation that compares the threshold range (−Vc to Vc) with the phase difference V. Hereinafter, with reference to FIG. 10, description will be given focusing on differences from the embodiment.

In the present modification, when the phase-difference voltage V falls below the lower limit value −Vc of the threshold range in the first comparison operation, the detection unit 78*a* determines that the phase-difference voltage V is deviated in the negative direction and records the determination result (−X). Further, when the phase-difference voltage V exceeds the upper limit value Vc of the threshold range in the second comparison operation, it is determined that the phase-difference voltage V is deviated in the positive direction, and the determination result (+X) is recorded. Further, when the phase-difference voltage V does not exceed the upper limit value Vc of the threshold value range in the second comparison operation, it is determined that there is no phase shift, and the determination result (±0) is recorded.

The detection unit 78*a* performs an averaging processing of averaging the results of determining comparison operations arranged in time series with predetermined number of samples n of the comparison results. Equation 5 is an exemplary Equation used in the averaging processing for the m-th determination result D(m) to the (m+n−1)-th determination result D(m+n−1). Y represents a calculated value of the averaging processing.

$$Y = \frac{\{D(m) + D(m+1) + D(m+2) \; \ldots . \; + D(m+n-1)\}}{n} \quad \text{Equation 5}$$

Figure 10:
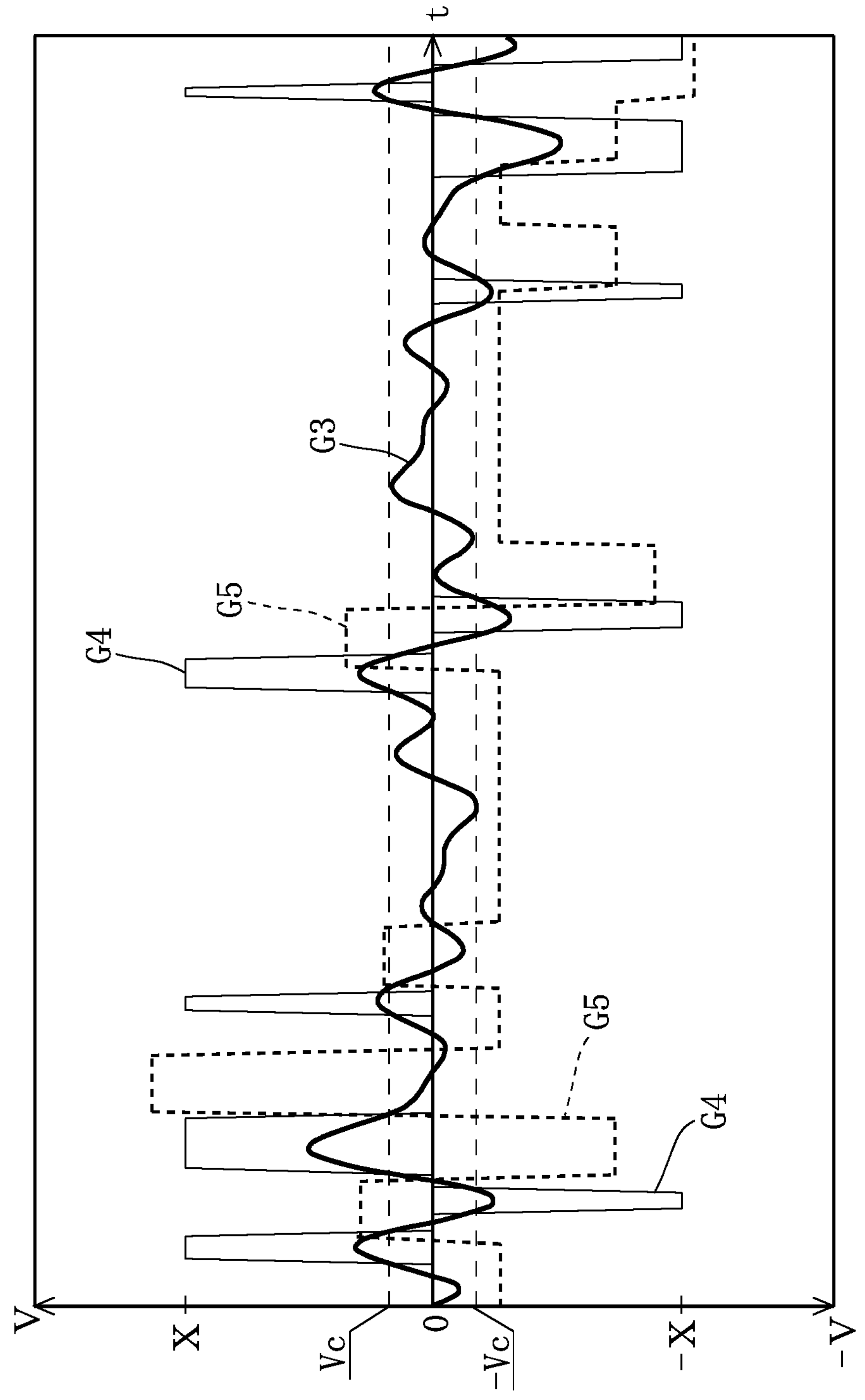
FIG. 10 is a diagram for explaining an averaging processing according to Modification 1-1.

When the calculated value Y of the averaging processing is negative, the detection unit 78*a* causes the first command unit 78*b* to output a ON signal to the first switching SW1. When the calculated value Y is positive, the detection unit 78*a* causes the second command unit 78*c* to output a ON signal to the second switching SW2. In FIG. 10, the graph G3 representing the time-series changes of the phase-difference voltage V and the graph G4 representing the time-series changes of the determination result of the comparison operation and the graph G5 representing the time-series changes of the calculated value Y are superimposed on each other. According to the present modification example, noise can be removed by the averaging processing, and thus the tracking accuracy of the oscillation frequency is improved. Therefore, the high-frequency energy absorptivity increases, and the power required for heating can be reduced.

In this modification, a comparison target of the calculated value Y of the averaging processing may be the threshold range. The detection unit 78*a* causes to output a ON signal to the first switch SW1 when the calculated value Y is lower than the lower limit value −Vc of the threshold range and causes to output a ON signal to the second switch SW2 when the calculated value Y is higher than the upper limit value Vc of the threshold range. In this case, since noise can be removed as compared with the case where the calculated value Y is compared with the threshold value (V=0), power required for heating can be reduced.

Further, the control unit 78 may adjust the number of samples n of the detection results used in the averaging processing based on the conveyance speed of the object to be heated 20. When the conveyance speed is high, the resonant frequency $f_0$ varies finely. Therefore, the higher the conveyance speed is, the smaller the number-of-samples n is made, so that finer follow-up control is performed. Note that the control period S may be adjusted based on the conveyance speed, and the more the control period S may be increased for noise removal, the higher the conveyance speed is.

Modification 1-2

In the present modification, the control unit 78 detects an adjustment amount (or a deviation amount) of the oscillation frequency in addition to the adjustment direction of the oscillation frequency based on the reference information and the phase-difference information. In this case, the adjustment amount of the oscillation frequency can be detected based on the magnitude of the phase-difference voltage V (the difference between the phase-difference information and the reference information). For example, the larger the difference between the phase-difference voltage V and zero, the smaller the adjustment amount of the oscillation frequency. In this modification, the control unit 78 adjusts the oscillation frequency in the adjustment direction in accordance with the adjustment amount, so that the oscillation frequency can be made to follow the resonance frequency $f_0$ at a higher speed.

Modification 1-3

This modification differs from the embodiment in the configuration of the control device 75.

Figure 11:
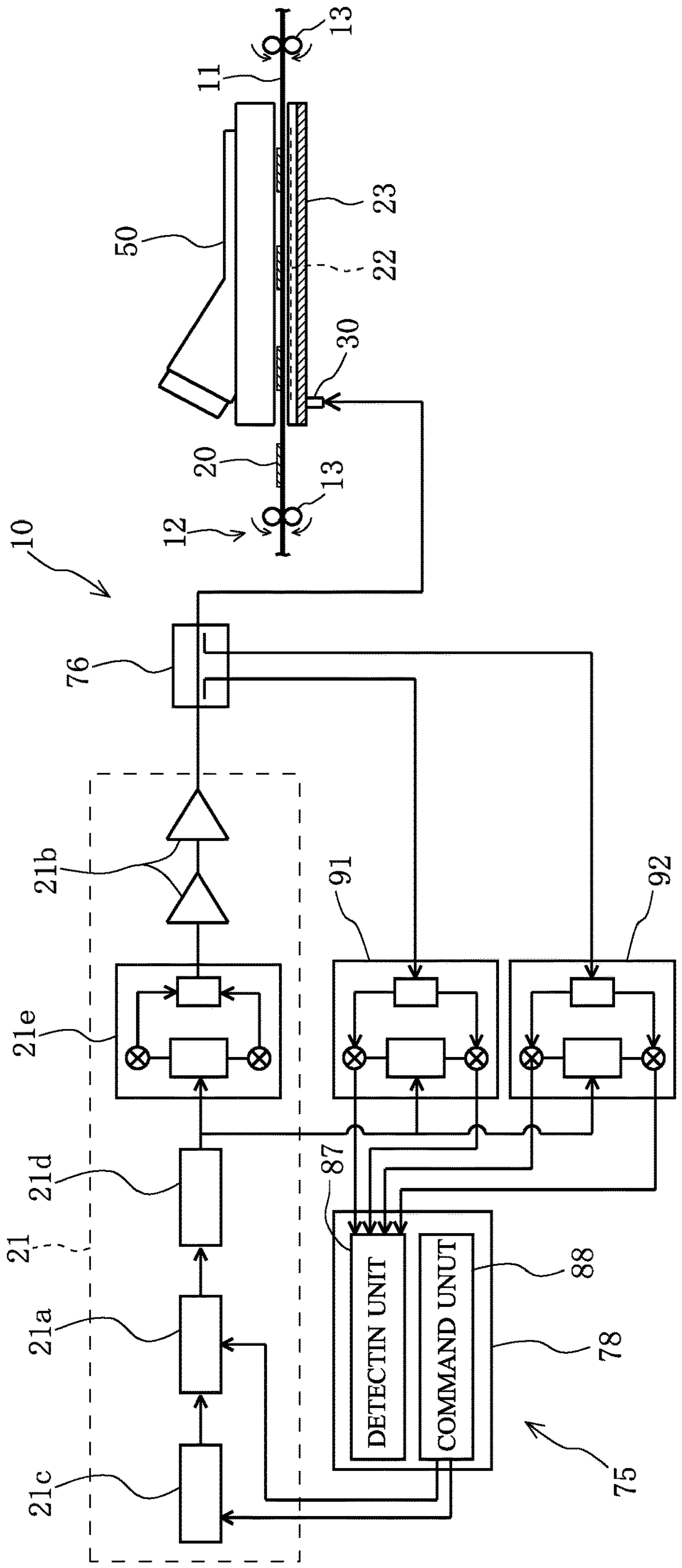
FIG. 11 is a schematic circuit diagram of an electromagnetic-wave heating device according to Modification 1-3.

As shown in FIG. 11, the oscillator 21 includes a voltage variable oscillator 21*a*, a synthesizer 21*d* provided after the voltage variable oscillator 21*a*, a quadrature modulator 21*e* provided after the synthesizer 21*d*, an amplifier 21*b* provided after the quadrature modulator 21*e* and a voltage regulation circuit 21*c*. In this modification, the voltage regulation circuitry 21*c* is comprised of DA converters.

When a high-frequency $f_{Vc0}$ is inputted from the voltage variable oscillator 21*a*, the synthesizer 21*d* outputs a high-frequency of which frequency f($f=f_{Vc0}+R$) is obtained by adding the register value R to the frequency $f_{Vc0}$. The synthesizer 21*d* is provided with a register (not shown) for recording and updating the register R. In the present modification, the oscillation frequency of the oscillator 21 is a frequency of the high-frequency outputted from the synthesizer 21*d*.

Further, the quadrature modulator 21*e* modulates the high-frequency output from the synthesizer 21*d* into a first I component signal and a first Q component signal, and outputs the modulated signals to the amplifier 21*b*. The oscillator 21 outputs a quadrature-modulated high-frequency.

The control device 75 includes a directional coupler 76, a first quadrature demodulation unit 91, a second quadrature demodulation unit 92 and a control unit 78. The first quadrature demodulation unit 91 and the second quadrature demodulation unit 92 constitute the quadrature demodulation unit.

The first quadrature demodulator 91 demodulates the incident-wave signal into the first I component signal and the first Q component signal. The second quadrature demodulator 92 demodulates the reflected-wave signal into a second I component signal and a second Q component signal. Synchronization signals for synchronizing with the quadrature modulator 21*e* are inputted to the quadrature demodulators 91 and 92 from the synthesizer 21*d*.

The control unit 78 is configured to repeatedly perform a control process. In the control process, information generation operation of generating phase-difference information representing a phase difference between an incident wave and a reflected wave on the basis of a demodulated incident-wave signal (the first I component signal and the first Q component signal) and a demodulated reflected-wave signal (the second I component signal and the second Q component signal), a direction detection operation of detecting an adjustment direction of an oscillation frequency in which the difference between the resonance frequency $f_0$ and the oscillation frequency of the oscillator 21 in the radiation antenna 22 is reduced based on the phase-difference information and a frequency adjustment operation of adjusting the oscillation frequency based on the detection result of the direction detection operation are performed. The control unit 78 can be constituted by, for example, a microcomputer. A control program is installed in the control unit 78. The control unit 78 includes a detection unit 87 and a command unit 88 as functional blocks realized by CPU executing and interpreting the control program.

The detection unit 87 performs the information generation operation and the direction detection operation. The detection unit 87 also serves as the phase information generation unit. In the detection unit 87, by the arithmetic processing utilizing the first I component signal and the first Q component signal, the second I component signal and the second Q component signal, a phase difference calculation value PDC representing the phase difference (θ1−θ2) of the incident wave and the reflected wave is calculated as the phase-difference information. Then, the adjustment direction of the oscillation frequency is detected based on the phase difference calculation PDC.

For example, the detection unit 87 calculates an incident-wave information NPA and a reflected-wave information NPB by performing the arithmetic processing shown in Equation 6 and Equation 7, and then performs the calculation (complex division (multiplication of conjugate complex numbers)) shown in Equation 8 to calculate the phase difference calculation value PDC as a value obtained by dividing the reflected-wave information NPB with the incident-wave information NPA.

In Equations 6 and 7, the first I component signal is represented by Acos(ωt+θ1), the first Q component signal is represented by Aisin(ωt+θ1), the second I component signal is represented by Bcos(ωt+θ2), and the second Q component signal is represented by Bisin(ωt+θ2). α=ωt+θ1 and R=ωt+θ2.

$$NPA=A\{\cos(\omega t+\theta 1)+i\sin(\omega t+\theta 1)\} \quad \text{Equation 6}$$

$$NPB=B\{\cos(\omega t+\theta 2)+i\sin(\omega t+\theta 2)\} \quad \text{Equation 7}$$

$$PDC = NPB/NPA \quad \text{Equation 8}$$

$$= \frac{B\{(\cos\alpha\cos\beta+\sin\alpha\sin\beta)+i(\sin\alpha\cos\beta-\cos\alpha\sin\beta)\}}{A\{\cos^2\alpha+\sin^2\alpha\}}$$

-continued $$= \frac{B\{(\cos(\alpha-\beta)+i\sin(\alpha-\beta)\}}{A}$$

$$= \frac{B\{(\cos(\theta 1-\theta 2)+i\sin(\theta 1-\theta 2)\}}{A}$$

The operation of the control unit 78 will be described with reference to the flowchart of FIG. 12. In the present modification, before the conveyance of the object to be heated 20 is started, a search control is performed to search for a band in which reflected-wave intensity is lower than a predetermined determination level k within a frequency band (hereinafter, referred to as an "oscillatable band") in which the oscillator 21 can oscillate, and then frequency control is performed.

Search Control

Figure 12A:
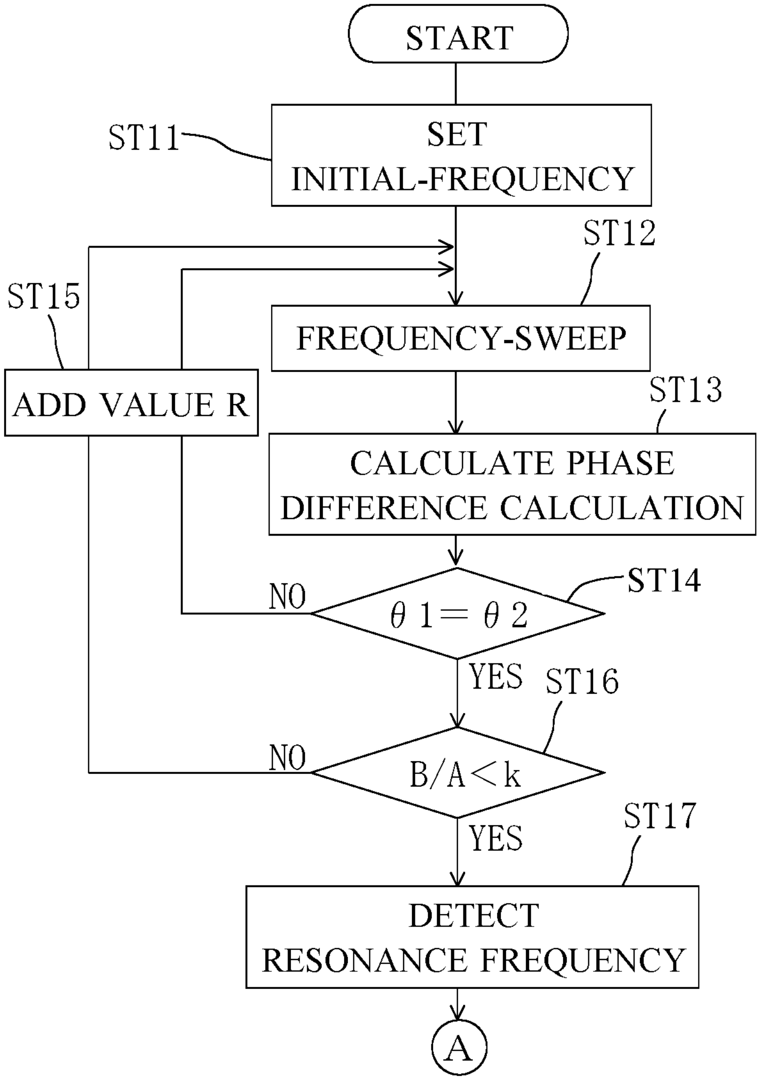
FIGS. 12A and 12B are flowcharts of processes performed by a control unit of the electromagnetic-wave heating device according to Modification 1-3.

FIG. 12A is a flowchart of the search control. In the search control, in a step ST11, the control unit 78 sets an initial-frequency fi (for example, a lower limit of the oscillatable band) of the oscillator 21, and starts oscillation of a high-frequency by the oscillator 21. Next, in a step ST12, the controller 78 causes the oscillator 21 to perform a frequency-sweep. A bandwidth (fi to fi+Δf) over which frequency-sweep takes place is equal to an initial value of the resister value R.

Here, during a period in which a high-frequency is oscillated from the oscillator 21, the first I component signal and the first Q component signal demodulated by the first quadrature demodulating unit 91, and the second I component signal and the second Q component signal demodulated by the second quadrature demodulating unit 92 are inputted to the detection unit 87 as consecutive signals. In the detection unit 87, each of the I component signals and the Q component signals is digitally converted.

Figure 13:
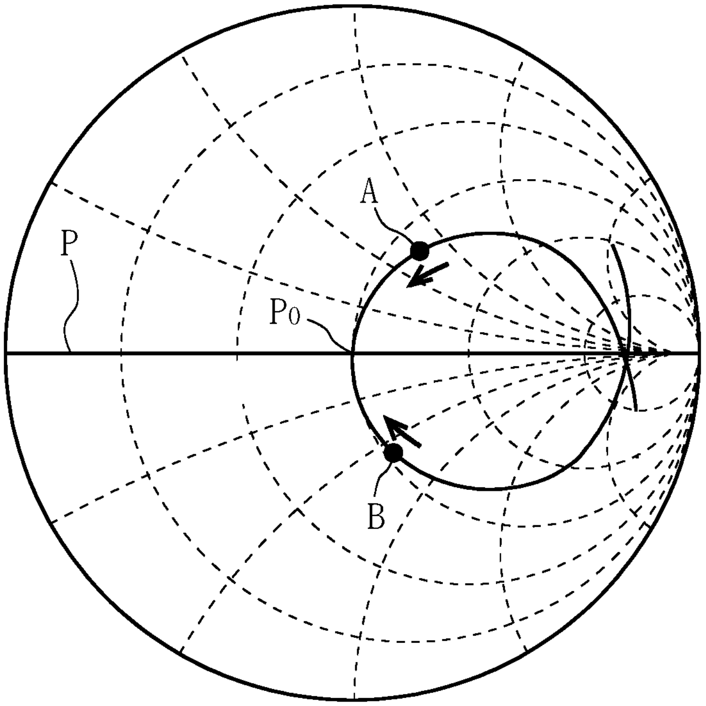
FIG. 13 is a diagram (Smith chart) for explaining how an oscillation frequency is made to follow a resonance frequency.

In a step ST13, the detection unit 87 calculates the phase difference calculation PDC by the calculation of Equations 6 to 8 at a predetermined calculation cycle during a period in which the frequency-sweep is performed. The calculated phase difference calculation PDC represents a coordinate value of the complex plane of the Smith-chart shown in FIG. 13. A step ST14 is performed after frequency-sweep has ended. In the step ST14, the detection unit 87 determines whether or not there is a coordinate value (a coordinate value on the center line P passing through the center point Po in the Smith-chart) in which an incident-wave phase θ1 and a reflected-wave phase θ2 are equal among coordinate values (hereinafter, referred to as "calculated coordinate values") represented by a plurality of phase difference calculated values PDC calculated in the predetermined calculation cycle. In FIG. 13, a region above the center line P is 0 to π/2, and a region below the center line P is −π/2 to 0.

If there is no coordinate value in which the phase θ1 and the phase θ2 are equal in the step ST14, there is no resonant frequency $f_0$ within the band in which the frequency-sweep is performed, and therefore, the process returns to the step ST12 after adding a predetermined value Δf (the above-described bandwidth) to the resister value R in a step ST15. The resister value R is Δf×2. In the step ST12, the control unit 78 causes the oscillator 21 to perform the frequency-sweep in the upper band ($f_i$+Δf to $f_i$+Δf×2) adjacent to the band in which the frequency-sweep has performed immediately before.

On the other hand, when there is a coordinate value in which the phase θ1 and the phase θ2 are equal in the step ST14, since there is the resonance frequency $f_0$ within the band in which the frequency-sweep is performed, in a step ST16, the detection unit 87 determines whether or not the reflection coefficient B/A in the resonance frequency $f_0$ in which the phase θ1 and the phase θ2 are equal is lower than a determination level k. The determination level k is stored in advance in the control unit 78.

When the reflection coefficient B/A does not fall below the determination level k in the step ST16, the reflected-wave intensity is not small in the resonance frequency $f_0$ within the band where the frequency-sweep is performed, and therefore, the process returns to the step ST12 after adding the predetermined value Δf to the resister value R in the step ST15. On the other hand, when the reflection coefficient B/A is lower than the determination level k in the step ST16, a band in which the reflected-wave intensity is small is found in the resonance frequency $f_0$, and therefore, after detecting the resonance frequency $f_0$ of the band in which the frequency-sweep has performed as a step ST17, the search control is terminated and the frequency control is started.

Frequency Control

Figure 12B:
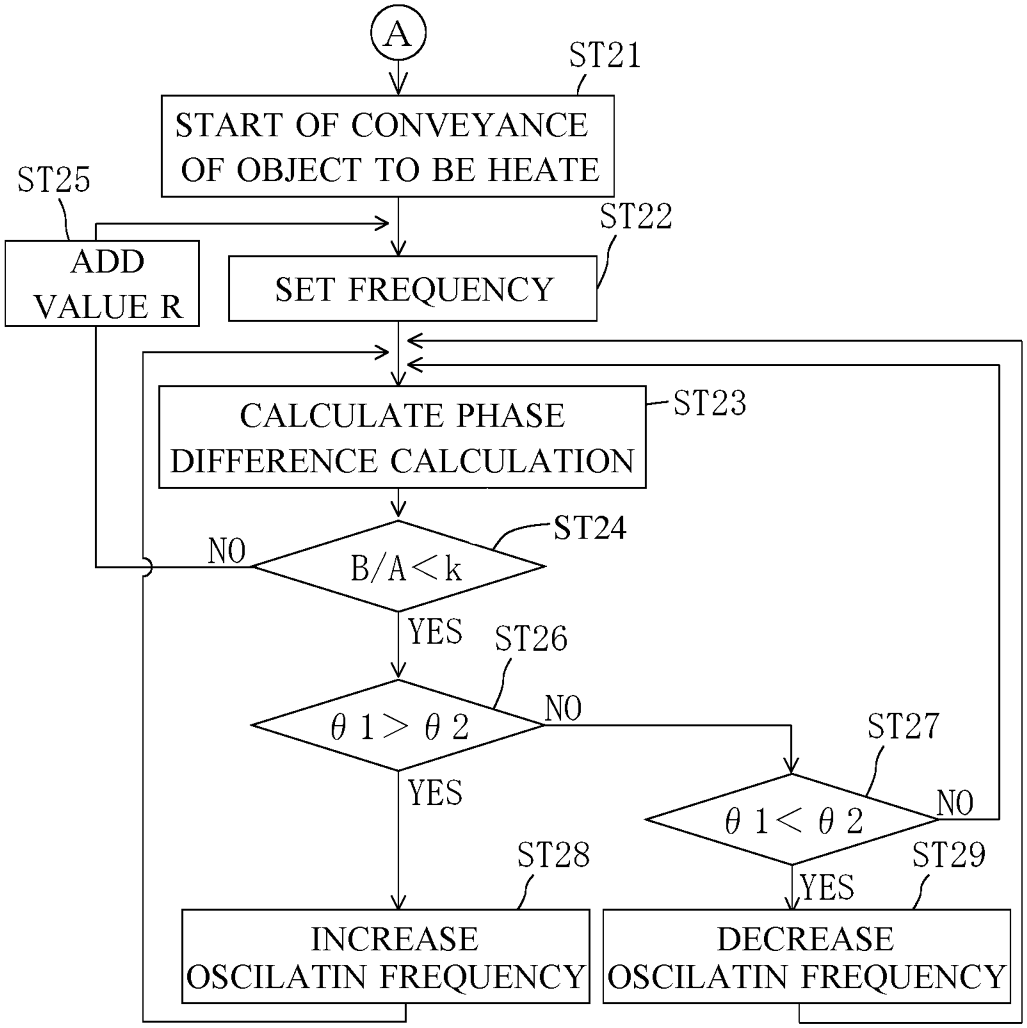

FIG. 12B is a flowchart of the control process configuring the frequency control. In the flow chart, a step ST23 corresponds to the information generation operation, steps ST26 to ST27 correspond to the direction detection operation, and steps ST28 to ST29 correspond to the frequency adjustment operation.

In the frequency control, in a step ST21, the power supply of the conveyance device 12 is switched ON, and the conveyance of the object to be heated 20 is started. Next, in a step ST22, the control unit 78 sets the oscillation frequency f of the oscillator 21 to the resonance frequency $f_0$ detected in the step ST17. In the step ST23, the detection unit 87 calculates the phase difference calculation PDC by calculation of Equations 6 to 8 utilizing the first I component signal, the first Q component signal, the second I component signal and the second Q component signal at that time.

Next, in the ST24 of steps, the detection unit 87 determines whether or not the reflection coefficient B/A is lower than the determination level k. When the reflection coefficient B/A does not fall below the determination level k in the step ST24, the predetermined value Δf is added to the resister value R in the step ST25, and then the process returns to the step ST22. This makes possible to move to another band when the reflected-wave strength in not small due to the variation of the resonant-frequency $f_0$.

On the other hand, when the reflection coefficient B/A is lower than the determination level k in the step ST24, in step ST26, the detection unit 87 determines whether or not the calculated coordinate value is in the positive phase (that is, whether or not θ1>θ2) as the first comparison operation of comparing the calculated coordinate value represented by the phase difference calculation PDC with the reference information representing the center line P of the Smith chart.

When a condition θ1>θ2 is satisfied in the step ST26, the calculated coordinate value (for example, position A in FIG. 13) is in the range of 0 to π/2. Then, the process proceeds to the step ST28, and the command unit 88 increases the oscillation frequency by a predetermined addition frequency p (for example, p=1 MHz) via the voltage regulation circuit 21*c*. As a result, the oscillation frequency of the oscillator 21 approaches the resonant frequency $f_0$. The phase calculation value A moves in the direction of the arrow. After the step ST28 is executed, the process returns to the step ST23.

On the other hand, when the condition θ1>θ2 is not satisfied in the step ST26, the process proceeds to the step ST27, and the detection unit 87 determines whether or not the calculated coordinate value is in the range of −π/2 to 0 (that is, whether or not θ1<θ2) as the second comparison operation. When the condition θ1<θ2 is satisfied in the step ST27, the calculated coordinate value (for example, position B in FIG. 13) is in the range of −π/2 to 0. In this case, the process proceeds to the step ST29, and the command unit 88 reduces the oscillation frequency by a predetermined subtracting frequency q (for example, q=1 MHz) via the voltage regulation circuit 21*c*. As a result, the oscillation frequency of the oscillator 21 approaches the resonant frequency $f_0$. The phase calculation value B moves in the direction of the arrow After the step ST29 is executed, the process returns to the step ST23.

When the condition θ1<θ2 is not satisfied in the step ST27, the coordinate value is on the center line P. In this case, the process returns to the step ST23. The oscillation frequency is maintained at the same value.

Effect of Modification 1-3

According to the present modification, a phase-difference information representing a phase difference between the incident wave and the reflected wave is generated by digital arithmetic processing utilizing incident-wave information and reflected-wave information. Then, the control process of detecting an adjustment direction of the oscillation frequency based on the phase-difference signal and reference information (information of the center line P) and controlling the oscillation frequency based on the detection result is repeatedly performed, whereby the oscillation frequency follows the resonance frequency $f_0$. Here, the above-described arithmetic processing can be performed at a high speed. Further, since numerical data of the reference information can be prepared in advance, the adjustment direction of the oscillation frequency can also be detected at a high speed. According to the present disclosure, it is possible to make the oscillation frequency follow the resonance frequency at a high speed.

Modification 1-4

Figure 14:
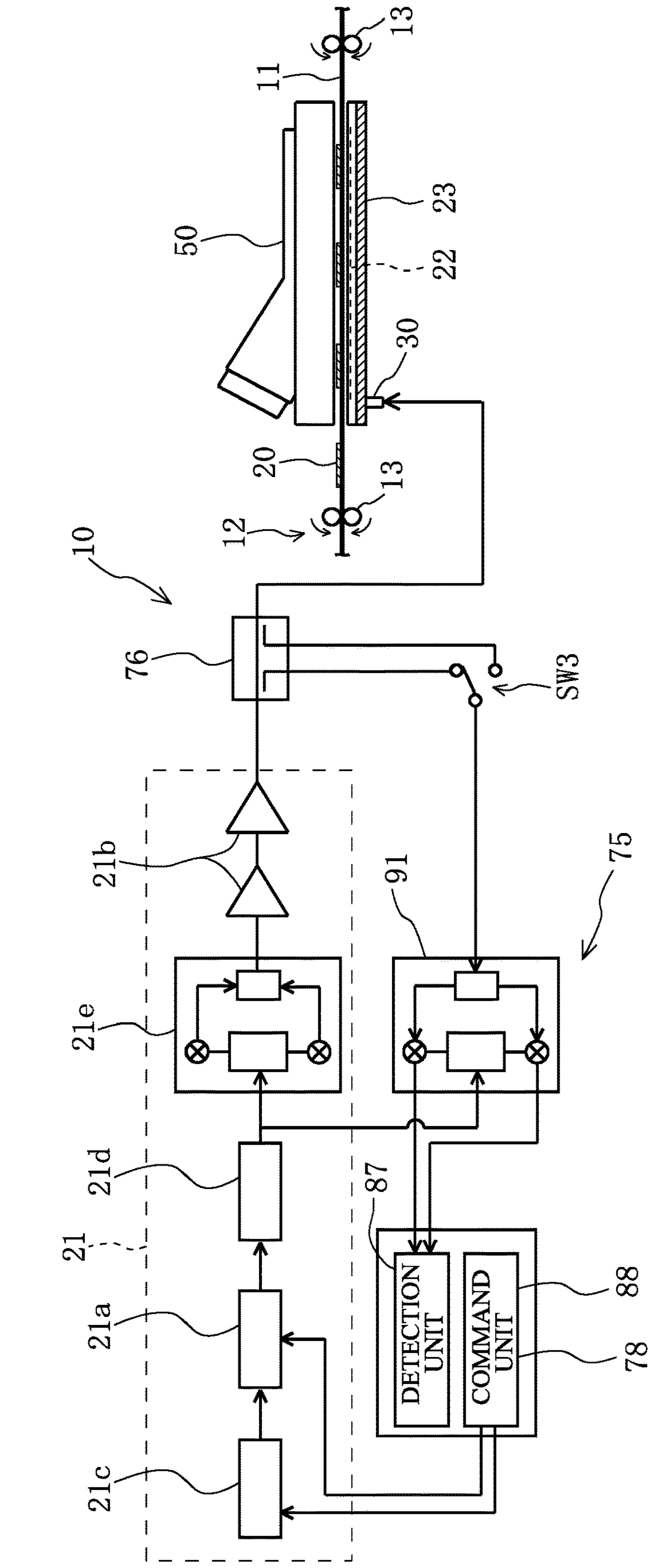
FIG. 14 is a schematic circuit diagram of an electromagnetic-wave heating device according to Modification 1-4.

This modification is a variation of Modification 1-3. In this modification, as shown in FIG. 14, the quadrature demodulator includes one quadrature demodulator 91 and a changeover SW3 that switches between a first period in which the incident-wave signal is input to the quadrature demodulator 91 from the directional coupler 76 and a second period in which the reflected-wave signal is input to the quadrature demodulator 91 from the directional coupler 76. The changeover switch SW3 is switched at a predetermined switching cycle by the control unit 78. For example, the switching cycle is equal to or less than half of a generation cycle of the phase-difference information.

In this modification, in the first half of the above-described step ST23, the changeover switch SW3 is switched to a contact on the incident-wave signal side and it becomes the first period. In the quadrature demodulator 91, the incident-wave signal is demodulated into the first I component signal and the first Q component signal. In the second half of the step ST23, the changeover switch SW3 is switched to a contact on the reflected-wave signal side, and it becomes the second time. In the quadrature demodulator 91, the reflected-wave signal is demodulated into the second I component signal and the second Q component signal. Then, the detection unit 87 calculates the phase difference calculation PDC by arithmetic processing of Equations 6 to 8. According to this modification, the configuration of the quadrature demodulator can be simplified.

Modification 1-5

Figure 15:
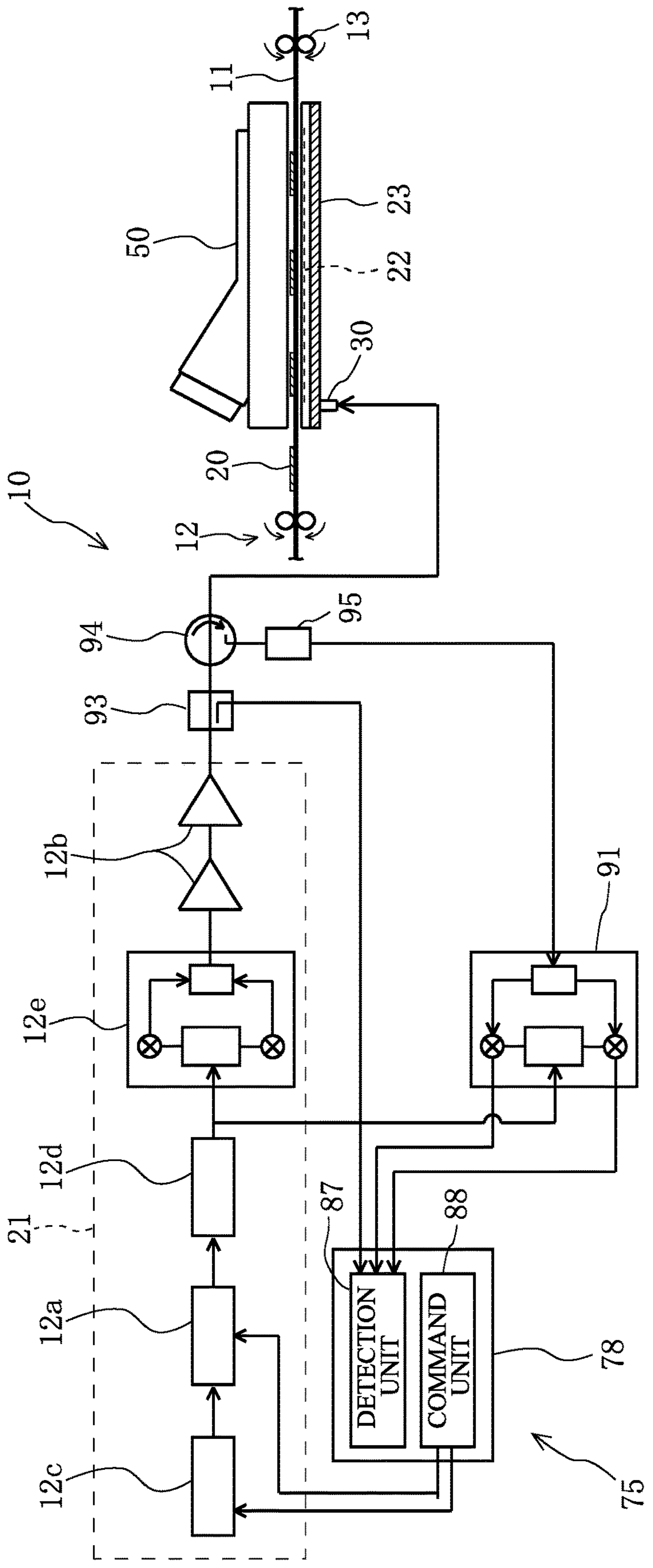
FIG. 15 is a schematic circuit diagram of an electromagnetic-wave heating device according to Modification 1-5.

This modification is a variation of Modification 1-3. In this modification, as shown in FIG. 15, a coupler 93 is provided in order to extract the incident-wave signal from the transmission line 16, and an isolator 94 is provided in order to extract the reflected-wave signal from the transmission line 16. The isolator 94 is a circulator type isolator.

The incident-wave signal extracted by the coupler 93 is input to the control unit 78 without being demodulated. The control unit 78 detects the strength A of the incident-wave signal amplified by the amplifier 21*b* based on the incident-wave signal. The intensity A is used to calculate the above-described reflection coefficient B/A.

The reflected-wave signal extracted by the isolator 94 is input to the quadrature demodulator 91 via the attenuator 95. In the present modification, the quadrature demodulation unit is composed of one quadrature demodulator 91. In the quadrature demodulator 91, the reflected-wave signal is demodulated into the second I component signal and the second Q component signal. The second I component signal and the second Q component signal demodulated by the quadrature demodulator 91 are inputted to the control unit 78.

In the present modification, the control unit 78 is configured to generate phase-difference information by utilizing the incident-wave information (the incident-wave information derived from the oscillation information) of the phase at the output timing of the high-frequency of the oscillator 21. Specifically, the control unit 78 performs the arithmetic processing of Equations 6 to 8 utilizing the first I component information and the first Q component information of the incident-wave information derived from the oscillation information, and the second I component information and the second Q component information demodulated by the quadrature demodulator 91, and calculates the phase difference calculation value PDC. In the arithmetic processing, the control unit 78 corrects the phase shift of the incident-wave information with respect to the reflected-wave information before the arithmetic processing. By this correction, the phase deviation between the phase of the incident wave output from the oscillator 21 and the reflected-wave signal extracted by the isolator 94 is corrected.

Modification 1-6

In the present modification, the control unit 78 performs the above-described frequency control during an initial heating period in which the first object to be heated 20 passes through the strong-electric-field region, and sequentially records the adjustment history of the oscillation frequency (adjustment direction in each control process) in the memory as the control history information of the frequency control, and performs the frequency control utilizing the control history information recorded in the memory during the period in which the object to be heated 20 passing through the strong-electric-field region is heated after the recording.

As the control history information, the history of the resonant frequency $f_0$ calculated from the phase-difference information and the oscillation frequency, or the history of the oscillation frequency (e.g., voltage information indicating the frequency) of the oscillator 21 may be recorded. Further, in the frequency control utilizing the control history information, the oscillation frequency of the history information may be applied as it is, but a frequency obtained by correcting the oscillation frequency of the history information utilizing the phase-difference voltage V sequentially detected by the detection unit 78*a* may be given to the oscillator 21.

Further, an object detection sensor (for example, a light receiving element or an imaging element) for detecting the presence or absence of the object to be heated 20 may be provided in the internal space 40, and the control history information may be recorded together with time elapsed information from a heating start time of the object to be heated 20 (for example, a time at which the object to be heated 20 reaches a position upstream of the radiation antenna 22). In the frequency control utilizing the control history information, the object detection sensor detects a heating start timing of the next object to be heated 20, and the frequency control is started from the detection timing.

Modification 1-7

In this modification, in order to correct the phase shift due to a floating reactance generated in the radiation antenna 22, phase modulation may be performed on the high-frequency oscillated from the oscillator 21 by an amount of a correction phase angle for correcting a difference between a frequency at which the reflection coefficient (reflected-wave power) indicates a minimum value and a frequency at a phase angle of 0°, in the stage of setting the electromagnetic-wave heating device 10. Thus, the electromagnetic-wave heating device 10 can be shipped in a state in which the minimum value of the resonance impedance in the reflected-wave signal demodulated by the demodulation unit is matched with the phase angle of 0°.

Modification 1-8

In the present modification, each object to be heated 20 is ink printed on the base material 11, and the control unit 78 detects the amount of ink of each object to be heated 20 utilizing, for example, a measured value of a light-receiving sensor using a light-receiving element. The amount of ink can be detected with, for example, an integrated value (integrated value of the amount of light) of the measured value of the light-receiving sensor in the passage period of the object to be heated 20.

The control unit 78 controls the output of the oscillator 21 based on the detection-value VI of ink amount. Here, by utilizing the phase-difference information, the amount of high-frequency energy P absorbed by the object to be heated 20 per unit time can be estimated. The control unit 78 estimates the high-frequency-energy-quantity Pt absorbed by the object to be heated 20 by integrating the phase-difference information over the elapsed time from the start of heating of the object 20. Then, by comparing the detection value VI of ink amount with the high-frequency energy-amount Pt, the output of the oscillator 21 is increased or decreased.

For example, the output of the oscillator 21 can be stopped at a timing when the calculated value T of Equation 9 exceeds a predetermined drying threshold value, and the output of the oscillator 21 can be adjusted so that the calculated value T becomes the drying threshold value at a timing when the object to be heated 20 reaches the downstream end of the radiation antenna 22. In Equation 9, K is a drying coefficient that is set according to the object to be heated 20.

$$T=(Pt\times K/VI) \qquad \text{Equation 9}$$

Note that a measured value of a humidity sensor that detects the humidity of the air in the internal space 40 or the air discharged from the internal space 40 may be used for the output control of the oscillator 21. When the measured humidity by the humidity sensor is higher than the predetermined value, the control unit 78 determines that drying of the object to be heated 20 is proceeding early, decreases the output of the oscillator 21, and when the measured humidity by the humidity sensor is lower than the predetermined value, determines that drying of the object to be heated 20 is delayed, and increases the output of the oscillator 21.

Other Modifications on Frequency Control

In the above-described embodiments and modifications (hereinafter, referred to as "embodiments and the like"), the control unit 78 estimates a heating progress degree of the object to be heated 20 with respect to a target heating condition of the object to be heated 20, and adjusts the width of the threshold-range (−Vc to Vc) based on the estimation result. In this case, the heating progress degree of the object to be heated 20 can be calculated as an estimated value by utilizing the integrated value of the measured values by the humidity sensor, the high-frequency energy amount Pt absorbed by the object to be heated 20, the detected amount VI of ink and the like. The target heating condition of the object to be heated 20 can be prepared as a threshold value in advance. In addition, when the estimated value of heating progress degree of the object to be heated 20 is small, it may be determined that it is not a band in which the reflected-wave intensity is small, and move to another band is executed.

In the above-described embodiment and the like, when the object to be heated 20 is ink printed by a printer, the control unit 78 may use the print pattern information of the object 20 to adjust the control parameter of the control process. For example, depending on the resolution of the print pattern, the control period S, the width of the threshold-range (−Vc to Vc) or the number of samples n for averaging processing can be increased or decreased. When the resolution is high, the resonant frequency $f_0$ may vary finely, so that the higher the resolution, the shorter the control period S, the narrower the width of the threshold-range, and the smaller the number of samples n.

Modification 2 of the Embodiment Relating to the Shield Unit

Modification 2-1

Figure 16A:
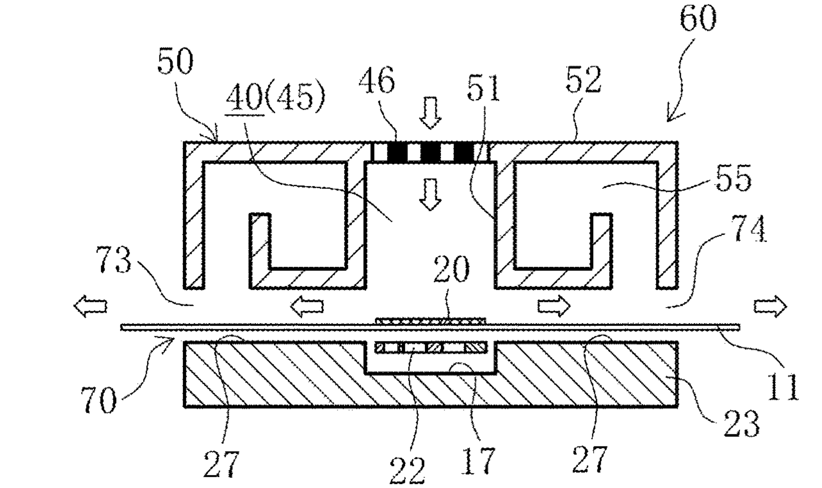
FIG. 16A is a cross-sectional view of an electromagnetic-wave heating device according to Modification 2-1.

In the present modification, as shown in FIG. 16A, the spiral direction of the cavity of the choke structure 55 is opposite to that of FIG. 5 described above.

Modification 2-2

Figure 16B:
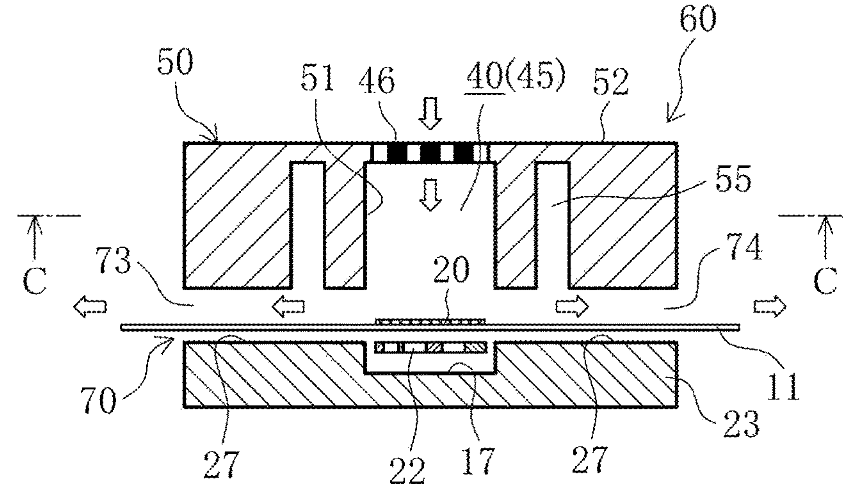
FIG. 16B is a cross-sectional view of an electromagnetic-wave heating device according to Modification 2-2.

In the present modification, the choke structure 55 is a straight choke groove in a cross-sectional view, as shown in FIG. 16B.

Modification 2-3

Figure 16C:
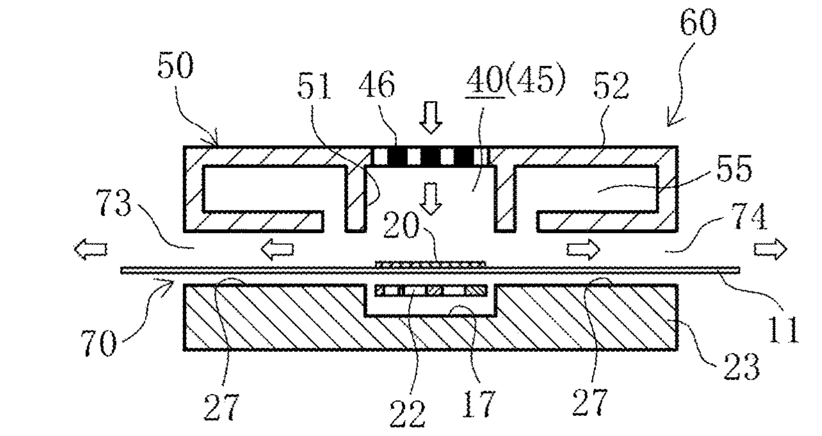
FIG. 16C is a cross-sectional view of an electromagnetic-wave heating device according to Modification 2-3.

In the present modification, as shown in FIG. 16C, the height of the outer peripheral portion 52 is about half of that of the above-described embodiment. Further, the shape of the cavity in the choke structure 55 in a cross-sectional view extends straight outward from an opening facing the flat region 27.

Modification 2-4

Figure 17A:
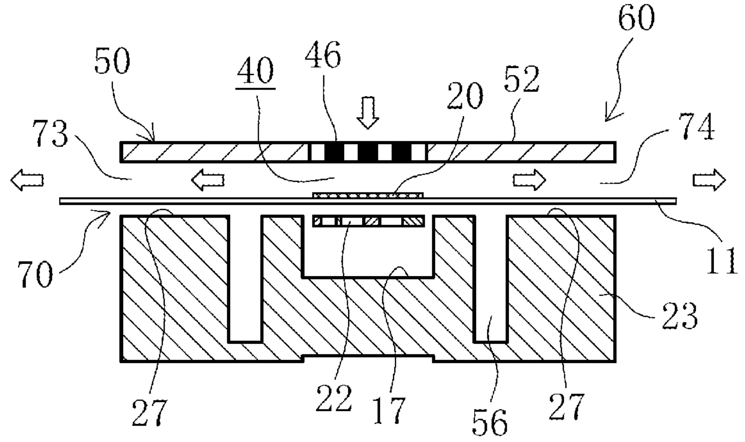
FIG. 17A is a cross-sectional view of an electromagnetic-wave heating device according to Modification 2-4.

In this modification, as shown in FIG. 17A, the choke structure 56 is provided on the substrate 23 side instead of the cover 50.

Modification 2-5

Figure 17B:
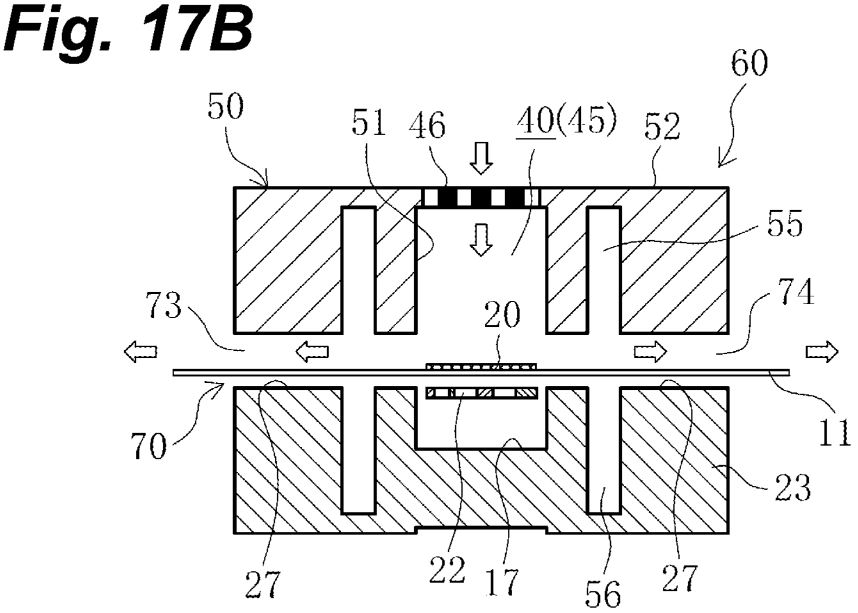
FIG. 17B is a cross-sectional view of an electromagnetic-wave heating device according to Modification 2-5.

In the present modification, as shown in FIG. 17B, the choke structures 55 and 56 are provided on the cover 50 and the substrate 23, respectively.

Modification 2-6

Figure 17C:
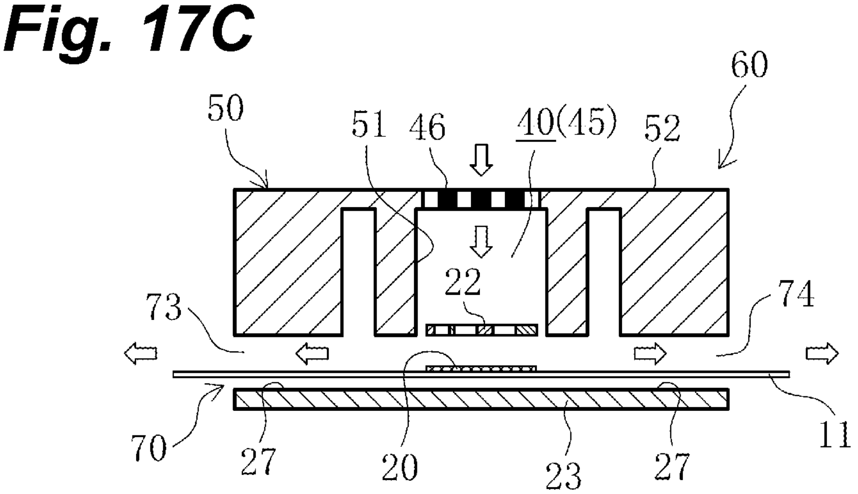
FIG. 17C is a cross-sectional view of an electromagnetic-wave heating device according to Modification 2-6.

In this modification, as shown in FIG. 17C, the radiation antenna 22 is provided and supported on the cover 50 side. The radiation antenna 22 is electrically insulated from the cover 50 and is suspended by a support member (not shown). The radiation antenna 22 is disposed at the outlet of the blowing passage 45. In the present modification, since air passes through the radiation antenna 22 that generate heat by energization and the air receives heat, the drying efficiency can be improved in the drying step.

Modification 2-7

Figure 18:
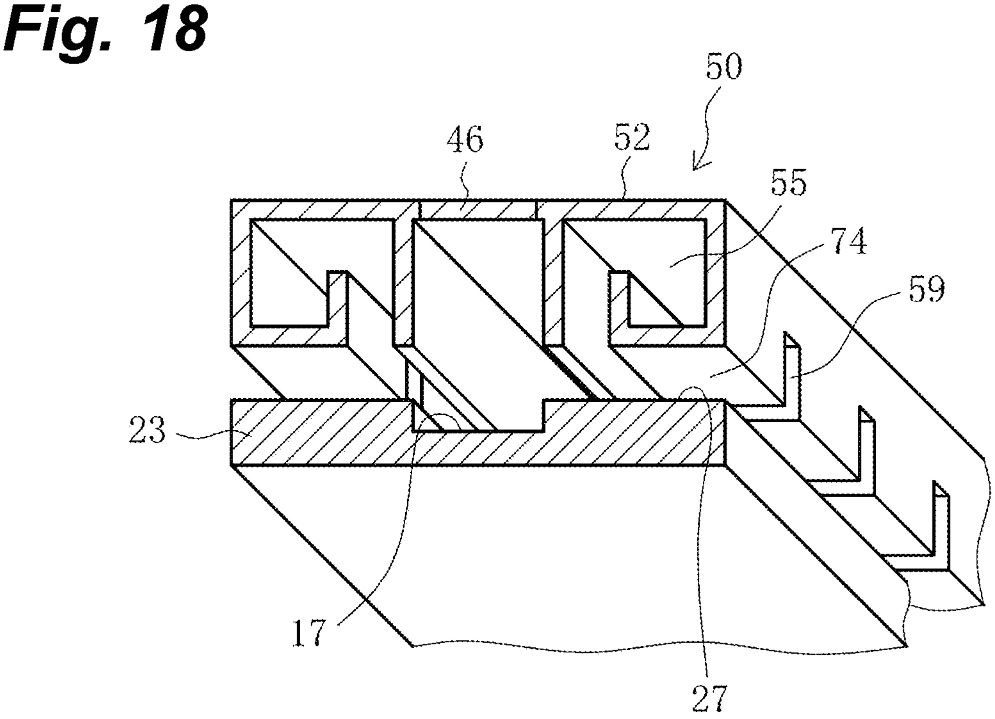
FIG. 18 is a perspective view of an electromagnetic-wave heating device according to Modification 2-7 as viewed obliquely from below.

In this modification, as shown in FIG. 18, a plurality of slits 59 are provided in the choke structure 55 of the cover 50. The distance between the plurality of adjacent slits 59 may be, for example, about one-twentieth of the electric length λ. By providing the slits 59, high-frequency leakage can be effectively suppressed, for example, when a plurality of modes occurs in the internal space. In FIG. 18, through-holes 46*a* of the shield member 46 is omitted.

Modification 2-8

Figure 19:
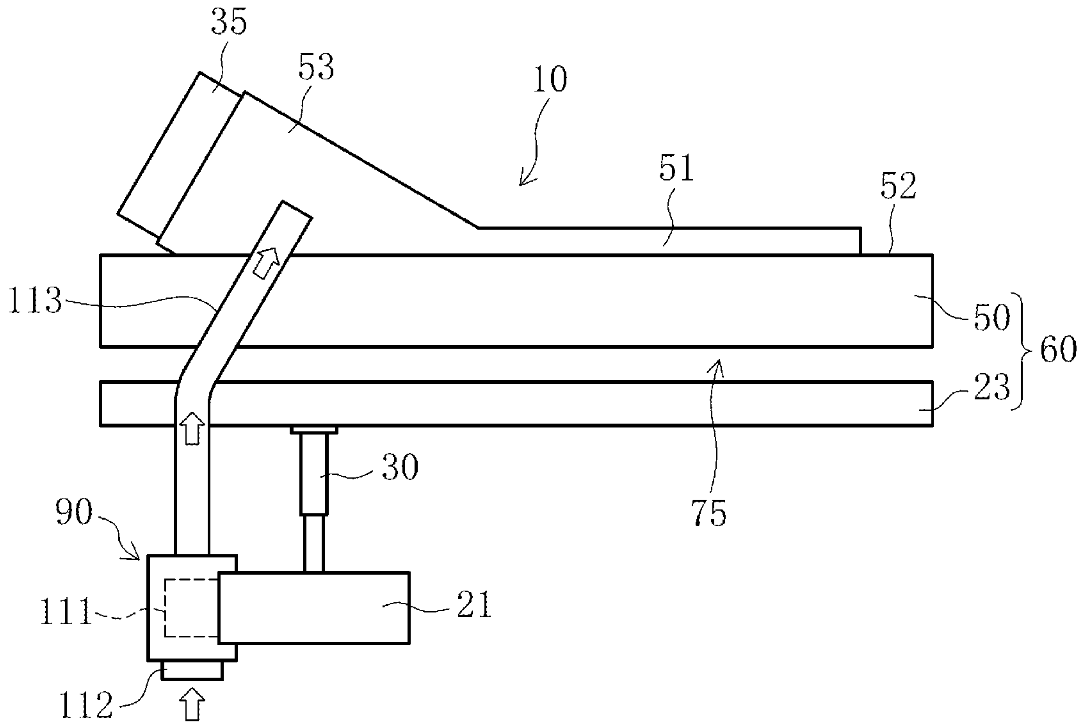
FIG. 19 is a schematic configuration diagram of an electromagnetic-wave heating device according to Modification 2-8 as viewed from a side.

In this modification, as shown in FIG. 19, the electromagnetic-wave heating device 10 includes a waste heat utilization unit 90 that heats the air supplied to the object to be heated 20 by the blower 35 by utilizing the waste heat of the oscillator 21. The waste heat utilization unit 90 includes a heat dissipation unit 111 that dissipates heat generated in the oscillator 21 during operation, a case 112, with an inlet for introducing air from the outside, accommodating the heat dissipation unit 111 and a connection flow path 113 for supplying the air in the case 112 to the duct portion 53. The heat dissipation unit 111 is, for example, a plurality of heat dissipation fins. A blower (not shown) is provided in the connection flow path 113. Note that the connection flow path 113 may be connected to the suction port of the blower 35 so that air can be sent from the case 112 to the duct portion 53 side by using negative pressure.

Modification 2-9

Figure 20A:
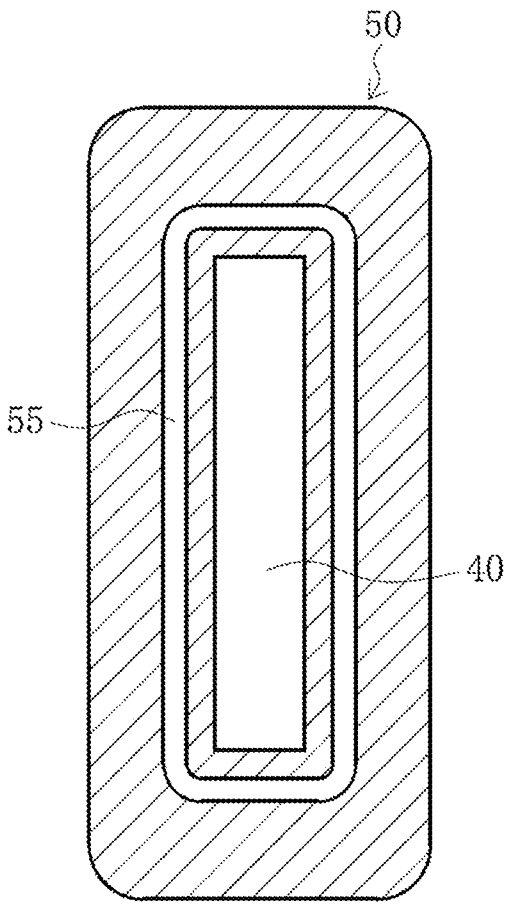
FIG. 20A is a cross-sectional view of C-C of FIG. 16B.
Figure 20B:
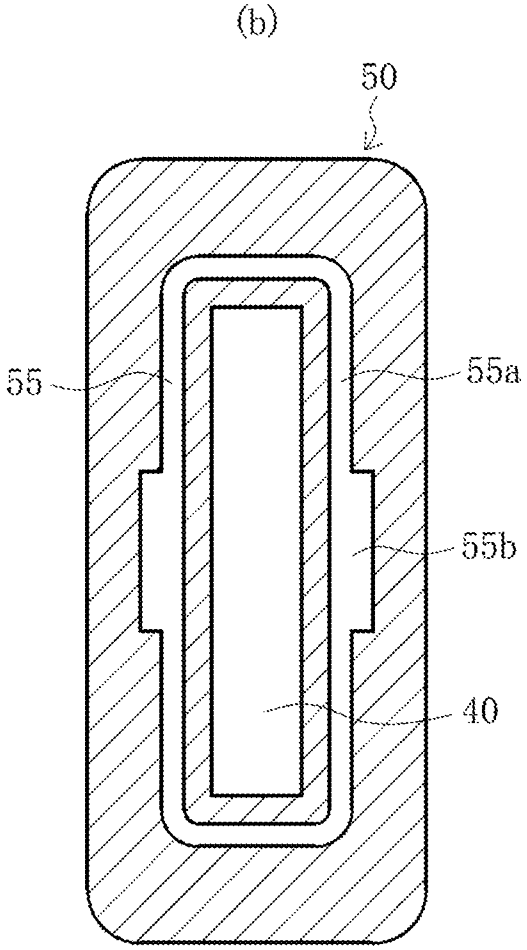
FIG. 20B is a cross-sectional view of a variation different from FIG. 20A with respect to the planar configuration of a choke structure 55.

In the present modification, the choke structure 55 can be continuously provided over the circumferential direction of the cover 50 in a plan view, as shown in FIGS. 20A and 20B.

In FIG. 20B, the width of the choke structure 55 is partially different in the circumferential direction, and the choke structure 55 in a plan view is constituted by a narrow portion 55*a* and a wide portion 55*b* having a wider width than the narrow portion 55*a*. As described above, by partially varying the width of the choke structure 55, the resonance frequency and the resonance point can be adjusted. This makes it possible to design the choke structure 55 so that, for example, resonance does not occur at a corner portion of the choke structure 55 in a plan view.

Figure 20C:
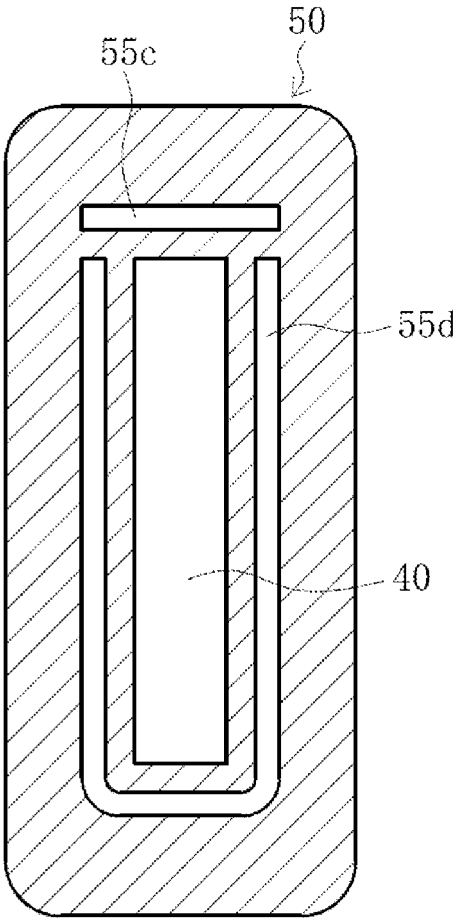
FIG. 20C is a cross-sectional view of yet another variation.

In addition, as shown in FIG. 20C, the choke structure 55 in a plan view may be constituted by a plurality of choke portion 55*c*, 55*d* which are interrupted in the middle. In FIG. 20C, the choke structure 55 is constituted by a first choke portion 55*c* having an I-shape in a plan view and a second choke portion 55*d* having a U-shape in a plan view. The lengths of the respective choke portions 55*c*, 55*d* are designed to be λ×n/2 (n is a natural number). λ is the electric length of high frequency in the choke portion 55*c*, 55*d*.

Other Modifications of the Shield Unit

In the above-described embodiment and the like, the upper partition portion may be the substrate 23 and the lower partition portion may be the cover 50. That is, the electromagnetic-wave heating device 10 according to the embodiment may vertically be inverted.

Figure 21A:
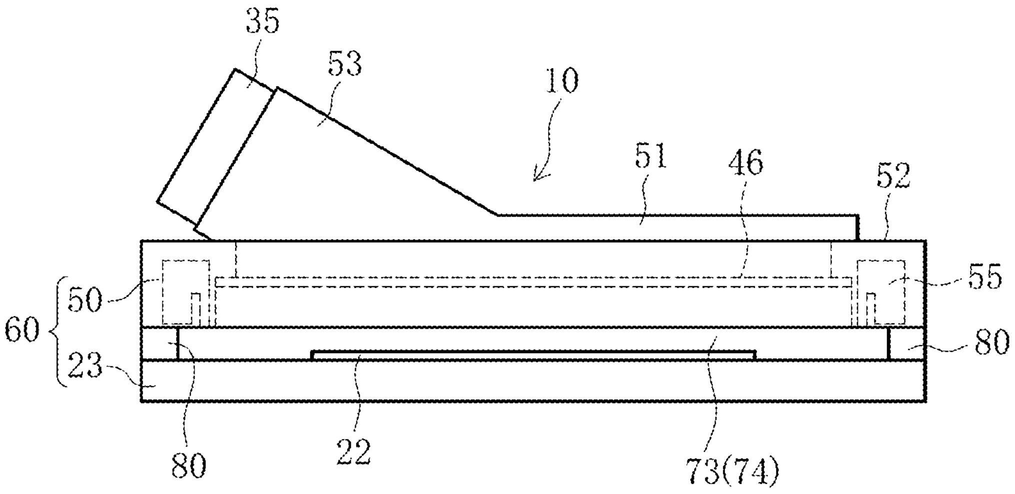
FIG. 21A is a schematic configuration diagram of an electromagnetic-wave heating device according to another modification of a shield unit as viewed from aside.
Figure 21B:
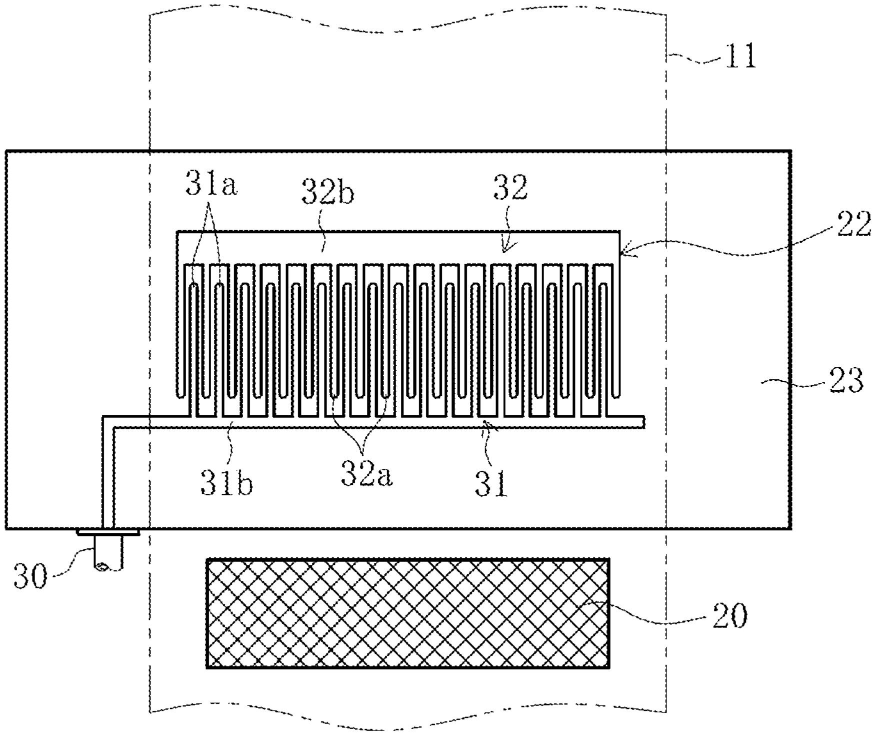
FIG. 21B is a plan view of a substrate of the electromagnetic-wave heating device.

In the above-described embodiment and the like, as shown in FIGS. 21A and 21B, one of the above-described side gaps 73 and 74 may serve as an introduction portion of the base material (conveyed object) 11 including the object to be heated 20, and the other may serve as a lead-out portion. In this case, in the internal space of the shield unit 60, the base material 11 is conveyed from the side gap (introduction portion) 73 toward the side gap (lead-out portion) 74 by the conveyance mechanism 12 so that the object to be heated 20 passes through the facing region of the radiation antenna 22. The blower 35 supplies air to the object to be heated 20 conveyed through the internal space.

Modification 3 of the Embodiment Relating to the Structure for Forming Strong-Electric-Field Region Modification 3-1

In this modification, the substrate 23 includes a dielectric layer 24 exposed on the surface of the substrate 23 and a ground electrode layer 25 superimposed on the back surface of the dielectric layer 24. The substrate 23 is provided with an input part 30 to which a high-frequency from the oscillator 21 is input. The radiation antenna 22 is connected to the input 30. In the radiation antenna 22, an input location (power supply location) X of the high-frequency from the oscillator 21 is located outside the passing region of the object to be heated 20 conveyed by the conveyance mechanism 12.

Figure 22:
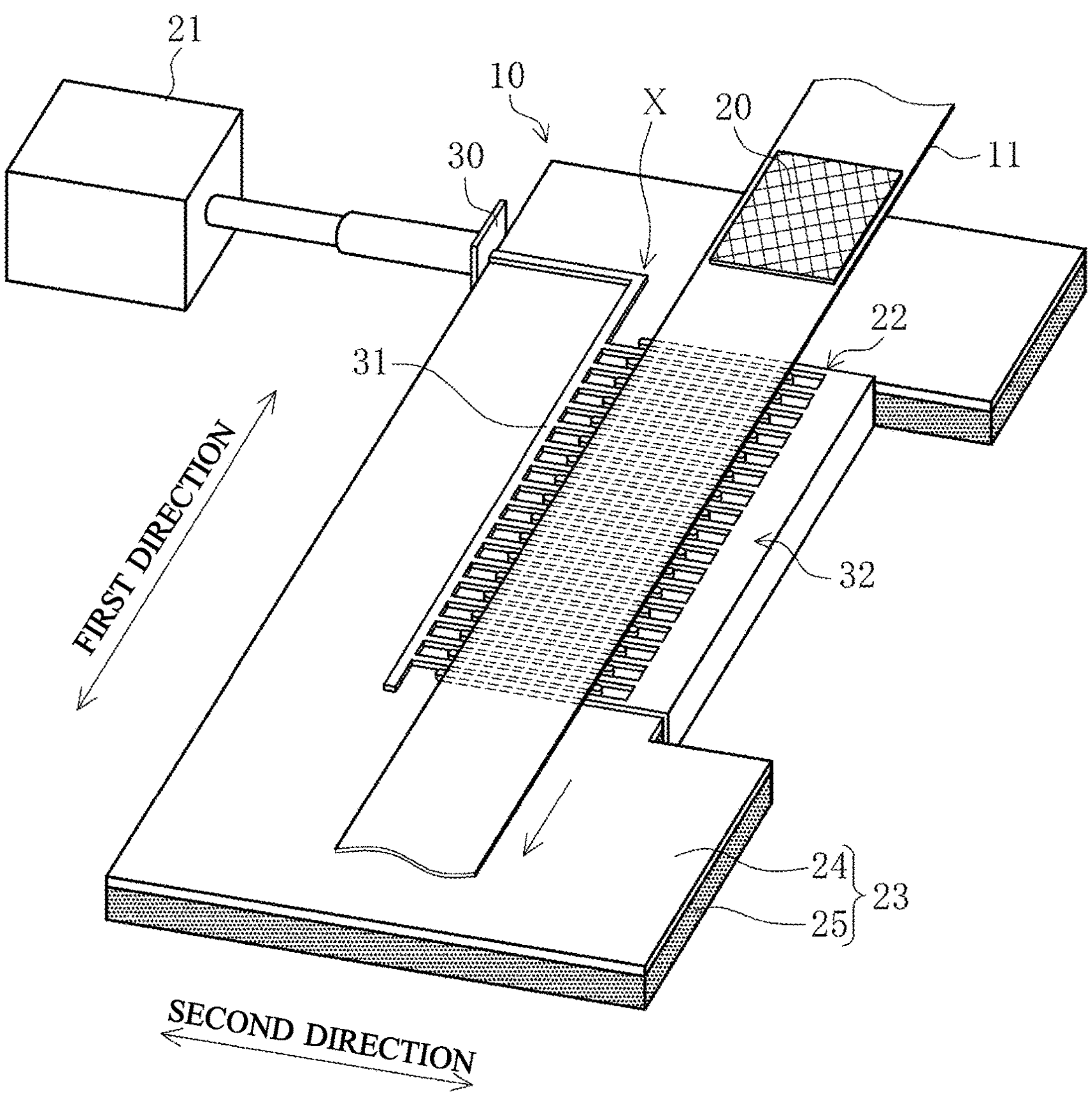
FIG. 22 is a perspective view of an electromagnetic-wave heating device and a processing system according to Modification 3-1 as viewed obliquely from above.

As shown in FIG. 22, the radiation antenna 22 includes a first comb-teeth electrode 31 to which a high-frequency input to the input part 30 is supplied, and a second comb-teeth electrode 32 electrically connected to a ground electrode layer 25. The first comb-teeth electrode 31 is a high-pressure-side electrode and has a plurality of tooth portions 31*a*. The second comb-teeth electrode 32 is a ground-side electrode and has a plurality of tooth portions 32*a*. The first comb-teeth electrode 31 and the second comb-teeth electrode 32 are arranged in the same plane such that the respective tooth portions 31*a*, 32*a* are meshed with each other with a gap therebetween. The plurality of tooth portions 31*a*, 32*a* are provided perpendicularly to the base line 31*b*,32*b*.

Here, each tooth portion 31*a* of the first comb-teeth electrode 31 and each tooth portion 32*a* of the second comb-teeth electrode 32 correspond to the conductive line according to the present disclosure. The respective tooth portions 31*a*, 32*a* are linear conductive lines. In the radiation antennae 22, a large number of tooth portions 31*a*,32*a* are arranged with a gap therebetween in a predetermined direction (the first direction). In the radiation antenna 22, a high-frequency from the input part 30 is supplied to the first comb-teeth electrode 31 which is a part of a large number of conductive lines. In the radiation antenna 22, a strong-electric-field area for heating the object to be heated 20 is formed along a large number of tooth portions 31*a*, 32*a* during an input period in which a high-frequency is input to the input part 30.

Note that in the present specification, "large number" means 5 or more. However, the number of tooth portions (conductive line) 31*a*, 32*a* arranged with a gap in a predetermined direction may be three or more. Further, as in the radiation antenna 22 shown in FIG. 22, the respective comb-teeth electrodes 31 and 32 may have a large number of (five or more) tooth portions 31*a*,32*a*, and the total number of tooth portions 31*a*,32*a* may be 10 or more.

Further, in the present embodiment, a high-frequency is directly supplied to every other conductive line of many conductive lines constituting the radiation antenna 22, the high-frequency may be directly supplied to every three conductive lines.

Figure 24A:
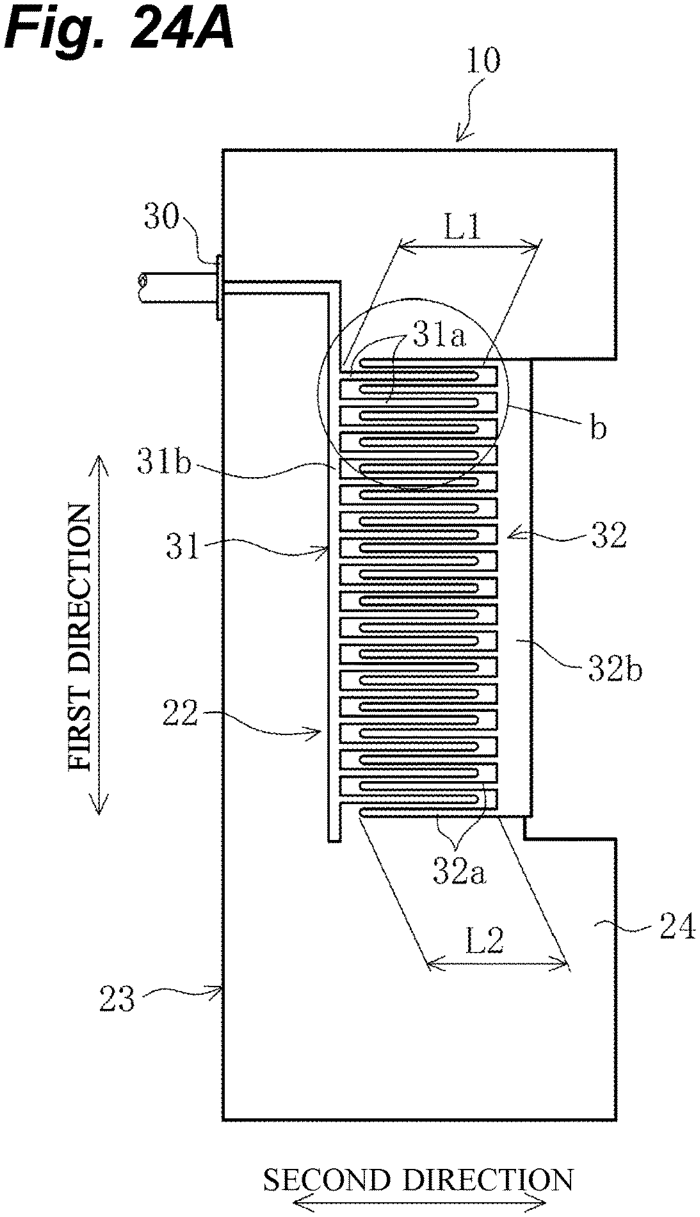
FIGS. 24A and 24B are top views of an electromagnetic-wave heating device according to Modification 3-1.
Figure 24B:
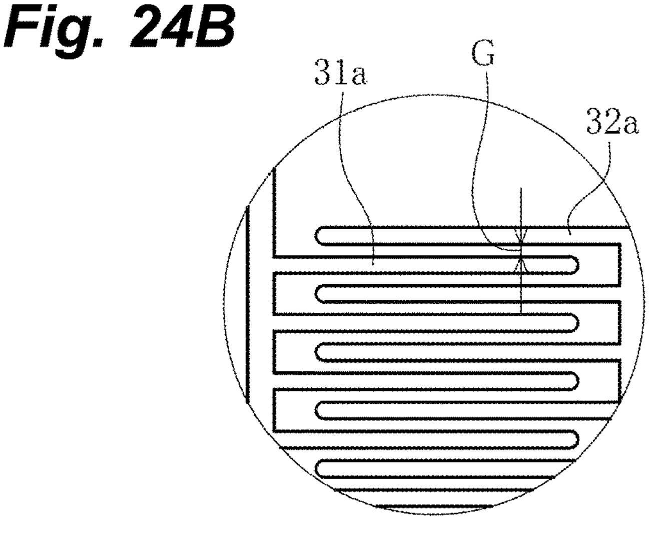

The comb-teeth electrodes 31 and 32 shown in FIG. 24 will be described in detail. The first comb electrode 31 is supported on the surface of the dielectric layer 24. The first comb-teeth electrode 31 includes a base line 31*b* extending from the input part 30 side, and a large number of tooth portions 31*a* whose roots are connected to the base line 31*b*. The base line 31*b* is connected to a conductive line extending in the second direction from the input part 30 and extends straight in the first direction from the input location X located at a bent portion. The large number of tooth portions 31*a* protrude from the base line 31*b* so as to be parallel to each other. The large number of tooth portions 31*a* are arranged at equal intervals in the first direction. The tooth portions 31*a* extend in the second direction along the surface of the dielectric layers 24 and are perpendicular to the base line 31*b*.

The second comb electrode 31 is also supported on the surface of the dielectric layer 24. The second comb-teeth electrode 31 includes a base line 32*b* and a large number of tooth portions 32*a* whose roots are connected to the base line 32*b*. The base line 32*b* extends parallel to the base line 31*b* of the first comb-teeth electrode 31. The base line 32*b* is partially superimposed on the dielectric layers 24 and is bent at the outer peripheral position of the substrate 23. The remaining part of the base line 32*b* extends from the bent portion to the back side along the side surface of the substrate 23 and is connected to the ground electrode layer 25. Further, the large number of tooth portions 32*a* protrude from the base line 32*b* toward the first comb-teeth electrode 31 side so as to be parallel to each other. The large number of tooth portions 32*a* are arranged at equal intervals in the first direction. The tooth portions 32*a* extend in the second direction along the surface of the dielectric layers 24 and are perpendicular to the base line 32*b*.

The length L1 of the tooth portion 31*a* and the length L2 of the tooth portion 32*a* are designed using Equation 10 when the transmitted high-frequency wave length (electric length) is λ (n is a natural number). Note that the respective tooth portions 31*a* of the first comb-teeth electrode 31 and the respective tooth portions 32*a* of the second comb-teeth electrode 32 are all of the same length and are all of the same line width. However, the lengths or widths may be different from each other. In the radiation antennae 22, the respective tooth portions 31*a*, 32*a* have the resonance structure. This resonance structure is not a structure that causes a resonance mode due to an electromagnetic field distribution in space, but a structure that causes a resonance of a standing wave in the radiation antenna 22 (a high-frequency transmitter) itself.

$$L1=L2=\lambda\times(2n-1)/4 \qquad \text{Equation 10}$$

The radiation antennae 22 is configured such that a relatively strong-electric-field coupling occurs between the tooth portion 31*a*, 32*a* adjacent to each other in the first direction during the above-described input period. Specifically, in the radiation antennae 22, the large number of tooth portions 31*a*, 32*a* are arranged at equal intervals in the first direction, the distance (the dimension of a gap) G of the tooth portions 31*a*, 32*a* adjacent in the first direction is not more than 5 times the line width of the tooth portion 31*a*,32*a*. The distance G may be three times or less of the line width of the tooth portion 31*a*, 32*a*, or may be one time or less. Note that regarding the line widths of the tooth portions 31*a*, 32*a*, when the line width of the tooth portions 31*a* and the line width of the tooth portions 32*a* are different from each other, the average value of the line widths of the tooth portions 31*a*, 32*a* is used. This point is the same for the line width of the conductive line that defines the numerical range of the gap G in each embodiment and each modification described later.

The dielectric layer 24 is made of a dielectric material such as ceramic. The thickness of the dielectric layer 24 is, for example, uniform over the entire surface. The dielectric layer 24 separates the first comb-teeth electrode 31 and the second comb-teeth electrode 32 from the ground electrode layer 25.

The ground electrode layer 25 is formed of a conductor (for example, a metal plate) and has a ground potential. The ground electrode layer 25 is arranged on the back side of the large number of tooth portions 31*a*, 32*a* and faces the tooth portions 31*a*, 32*a* of the arrangement region via the dielectric layer 24. The ground electrode layer 25 is disposed on the opposite side to the side where the object to be heated 20 is disposed with respect to three or more conductive lines and faces at least a part of three or more conductive lines. By providing the ground electrode layers 25, high-frequency wave is radiated only to the front sides of the large number of tooth portions 31*a*, 32*a* in the above-described input period, and the strong-electric-field region is formed in the vicinity of the front sides of the large number of tooth portions 31*a*, 32*a*. In the strong-electric-field region, the conductive components or the ionic materials of the object to be heated 20 is heated by the conductive loss, the magnetic component is heated by magnetic loss, and the dielectric components are heated by the dielectric loss.

The Operation of the Processing System

Figure 23:
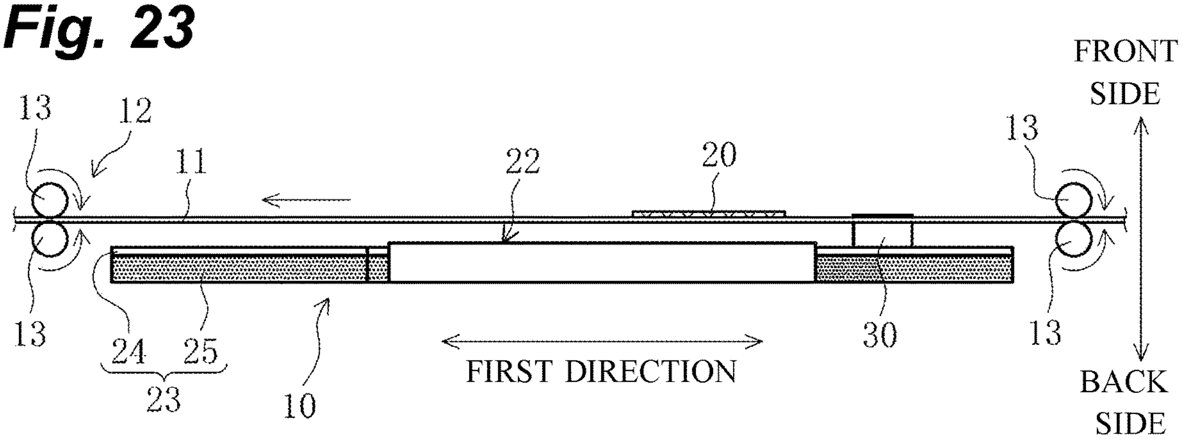
FIG. 23 is a side view of an electromagnetic-wave heating device and a processing system according to Modification 3-1.

The operation of the processing system including the electromagnetic-wave heating device 10 will be described. When the power supply of the processing system is turned ON, the respective power supplies of the electromagnetic-wave heating device 10 and the conveyance mechanism 12 are turned ON. As a result, the base material 11 is conveyed in the first direction by a conveyance mechanism 12, and a high-frequency is oscillated from the oscillator 21. The base material 11 is conveyed in the vicinity of the front side of the radiation antenna 22 with the object to be heated 20 side facing the front side (the upper side in FIG. 23). Note that the base material 11 may be conveyed with the object to be heated 20 side facing the back side.

In the electromagnetic-wave heating device 10, a high-frequency outputted from the oscillator 21 is supplied to each tooth portion 31*a* of the first comb-teeth electrode 31 and each tooth portion 32*a* of the second comb-teeth electrode 32. As described above, the length of each tooth portion 31*a* is λ/4. Resonance of a high-frequency occurs in each tooth portion 31*a* of the first comb-teeth electrodes 31, and the leading end of each tooth portion 31*a* becomes an abdominal portion of a standing wave of a high-frequency.

Further, as described above, a relatively strong-electric-field coupling occurs between the first comb-teeth electrode 31 and the second comb-teeth electrode 32. As a result, resonance of a high-frequency occurs in each tooth portion 32*a* of the second comb-teeth electrodes 32, and the leading end of each tooth portion 32*a* becomes an abdominal portion of a standing wave of a high-frequency. Moreover, the electric field strength in the gap between the first comb-teeth electrode 31 and the second comb-teeth electrode 32 is relatively high.

In the facing region of the radiation antenna 22, a strong-electric-field region is formed so as to include and the conveyance path of the object to be heated 20 and the base material 11. The object to be heated 20 passing through the strong-electric-field region is heated. As a result, A desired physical/chemical change (polymerization, annealing, drying, curing, or the like) occurs in the object to be heated 20 through the temperature rise.

In the present embodiment, the high-frequency input location X in the radiation antenna 22 is located outside the passing region of the object to be heated 20. The input location X of does not overlap with the passing region. Here, in the case where the input part the high-frequency overlaps with the passing region, there is a possibility that an electric field is concentrated in the vicinity of the input location, and the object to be heated 20 is locally heated. On the other hand, in the present embodiment, such locally heating does not occur, and the degree of heating of the object to be heated 20 in a plan view can be made uniform.

Modification 3-2

Figure 25:
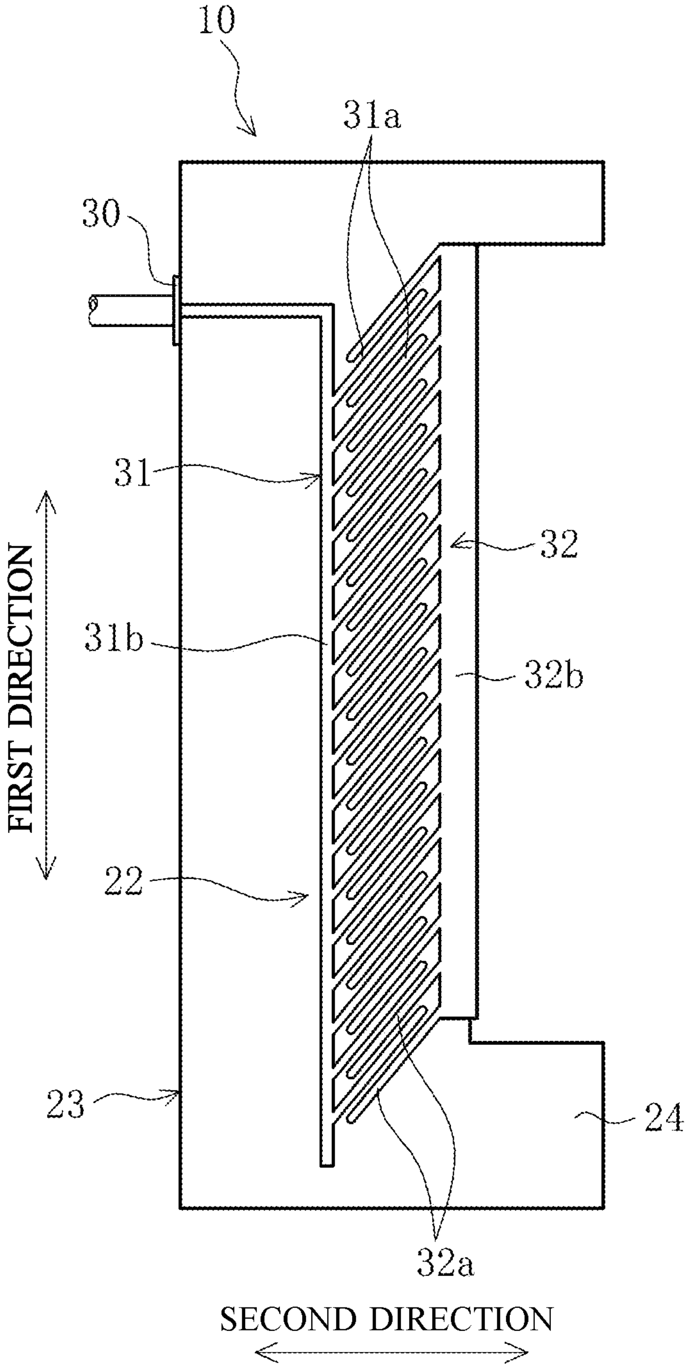
FIG. 25 is a top view of an electromagnetic-wave heating device according to Modification 3-2.

In this modification, as shown in FIG. 25, as in the above-described embodiment, the respective tooth portions 31*a*, 32*a* extend obliquely with respect to an arrangement direction (the first direction) of the tooth portions 31*a*, 32*a*.

In the present modification, even when the width of the object to be heated 20 is shorter than the length of the tooth portion 31*a*, 32*a*, the width of the strong-electric-field area can be adjusted in accordance with the width of the object to be heated 20 by obliquely setting the respective tooth portions 31*a*, 32*a*. Therefore, it is possible to effectively use high-frequency energy for heating the object to be heated 20.

Modification 3-3

Figure 26:
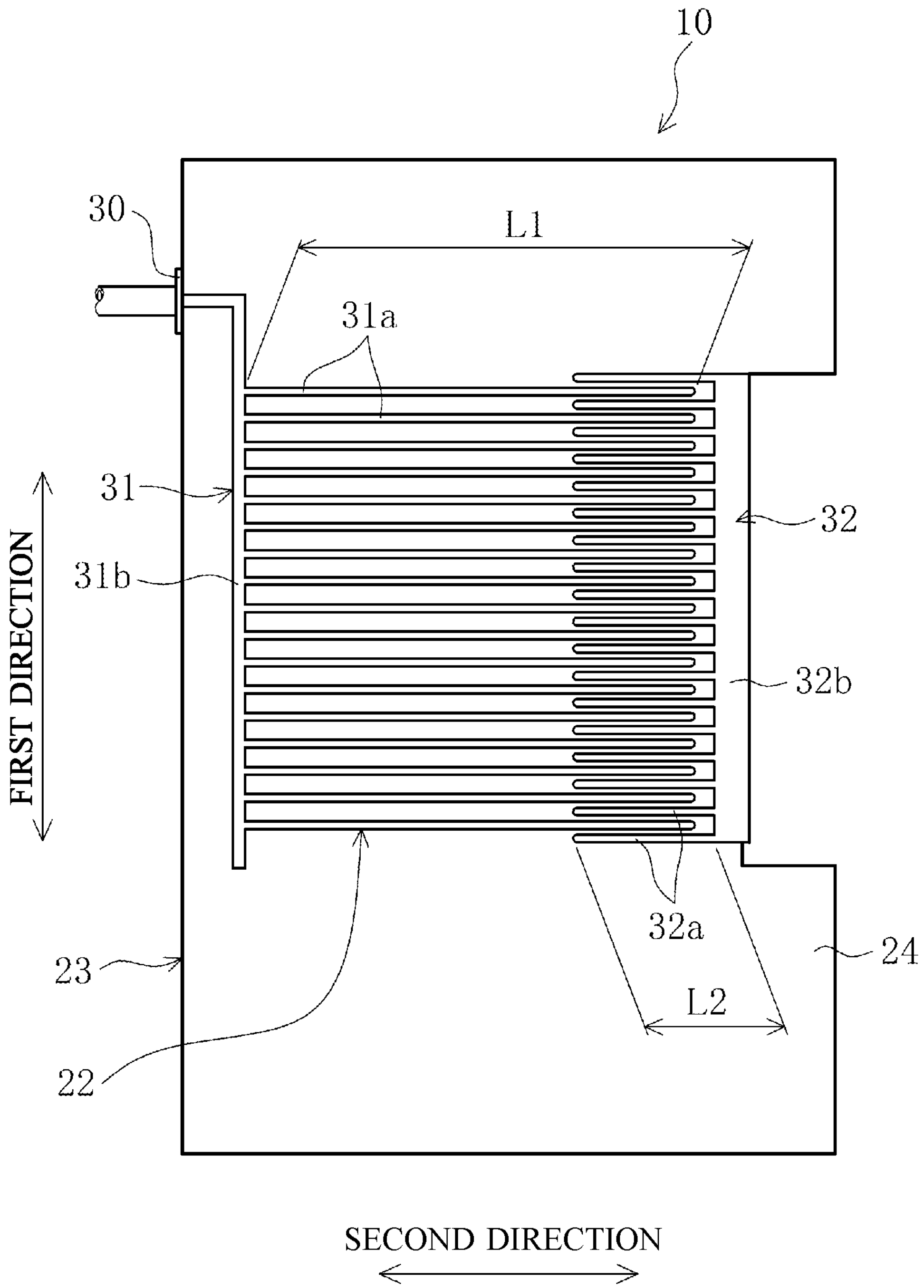
FIG. 26 is a top view of an electromagnetic-wave heating device according to Modification 3-3.

In this modification, as shown in FIG. 26, the length L1 of the tooth portion 31*a* of the first comb-teeth electrode 31 is longer than the length L2 of the tooth portion 32*a* of the second comb-teeth electrode 32. The length L1 of the tooth portion 31*a* of the first comb-teeth electrode 31 is designed using Equation 11, and the length L2 of the tooth portion 32*a* of the second comb-teeth electrode 32 is designed using Equation 12 ($n_1$, $n_2$ are both natural numbers, and the relationship $n_1>n_2$ holds).

$$L1=\lambda\times(2n_1-1)/4 \quad \text{Equation 11}$$

$$L2=\lambda\times(2n_2-1)/4 \quad \text{Equation 12}$$

In the present modification, in the respective tooth portions 31*a* of the first comb-teeth electrodes 31, two positions, i.e., a position separated from the root by λ/4 and a distal end, are the abdomen of the standing wave. On the other hand, in the respective tooth portions 32*a* of the second comb-teeth electrodes 32, one position of the distal end is the abdominal portion of the standing wave.

Modification 3-4

Figure 27A:
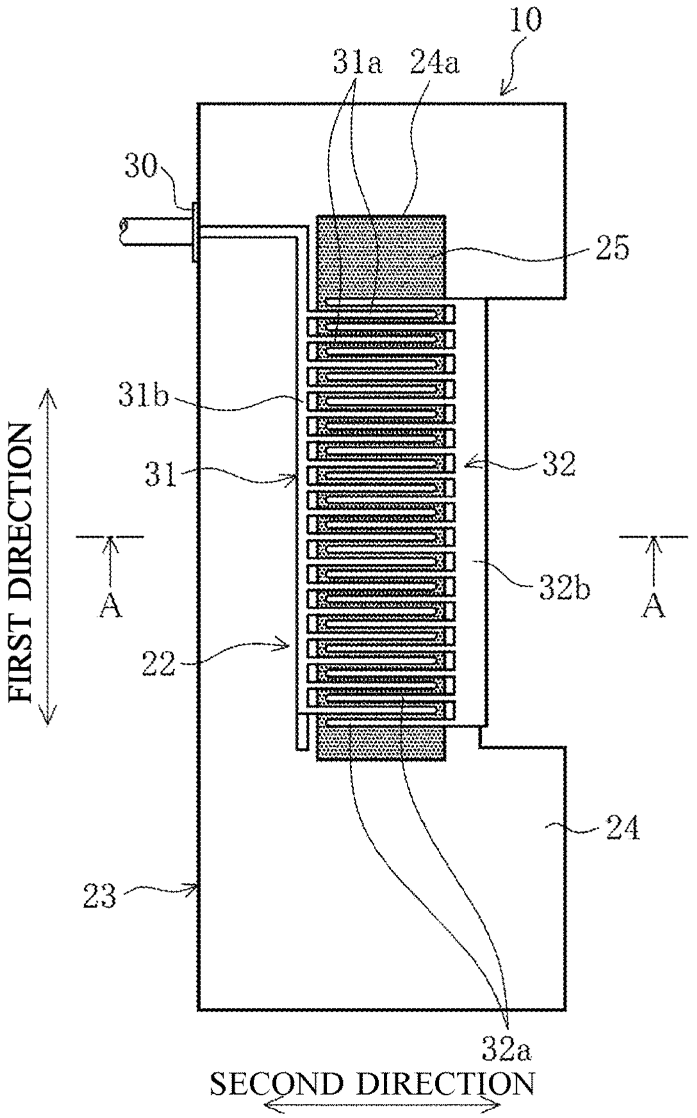
FIG. 27A is a top view of an electromagnetic wave heater according to Modification 3-4.
Figure 27B:
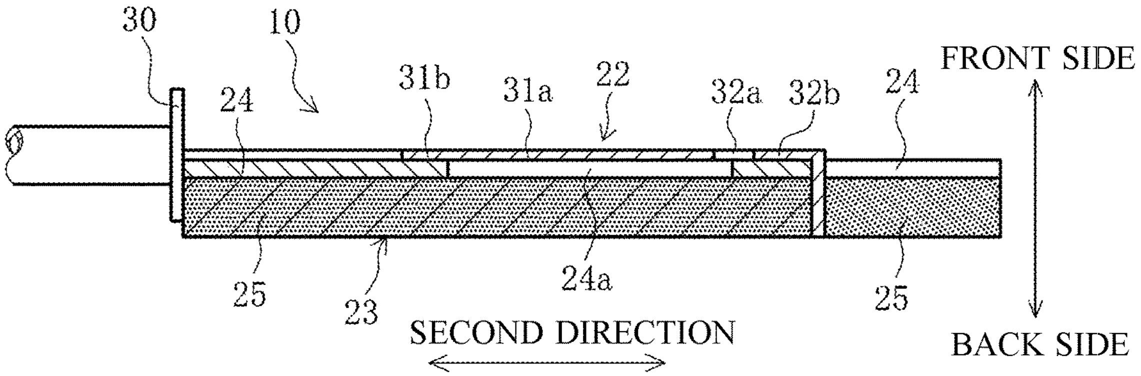
FIG. 27B is a A-A cross-sectional view (traverse cross-sectional view) of FIG. 27A.

In this modification, as shown in FIGS. 27A and 27B, the dielectric layers 24 on the back side of the arrangement regions of the large number of tooth portions 31*a*, 32*a* are eliminated in the substrate 23 on the back side of the arrangement region, substantially rectangular-shaped openings (recesses) 24*a* are formed in the dielectric layers 24. The ground electrode layers 25 face the respective tooth portions 31*a*, 32*a* through air (dielectric) in the opening 24*a*.

According to the present modification, by replacing the dielectric layer 24 with air having a low dielectric constant, the dielectric loss in the substrate 23 can be reduced, and the heating efficiency of the object to be heated 20 is improved.

Modification 3-5

Figure 28:
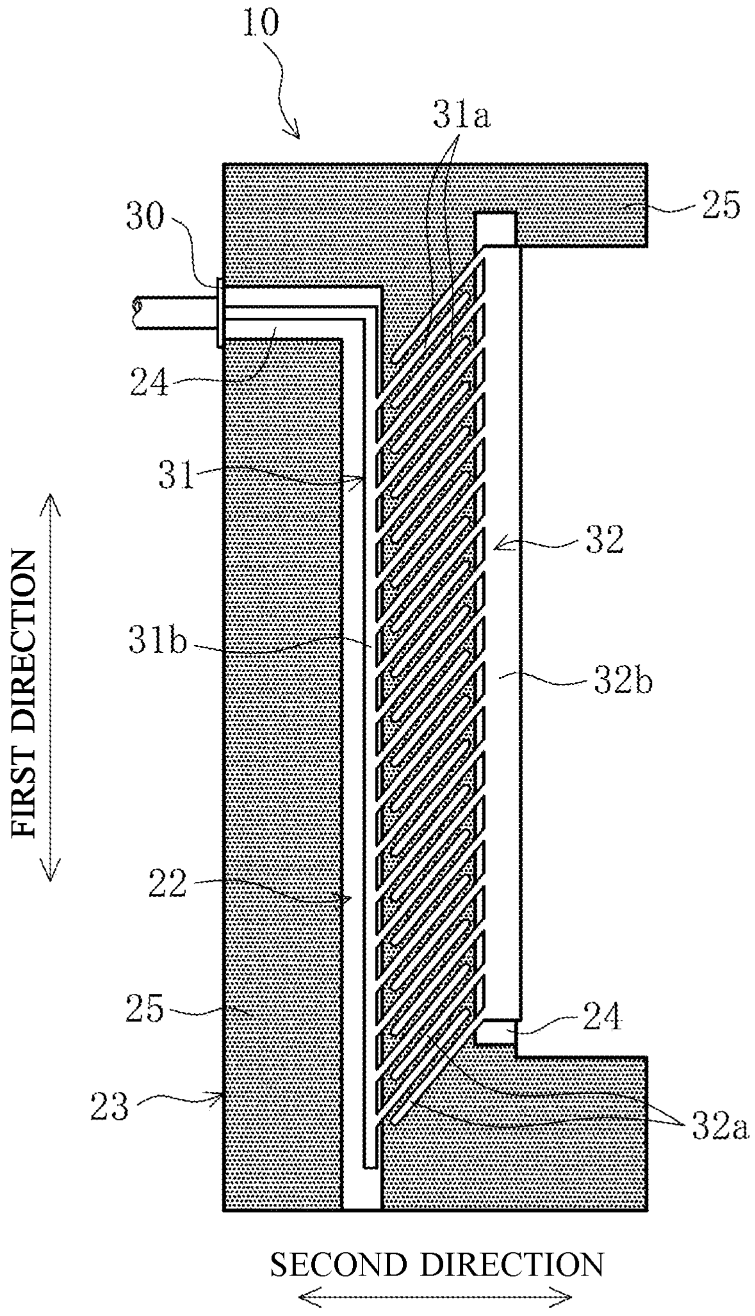
FIG. 28 is a top view of an electromagnetic-wave heating device according to Modification 3-5.

In the present modification, as shown in FIG. 28, the area of the dielectric layer 24 in the substrate 23 is further reduced for the modification 3-4.

Modification 3-6

Figure 29:
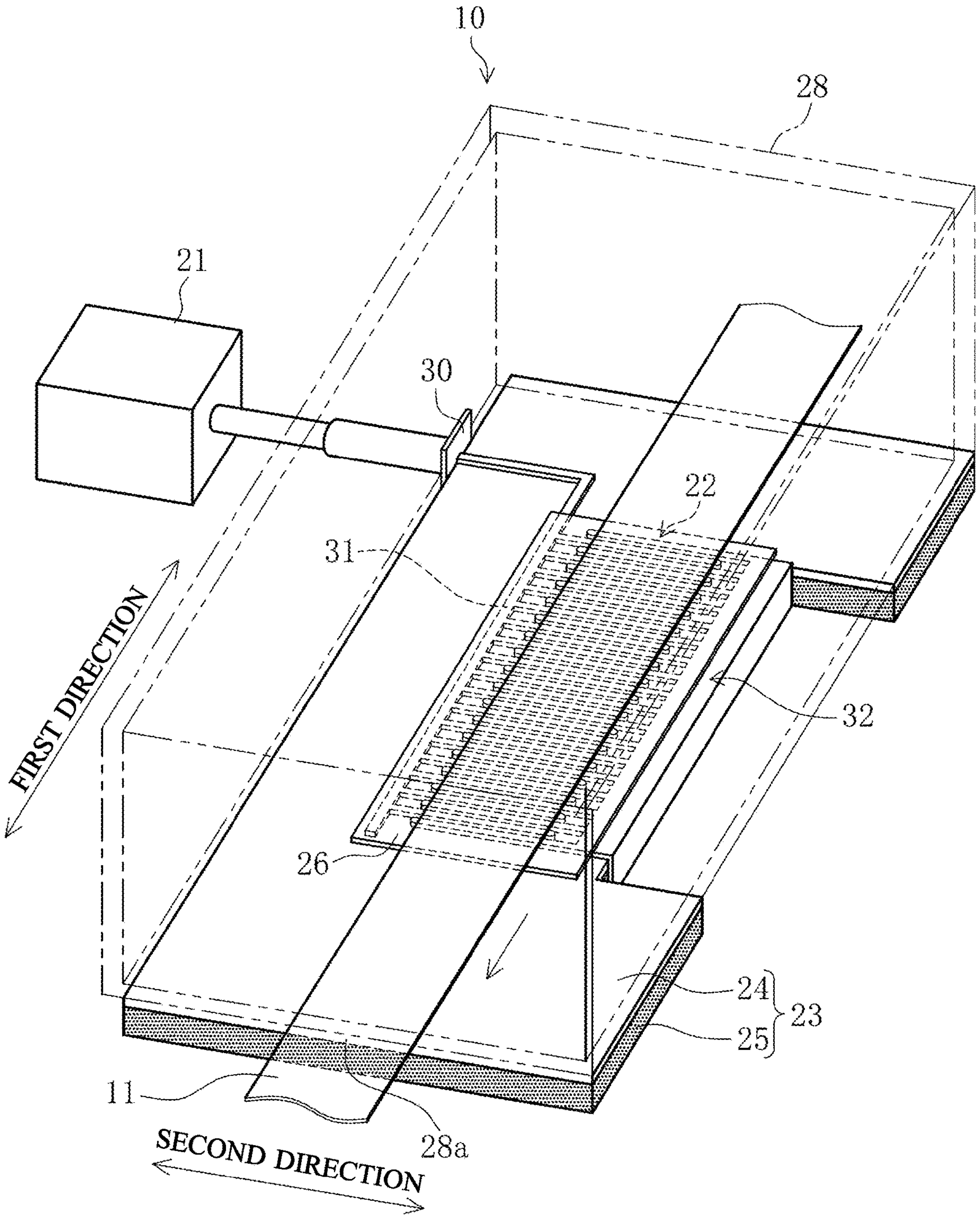
FIG. 29 is a perspective view of an electromagnetic-wave heating device according to Modification 3-6 as viewed obliquely from above.

In this modification, as shown in FIG. 29, a covering member 26 is provided to cover a side (front side) where the object to be heated 20 is disposed with respect to a large number of tooth portions 31*a*, 32*a* of the first comb-teeth electrode 31 and the second comb-teeth electrode 32. The covering member 26 is formed of a plate-shaped dielectric. Accordingly, it is possible to prevent foreign matter from entering the gap between the first comb-teeth electrode 31 and the second comb-teeth electrode 32.

Further, in the present modification, the housing 28 is provided so as to surround the first comb-teeth electrode 31 and the second comb-teeth electrode 32. The housing 28 is formed in a box shape with an open lower portion and is provided so as to cover the surface of the substrate 23. The housing 28 is provided so that a gap 28*a* is formed between itself and the substrate 23 at a position where base material 11 and the object to be heated 20 pass. Note that an opening (for example, a horizontally long slit) may be formed in the housing 28, and the base material 11 and the object to be heated 20 may pass through the opening. The object to be heated 20 can be taken in and out of the housing 28 through the opening formed in the housing 28 or the gap 28*a* formed by the housing 28.

Modification 3-7

Figure 30:
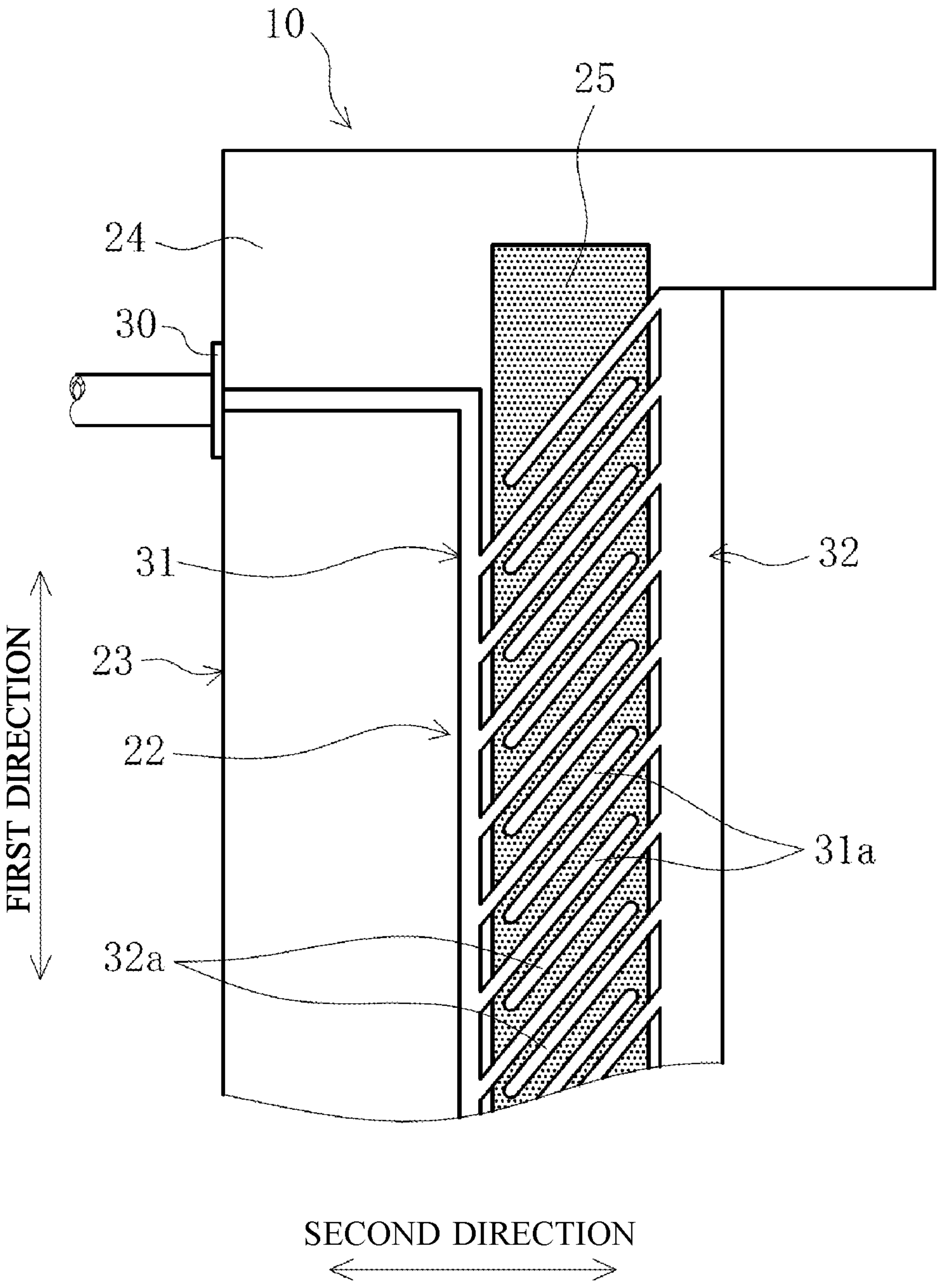
FIG. 30 is an enlarged top view of an electromagnetic-wave heating device according to Modification 3-7.

In this modification, as shown in FIG. 30, the position of the second comb-teeth electrode 32 is slightly slid in the first direction. In the radiation antennae 22, a portion where a gap between adjacent tooth portions 31*a*, 32*a* is narrow and a portion where the gap is wide are alternately arranged. This makes it possible to adjust the resonant frequency of the respective tooth portions 31*a*,32*a*.

Modification 3-8

Figure 31:
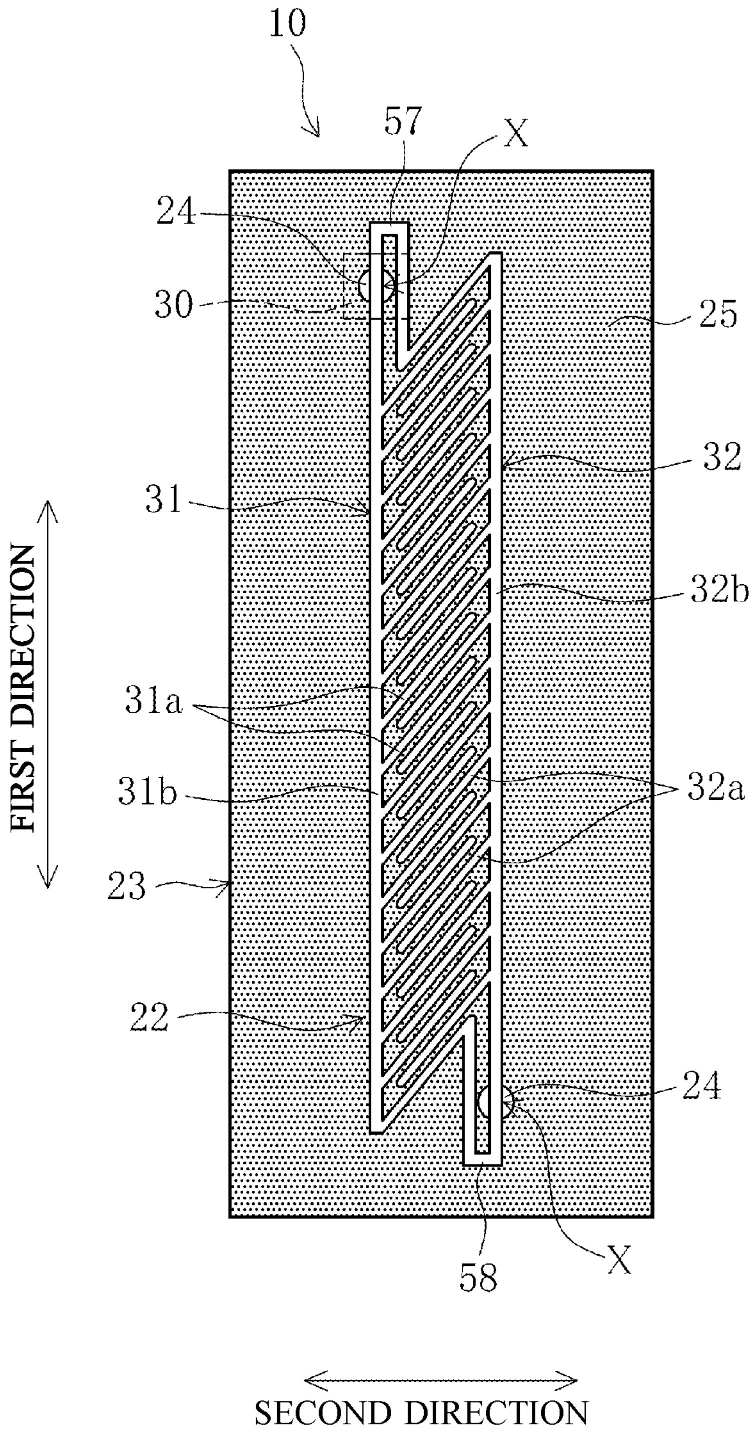
FIG. 31 is a top view of an electromagnetic-wave heating device according to Modification 3-8.

In the present modification, the input parts 30 are provided at two positions on the back side of the substrate 23. One input part 30 is provided on the back side of the dielectric layer 24 that supports the first connection line 57, and is connected to the first connection line 57. The other input part 30 is connected to, for example, the second connection line 58 (see FIG. 31).

Modification 3-9

Figure 32:
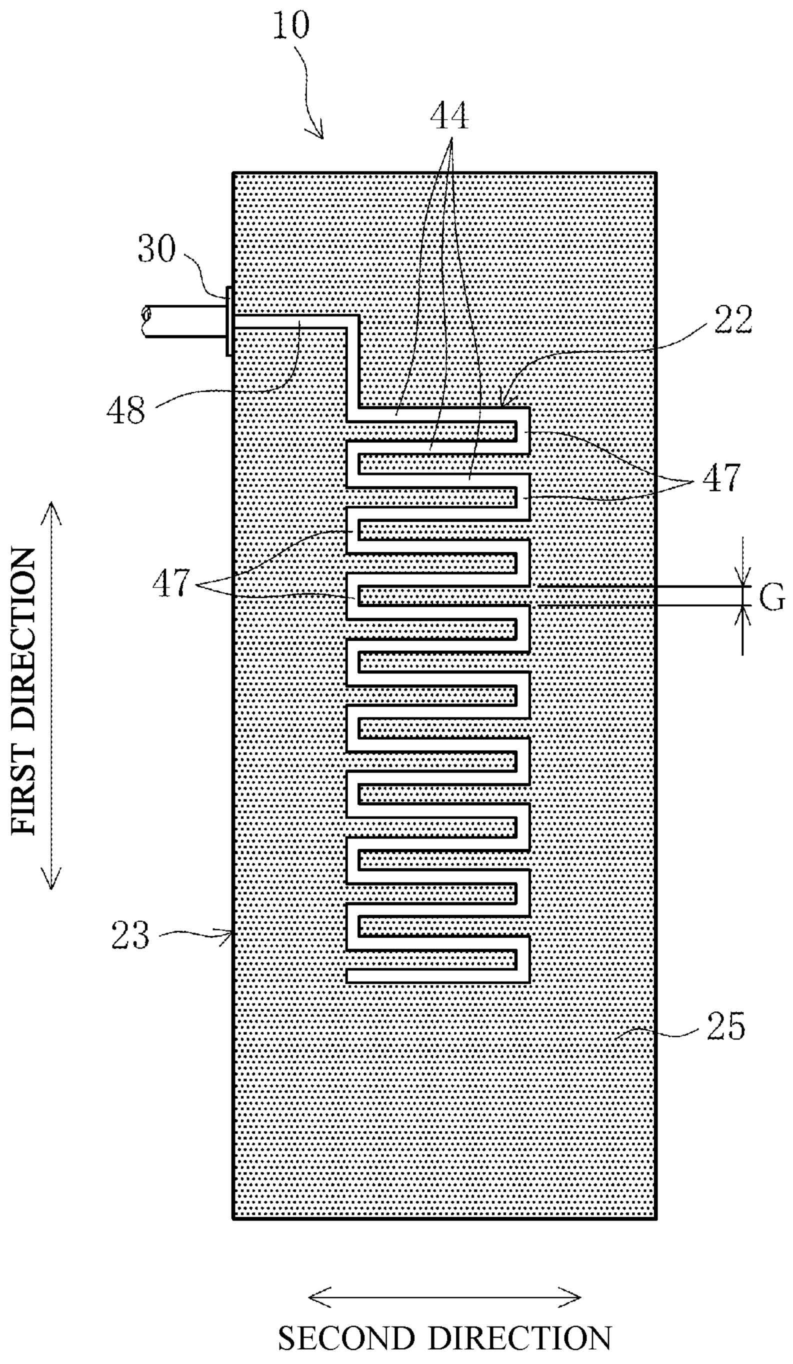
FIG. 32 is a top view of an electromagnetic-wave heating device according to Modification 3-9.

In this modification, the radiation antenna 22 is constituted by a meander circuit (meander wiring pattern) as shown in FIG. 32. Specifically, the radiation antenna 22 is a circuit meandering a plurality of times in a predetermined band-shaped region in which a straight line 44 extending in the second direction and a folded portion 47 which is continuous to the end portion of the straight line 44 are provided alternately. Each straight line 44 corresponds to the conductive line according to the present disclosure. The length of the straight line 44 is designed to be $\lambda\times(2n-1)/4$ (n is a natural number). The number of the straight lines 44 may be three or more.

In addition, in the radiation antenna 22, a base line 48 extending from the input part 30 is connected to the straight line 44 that is the end in the first direction among the large of straight lines 44.

In the present modification, resonance of the high-frequency occurs in each straight line 44 during the input period of high-frequency. The distance G between the adjacent straight lines 44 in the first direction is not more than five times the line width of the straight lines 44, and a relatively strong-electric-field coupling occurs between the adjacent straight lines 44.

Modification 3-10

Figure 33:
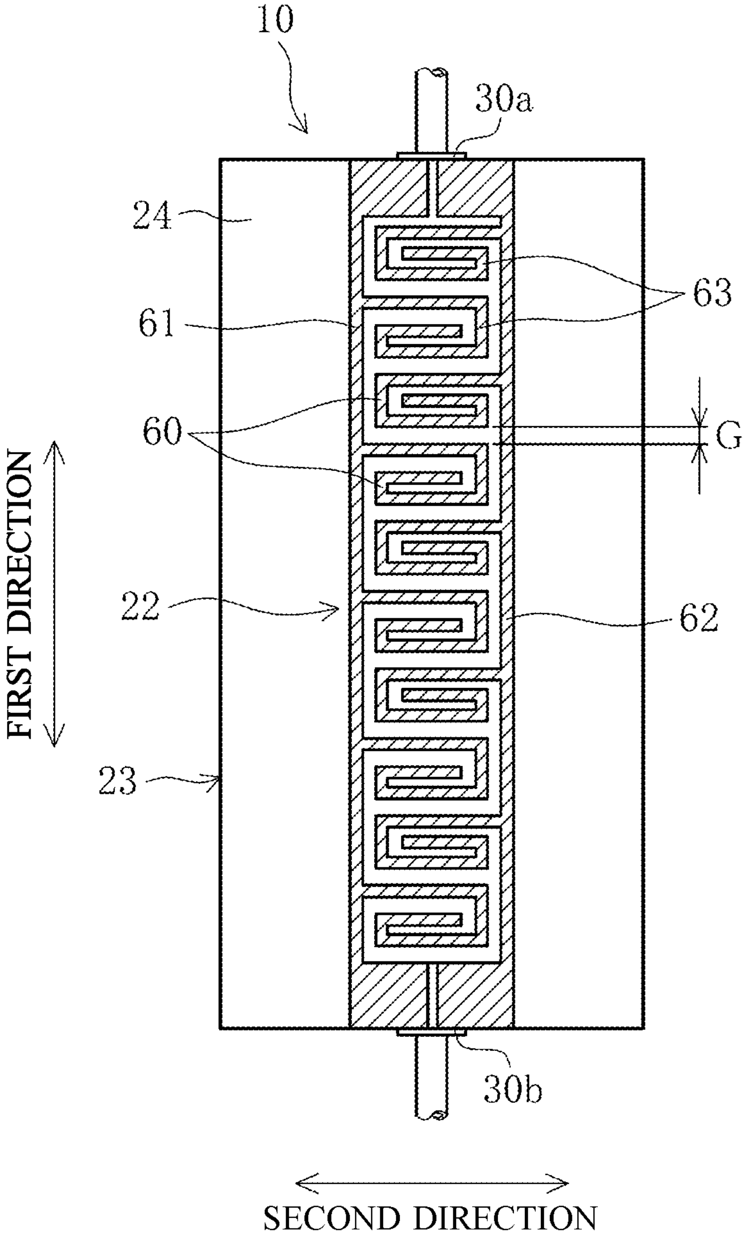
FIG. 33 is a top view of an electromagnetic-wave heating device according to Modification 3-10.

In this modification, the radiation antenna 22 includes a large number of spiral lines 63 formed to have the same length as shown in FIG. 33. Each spiral line 63 corresponds to the conductive line according to the present disclosure. In the radiation antenna 22, a large number of spiral lines 63 are arranged at equal intervals in the first direction. The length of the spiral line 63 is designed to be $\lambda\times(2n-1)/4$ (n is a natural number). In FIG. 33, the conductor portion including the spiral line 63 is hatched.

In addition to the large number of spiral lines 63, the radiation antenna 22 includes a first base line 61 and a second base line 62 arranged in parallel with each other at a distance from each other. In the radiation antenna 22, the spiral line 63 whose root is connected to the first base line 61 and the spiral line 63 whose root is connected to the second base line 62 are alternately arranged.

In the present modification, during the input period of the high-frequency, resonance of the high-frequency occurs in each spiral line 63, strong-electric-field coupling occurs between the lines inside the spiral line 63. In addition, the distance G between the spiral lines 63 adjacent to each other in the first direction is not more than five times the line width of each spiral line 63, and relatively strong-electric-field coupling occurs between the spiral lines 63 adjacent to each other.

Modification 3-11

Figure 34:
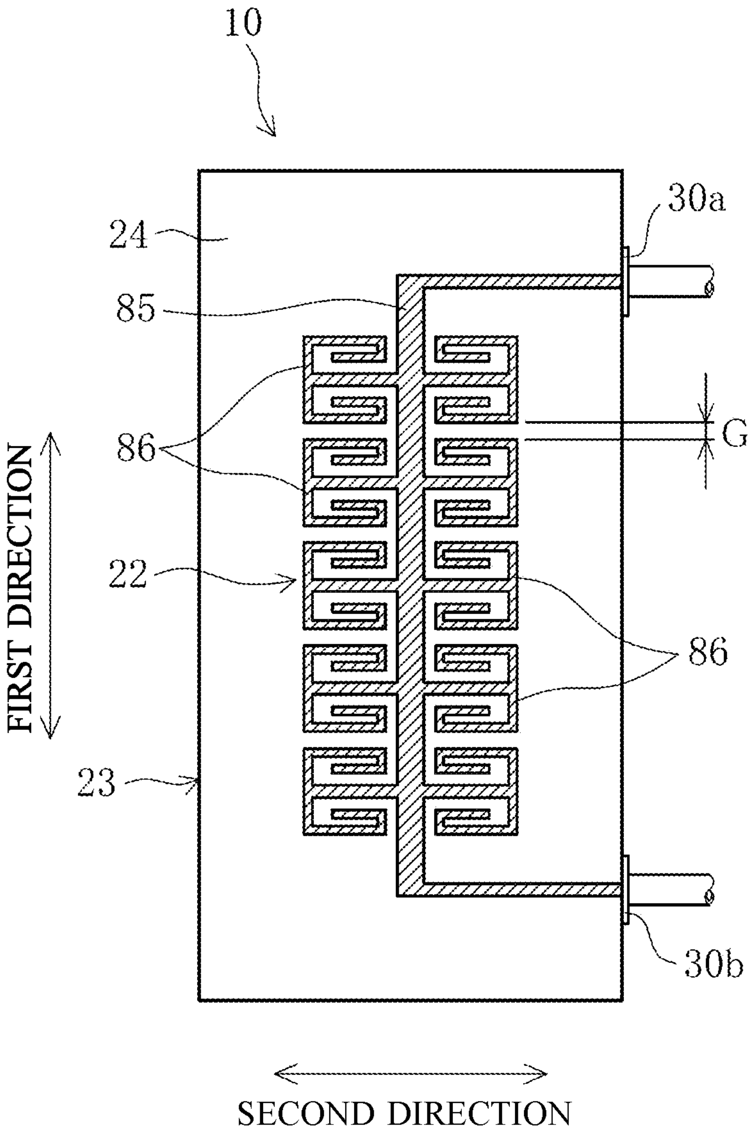
FIG. 34 is a top view of an electromagnetic-wave heating device according to Modification 3-11.

In this modification, as shown in FIG. 34, the radiation antenna 22 includes one base line 85 and a large number of branch-type lines 86 whose roots are connected to the base line 85. Each branch-type line 86 corresponds to the conductive line according to the present disclosure. The branch-type line 86 is designed such that the length from the root to the branched distal end is $\lambda\times(2n-1)/4$ (n is a natural number). In FIG. 34, the conductor portion including the base line 85 and the branch-type line 86 is hatched.

In the present modification, during the input period of high-frequency, resonance of high-frequency occurs in each branch-type line 86, and strong-electric-field coupling occurs between lines inside each branch-type line 86. The distance G between the branch-type lines 86 adjacent to each other in the first direction is not more than five times the line width of the branch-type lines 86, and relatively strong-electric-field coupling occurs between the branch-type lines 86 adjacent to each other.

Modification 3-12

Figure 35:
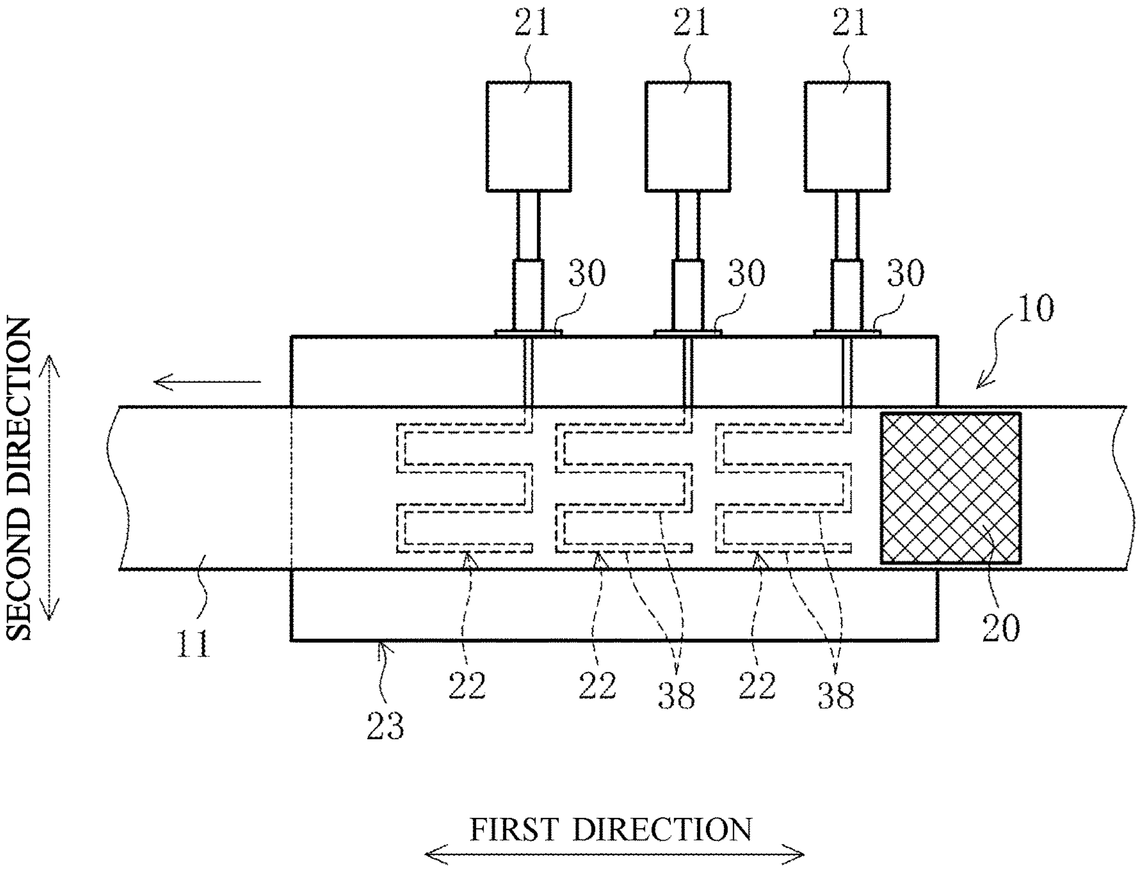
FIG. 35 is a top view of an electromagnetic-wave heating device according to Modification 3-12.

In this modification, the electromagnetic-wave heating device 10 includes a plurality of radiation antennas 22 each connected to an input part 30, as shown in FIG. 35. The plurality of radiation antennas 22 are arranged at intervals in the first direction. Each radiation antenna 22 has three or more straight lines 38 arranged with a gap therebetween in the second direction. The length of the straight line 38 is designed to be $\lambda\times(2n-1)/4$ (n is a natural number). The distance G between the straight lines 38 adjacent to each other in the second direction is 5 times or less of the line width of the straight lines 38. Further, in FIG. 35, the radiation antenna 22 is the meander circuit described above, but other circuits may be employed.

In this modification, during a period in which a high-frequency is input to each input part 30, resonance of a high-frequency occurs in each linear line 38 in each radiation antenna 22, and relatively strong-electric-field coupling occurs between the linear lines 38 adjacent to each other in the second direction.

Modification 3-13

Figure 36:
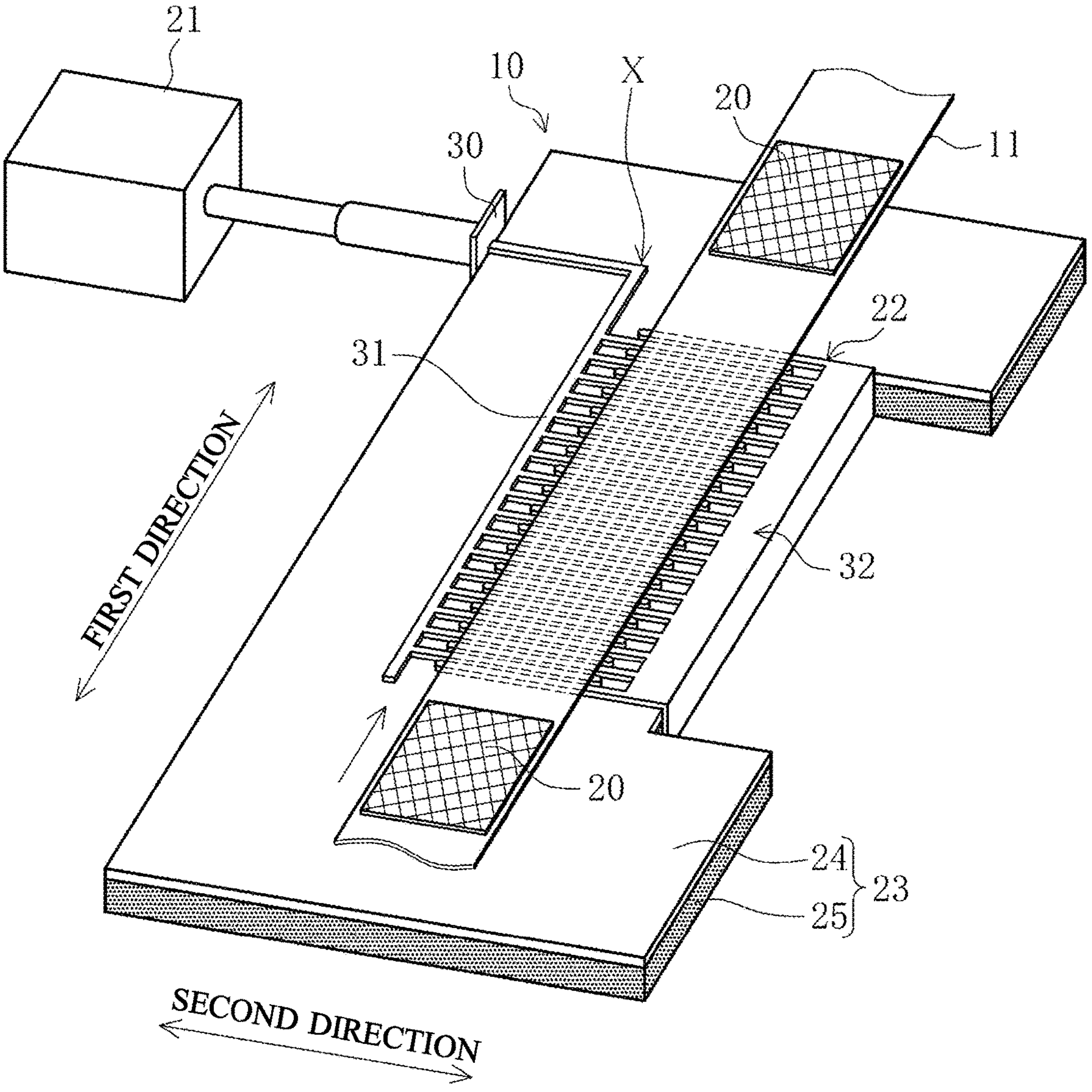
FIG. 36 is a perspective view of an electromagnetic-wave heating device and a processing system according to Modification 3-13 as viewed obliquely from above.

In this modification, as shown in FIG. 36, in the radiation antenna 22, the input location (power supply location) X of high-frequency from the oscillator 21 is located on the downstream side in the conveyance direction of the object to be heated 20. The input location X of the high-frequency, when the input part 30 is directly connected to the radiation antenna 22, is a connection location of the input part 30 in the radiation antenna 22, and when the input part 30 is connected to the radiation antenna 22 via a conductive line, it is the connection location of the conductive line in the radiation antenna 22.

Here, in the case where the object to be heated 20 contains moisture, the amount of moisture contained in the object to be heated 20 increases toward the upstream side in the conveyance direction. Therefore, in the case (in the case of FIG. 1 or the like) where the input location X of the high-frequency is on the upstream side in the conveyance direction, there is a possibility that the high-frequency absorbed by the object to be heated 20 on the upstream side of the radiation antenna 22 becomes too large. In this case, the high-frequency supplied to the downstream side of the radiation antenna 22 is reduced, and uniform heating in the conveyance direction is difficult.

On the other hand, in the present modification, it is possible to avoid the situation that the high-frequency absorbed by the object to be heated 20 on the downstream side of the radiation antenna 22 becomes too large. According to this modification, it is possible to realize uniform heating in the conveyance direction.

Other Modifications of Structure for Forming Strong-Electric-Field Region

Figure 37A:
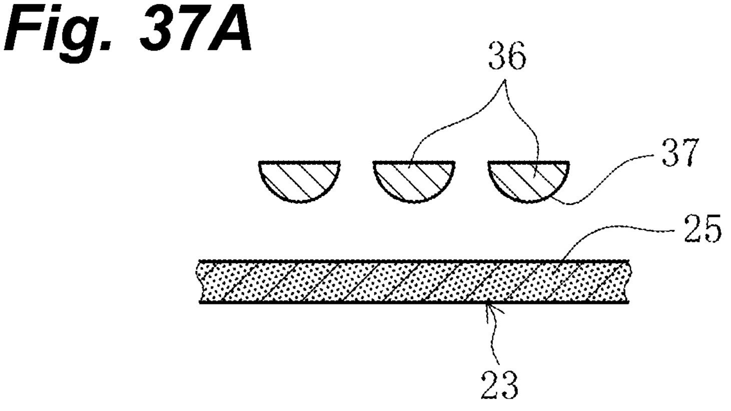
FIG. 37A is a cross-sectional view of an electric field forming portion, as sectioned from a first direction, of an electromagnetic-wave heating device according to another modification of a structure for forming a strong-electric-field region.

In the above-described embodiment and the like, the cross-sectional shape of the conductive line 36 according to the present disclosure is substantially rectangular, as shown in FIG. 37A, the conductive line 36 in cross-sectional view may be provided with a curved portion 37. Incidentally, the conductive line 36 shown in FIG. 37A, the tooth portion 31*a*,32*a* of the embodiment or the like, the straight line 44 of the modification 3-9, the spiral lines 63 of Modification 3-10, the branch-type line 86 of the modification 3-11, corresponds to the straight line 38 of Modification 3-12. The same applies to FIGS. 37B to 37C. Here, when the cross-sectional shape of the conductive line 36 is substantially rectangular, if the high-frequency power is increased, discharge occurs between the conductive lines 36, whereby the base material 11 might be is damaged. On the other hand, by providing the curved portion 37 in the conductive line 36, it is possible to suppress the occurrence of discharge between the conductive lines 36. Incidentally, the curved portion 37 may be provided on the front side of the conductive line 36. The cross-sectional shape of the conductive line 36 may be a cross-sectional shape without corners (for example, a circular shape or an elliptical shape).

Figure 37B:
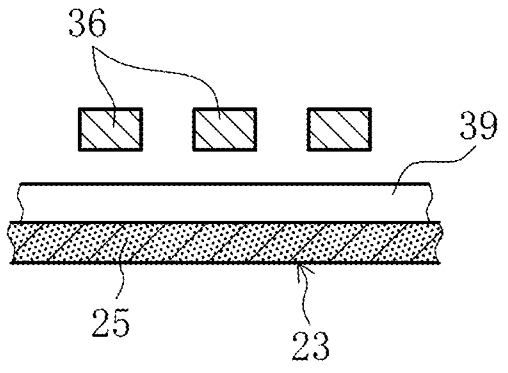
FIG. 37B is a cross-sectional view of an electric field forming portion according to another embodiment.

In Modifications 3-4 and 3-5 described above, the ground electrode layer 25 is exposed on the back side of the arrangement region of the plurality of tooth portion 31*a*, 32*a*, but as shown in FIG. 37B, the dielectric plate 39 may be provided on the front side of the ground electrode layer 25. As a result, a part of the high-frequency energy is absorbed by the dielectric plate 39, so that it is possible to suppress the occurrence of discharge between the conductive lines 36.

Figure 37C:
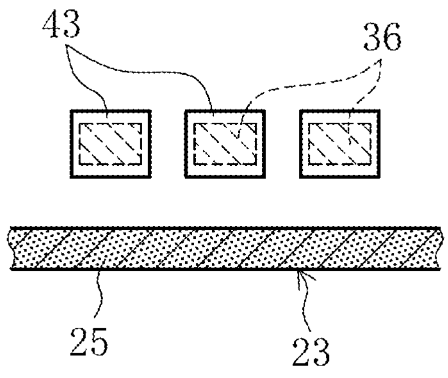
FIG. 37C is a cross-sectional view of an electric field forming portion according to yet another embodiment.

In the above-described embodiment or the like, as shown in FIG. 37C, the conductive line 36 may be covered with a dielectric 43 such as a resin or a ceramic. In this case, too, it is possible to suppress the occurrence of discharge between the conductive lines 36.

In the above-described embodiment and the like, heating of the object to be heated 20 may be performed also on the back side of the radiation antenna 22 without providing the substrate 23.

INDUSTRIAL APPLICABILITY

The present disclosure is applicable to an electromagnetic-wave heating device or the like used for heating an object to be heated.

DESCRIPTION OF REFERENCE CHARACTERS

10: Electromagnetic-wave heating device
11: Base material
12: Conveyance mechanism
20: Object to be heated
21: Oscillator
22: Radiation antenna
23: Substrate
24: Dielectric layer
25: Ground electrode layer
30: Input part
31: First comb-teeth electrode
31*a*: Tooth portion (conductive line)
32: Second comb-teeth electrode
32*a*: Tooth portion (conductive line)
40: Internal space
50: Cover
60: Shield unit
70: Continuous gap
75: Control device

The invention claimed is:

1. An electromagnetic-wave heating device comprising:

an oscillator for outputting and transmitting a frequency band of electromagnetic waves;

a radiating antenna connected to the oscillator and having a resonance structure in which resonance by the electromagnetic waves in a frequency band transmitted from the oscillator occurs, the resonance structure forming a radio-frequency strong-electric-field region in which the electromagnetic-wave heating device carries out heating of an object to be heated;

a signal extraction unit provided in a transmission line extending from the oscillator to the radiating antenna, for extracting reflected-wave information representing a waveform of a reflected wave returning from the radiating antenna;

a phase-difference information generating unit for generating, by arithmetic processing utilizing the reflected-wave information and incident-wave information representing a waveform of an incident wave transmitted from the oscillator to the radiating antenna, phase-difference information representing a phase difference between the incident wave and the reflected wave; and a control unit for repeatedly performing a control process of:

detecting, based on the phase-difference information and on reference information about a state in which the incident-wave phase and the reflected-wave phase are equal, a direction of oscillation-frequency adjustment whereby a difference between a resonant frequency in the radiating antenna and the oscillation frequency of the oscillator is reduced, and controlling the oscillation frequency based on the detected adjustment direction.

2. The electromagnetic-wave heating device according to claim 1, wherein the control unit detects a direction in which the oscillation frequency deviates with respect to the resonance frequency by utilizing the reference information and the phase-difference information and performs an averaging processing on the detected results to detect the direction of oscillation-frequency adjustment.

3. The electromagnetic-wave heating device according to claim 2, wherein the object to be heated is conveyed so as to pass through the strong-electric-field region, and wherein the control unit adjusts, based on a conveyance speed of the object to be heated, a number of samples of the detected results used in the averaging processing.

4. The electromagnetic-wave heating device according to claim 1, wherein the oscillator outputs a quadrature modulated electromagnetic waves to the radiation antenna, further comprising a quadrature demodulator for quadrature demodulating the reflected-wave information, and wherein the phase-difference information is generated by the arithmetic processing utilizing a first I component information and a first Q component information constituting the incident-wave information, and a second I component information and a second Q component information constituting the reflected-wave information.

5. The electromagnetic-wave heating device according to claim 4, wherein the signal extraction unit extracts the incident-wave information from the transmission line, the quadrature demodulation unit comprising:

one quadrature demodulator; and a changeover switch for switching between a first period in which the incident-wave information is input to the quadrature demodulator from the signal extraction unit and a second period in which the reflected-wave information is input to the quadrature demodulator from the signal extraction unit; and wherein the first period and the second period are switched by the changeover switch in a period shorter than a generation period of the phase-difference information.

6. The electromagnetic-wave heating device according to claim 1, wherein the signal extraction unit extracts the incident-wave information from the transmission line, and wherein a delay line or a delay element for correcting a phase shift between the incident-wave information and the reflected-wave information is provided in a line on which the incident-wave information is transmitter from the signal extraction unit to the phase-difference information generation unit.

7. The electromagnetic-wave heating device according to claim 1, wherein the control unit generates, utilizing the incident-wave information of a phase at a point of output timing of the electromagnetic waves of the oscillator, the phase-difference information, and corrects a phase shift between the incident-wave information and the reflected-wave information before the arithmetic processing.

8. The electromagnetic-wave heating device according to claim 1, wherein the control unit estimates an amount of electromagnetic-wave energy absorbed by the object to be heated based on the phase-difference information, and performs output control of the oscillator based on the estimated result.

9. The electromagnetic-wave heating device according to claim 1, wherein the reference information is a threshold range having a predetermined width, and wherein the control unit estimates a heating progress of the object to be heated with respect to a target heating state of the object to be heated, and adjusts a width of the threshold range based on the estimated result.

10. The electromagnetic-wave heating device according to claim 1, wherein a plurality of objects to be heated are conveyed at intervals so as to pass through the strong-electric-field region in order, wherein the control unit performs frequency control of repeating the control process during a period in which one object to be heated passes through the strong-electric-field region, records control history information of the frequency control, and performs, utilizing the control history information, the frequency control during a period in which the object to be heated passing through the strong-electric-field region after the recording.

11. The electromagnetic-wave heating device according to claim 1, wherein a plurality of objects to be heated are conveyed at intervals so as to pass through the strong-electric-field region in order, wherein the object to be heated is ink printed by a printing apparatus, and wherein the control unit uses information of a print pattern of the object to be heated to adjust a control parameter of the control process.

12. The electromagnetic-wave heating device according to claim 1, further comprising:

a shield unit for shielding, from an outside, an internal space in which the radiation antenna is disposed, an introduction portion and a lead-out portion for a conveyed object including the object to be heated being formed in the shield unit, the conveyed object being conveyed from the introduction portion toward the lead-out portion in the internal space so that the object to be heated passes through a facing region of the radiation antenna.

13. The electromagnetic-wave heating device according to claim 12, wherein a continuous gap in which a lateral gap extending in a conveyance direction of the conveyed object at a side of the facing region is connected to each of the introduction portion and the lead-out portion as a gap for allowing the internal space to communicate with the outside is formed in the shield unit.

14. The electromagnetic-wave heating device according to claim 1, wherein in the radiation antenna, three or more conductive lines each having the resonance structure are arranged with a gap in a predetermined direction, further comprising an input part for supplying the electromagnetic waves to at least a portion of the three or more conductive lines, wherein in the radiation antenna, during an input period in which the electromagnetic waves are input to the input part, the resonance by the electromagnetic waves occurs in each of the three or more conductive lines and the strong-electric-field region is formed along a region in which the three or more conductive lines are arranged.

* * * * *